United States Patent
Yamashita et al.

(10) Patent No.: US 9,109,157 B2
(45) Date of Patent: Aug. 18, 2015

(54) LIQUID CRYSTAL COMPOUND HAVING NEGATIVE DIELECTRIC ANISOTROPY, LIQUID CRYSTAL COMPOSITION AND LIQUID CRYSTAL DISPLAY DEVICE USING THE SAME

(75) Inventors: Junichi Yamashita, Chiba (JP);
Masahide Kobayashi, Chiba (JP);
Sayaka Fujimori, Chiba (JP)

(73) Assignees: JNC CORPORATION, Tokyo (JP);
JNC PETROCHEMICAL CORPORATION, Tokyo (JP)

(*) Notice: Subject to any disclaimer, the term of this patent is extended or adjusted under 35 U.S.C. 154(b) by 562 days.

(21) Appl. No.: 13/499,292

(22) PCT Filed: Sep. 27, 2010

(86) PCT No.: PCT/JP2010/066707
§ 371 (c)(1),
(2), (4) Date: Mar. 30, 2012

(87) PCT Pub. No.: WO2011/040373
PCT Pub. Date: Apr. 7, 2011

(65) Prior Publication Data
US 2012/0190897 A1    Jul. 26, 2012

(30) Foreign Application Priority Data
Oct. 1, 2009 (JP) .................. 2009-229554

(51) Int. Cl.
| | |
|---|---|
| C09K 19/08 | (2006.01) |
| C09K 19/30 | (2006.01) |
| C09K 19/34 | (2006.01) |
| C09K 19/12 | (2006.01) |
| C09K 19/04 | (2006.01) |

(52) U.S. Cl.
CPC .............. *C09K 19/3003* (2013.01); *C09K 19/12* (2013.01); *C09K 19/3098* (2013.01); *C09K 2019/0407* (2013.01); *C09K 2019/0411* (2013.01); *C09K 2019/123* (2013.01); *C09K 2019/3016* (2013.01); *C09K 2019/3027* (2013.01)

(58) Field of Classification Search
CPC .............. C07C 43/225; C07C 2101/14; C07C 2101/16; C09K 19/12; C09K 19/3003; C09K 19/3016; C09K 2019/3016; C09K 2019/0411; C09K 2019/0407; C09K 2019/03

USPC ........ 568/645, 646, 649; 252/299.61, 299.63, 252/299.66
See application file for complete search history.

(56) References Cited

U.S. PATENT DOCUMENTS

| | | | | |
|---|---|---|---|---|
| 7,081,279 | B2 * | 7/2006 | Kato et al. ...................... | 428/1.1 |
| 7,701,628 | B2 * | 4/2010 | Heckmeier et al. ............ | 359/245 |
| 8,187,494 | B2 * | 5/2012 | Kobayashi et al. ........ | 252/299.6 |
| 2008/0075891 | A1 * | 3/2008 | Goto et al. ..................... | 428/1.1 |

FOREIGN PATENT DOCUMENTS

| | | | |
|---|---|---|---|
| JP | 02004725 | | 1/1990 |
| JP | 07053432 | | 2/1995 |
| JP | 2000053602 | | 2/2000 |
| JP | 2001316669 | | 11/2001 |
| JP | 2004035698 | | 2/2004 |
| JP | 2007023071 | | 2/2007 |
| JP | 2007031694 | | 2/2007 |
| TW | 200632076 | | 9/2006 |
| WO | 2004029697 | | 4/2004 |
| WO | WO2004029697 | * | 4/2004 |
| WO | 2009150966 | | 12/2009 |

* cited by examiner

*Primary Examiner* — Rosalynd Keys
(74) *Attorney, Agent, or Firm* — Jianq Chyun IP Office

(57) ABSTRACT

The invention provides a liquid crystal compound having general physical properties necessary for the liquid crystal compound, namely, stability to heat, light and so forth, a small viscosity, a refractive index anisotropy having a suitable magnitude value, a dielectric anisotropy having a suitable magnitude value, steep electrooptical characteristics, a wide temperature range of a nematic phase, and an excellent compatibility with other liquid crystal compounds, in particular, a liquid crystal compound having a wide temperature range of the nematic phase; a compound represented by formula (i):

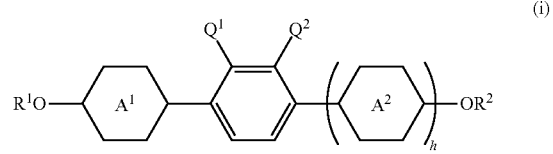

wherein, for example, $R^1$ and $R^2$ are alkyl having 1 to 8 carbons or alkenyl having 2 to 8 carbons; ring $A^1$ is trans-1,4-cyclohexylene or 1,4-phenylene; ring $A^2$ is trans-1,4-cyclohexylene or 2,3-difluoro-1,4-phenylene; $Q^1$ and $Q^2$ are fluorine or chlorine; and h is 0, 1 or 2.

19 Claims, No Drawings

LIQUID CRYSTAL COMPOUND HAVING NEGATIVE DIELECTRIC ANISOTROPY, LIQUID CRYSTAL COMPOSITION AND LIQUID CRYSTAL DISPLAY DEVICE USING THE SAME

CROSS-REFERENCE TO RELATED APPLICATION

This application is a 371 of international application of PCT application serial no. PCT/JP2010/066707, filed on Sep. 27, 2010, which claims the priority benefit of Japan application no. 2009-229554, filed on Oct. 1, 2009. The entirety of each of the above-mentioned patent applications is hereby incorporated by reference herein and made a part of this specification.

TECHNICAL FIELD

The invention relates to a new liquid crystal compound useful as a material for a liquid crystal display device and a liquid crystal composition containing the compound. More specifically, the invention relates to a new liquid crystal compound having a low viscosity, a good compatibility with other liquid crystal compounds, and also an optical anisotropy and a dielectric anisotropy having a suitable magnitude, and steep electrooptical characteristics when used for a liquid crystal display device, and a liquid crystal composition containing the compound, and a liquid crystal display device containing the liquid crystal composition.

BACKGROUND ART

A display device containing a liquid crystal compound has been widely used for a display for a watch, a calculator, a word processor and so forth. The display devices utilize an optical anisotropy, a dielectric anisotropy and so forth of the liquid crystal compound.

A liquid crystal phase includes a nematic liquid crystal phase, a smectic liquid crystal phase or a cholesteric liquid crystal phase, and the liquid crystal phase utilizing the nematic liquid crystal phase has been most widely used. Moreover, a display mode includes a mode such as dynamic scattering (DS), deformed aligned phase (DAP), guest/host (GH), twisted nematic (TN), super twisted nematic (STN), thin film transistor (TFT), vertical alignment (VA), in-plane switching (IPS) and polymer sustained alignment (PSA).

The liquid crystal compound used according to the display modes should show a liquid crystal phase in a wide temperature range centering on room temperature, be sufficiently stable under conditions where the display device is used, and have sufficient characteristics for driving the display device. However, a single liquid crystal compound satisfying the conditions has not been found at present.

Therefore, a liquid crystal composition with required characteristics is actually prepared by mixing several kinds or several tens of kinds of liquid crystal compounds. The liquid crystal compositions are required to be stable to moisture, light, heat and air ordinarily present under conditions where the display device is used, and stable also to an electric field or electromagnetic radiation and chemically stable to a compound to be mixed. Moreover, the liquid crystal composition is needed to have a suitable value in characteristics such as an optical anisotropy ($\Delta n$) and a dielectric anisotropy ($\Delta \varepsilon$) depending on the display mode or a shape of the display device. Furthermore, having a good solubility with each other is important in each component in the liquid crystal composition.

In order to perform a good liquid crystal display, cell thickness of the liquid crystal display device constituting the display, and a value of the optical anisotropy of the liquid crystal composition to be used are preferably constant (E. Jakeman et al., Phys. Lett., 39A. 69 (1972)). Moreover, a response speed of the liquid crystal display device is inversely proportional to a square of thickness of a cell used. Therefore, the device should have a liquid crystal composition having a large value of the optical anisotropy in order to manufacture a liquid crystal display device applicable also to moving images and so forth and allowing a high speed response. A variety of compounds have been developed as a liquid crystal compound having a large value of the optical anisotropy. However, generally, such a compound having a large optical anisotropy is difficult to use as a constituent of a liquid crystal composition having good electric characteristics because the compound has a highly conjugated molecular structure and tends to have a poor compatibility with other liquid crystal compounds. Furthermore, a high stability is required for a liquid crystal compound used as a constituent of a liquid crystal composition in which a high insulation (specific resistance) is required for a liquid crystal display device according to a thin film transistor mode and so forth.

Moreover, among the operating modes as described above, an IPS mode, a VA mode, a PSA mode and so forth is an operating mode utilizing homeotropic alignment of liquid crystal molecules, and is known to allow improvement of a limited viewing angle being a defect of an existing display mode such as a TN mode and an STN mode.

Then, a large number of liquid crystal compounds in which hydrogen on a benzene ring is replaced by fluorine have been examined as a component of a liquid crystal composition that can be conventionally used for a liquid crystal display device according to the operating modes and has a negative dielectric anisotropy (see Patent literature No. 1 to No. 8).

For example, compound (s-1) in which hydrogen on a benzene ring is replaced by fluorine and that has alkyl in a side chain has been examined in Patent literature No. 1, and compound (s-2) in which hydrogen on a benzene ring is replaced by fluorine and that has alkenyl in a side chain has been examined in Patent literature No. 2.

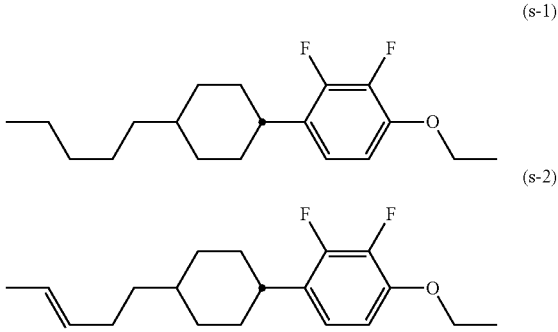

However, compound (s-1) has a small dielectric anisotropy and even compound (s-2) has no sufficient magnitude of the dielectric anisotropy. Moreover, as a compound having alkyl in a side chain and having a polar group such as halogen in a lateral group, compound (s-3) is disclosed in Patent literature No. 3, and compound (s-4) and compound (s-5) are disclosed in Patent literatures No. 4 to No. 7.

In addition, compound (s-6) having alkoxy in both side chains and having a polar group such as halogen in a lateral group is disclosed in Patent literature No. 8. However, as in the invention, a two-ring compound having alkoxy or alkenyloxy in both side chains or a three-ring compound having 2,3-dihalogeno-1,4-phenylene in a center ring and having alkoxy or alkenyloxy in both side chains is not disclosed.

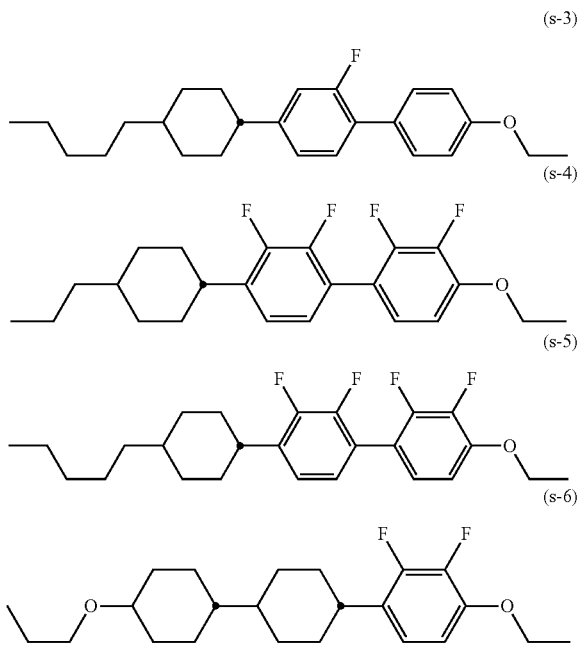

Furthermore, because compound (s-3) has a very small dielectric anisotropy, a liquid crystal display device cannot be driven by a liquid crystal composition containing compound (s-3). Moreover, compound (s-4) and compound (s-5) have no sufficiently large dielectric anisotropy and a low compatibility with other liquid crystal compounds, and therefore only a small amount of compound (s-4) and compound (s-5) can be contained in the liquid crystal composition. Furthermore, compound (s-6) has a small optical anisotropy and a high viscosity, and therefore, a liquid crystal composition containing compound (s-6) has points requiring a further improvement, such as incapability of decreasing a driving voltage thereof.

CITATION LIST

Patent Literature

Patent literature No. 1: JP H02-004725 A (1990).
Patent literature No. 2: JP 2000-053602 A (2000).
Patent literature No. 3: JP H07-053432 A (1995).
Patent literature No. 4: JP 2004-035698 A (2004).
Patent literature No. 5: JP 2005-537520 A (2005).
Patent literature No. 6: JP 2007 0074932007-031694 A (2007)
Patent literature No. 7: JP 2007-023071 A (2007).
Patent literature No. 8: JP 2001-316669 A (2001).

SUMMARY OF INVENTION

Technical Problem

Accordingly, even a liquid crystal display device used according to an operating mode such as an IPS mode, a VA mode and a PSA mode still has a problem as a display device, as compared with CRT, and an improvement of a response speed, an improvement of a contrast and a decrease of a driving voltage are desired.

The display device operated according to the IPS mode, the VA mode or the PSA mode mainly comprises a liquid crystal composition having a negative dielectric anisotropy. However, in order to further improve the characteristics and so forth, a liquid crystal compound contained in the liquid crystal composition is needed to have characteristics shown in (1) to (8) described below, more specifically:
(1) having a chemical stability and a physical stability;
(2) having a high clearing point, wherein a clearing point is a phase transition temperature between a liquid crystal phase and an isotropic phase;
(3) having a low minimum temperature of the liquid crystal phase, wherein the liquid crystal phase means a nematic phase, a smectic phase and so forth;
(4) having a small viscosity;
(5) having a suitable optical anisotropy;
(6) having a suitable negative dielectric anisotropy, wherein a compound having a large dielectric anisotropy has a large viscosity in many cases;
(7) having suitable elastic constants $K_{33}$ and $K_{11}$ ($K_{33}$: a bend elastic constant, $K_{11}$: spray elastic constant); and
(8) having an excellent compatibility with other liquid crystal compounds.

If a composition containing the liquid crystal compound having the chemical stability and the physical stability as described in (1) is used for the display device, a voltage holding ratio can be increased.

Moreover, according to a composition containing the liquid crystal compound having the high clearing point or the low minimum temperature of the liquid crystal phase as described in (2) and (3), a temperature range of the nematic phase can be extended. Consequently, the composition can be used in a wide temperature range in the form of the display device.

Furthermore, if a composition containing a compound having the small viscosity as described in (4) or a compound having a large elastic constant $K_{33}$ as described in (7) is used in the form of the display device, the response speed can be improved. In the case of the display device using a composition containing a compound having the suitable optical anisotropy as described in (5), a contrast of the display device can be improved.

In addition, when a liquid crystal compound has a large negative large dielectric anisotropy, a threshold voltage of the liquid crystal composition containing the compound can be decreased. Therefore, in the case of the display device using the composition containing the compound having the suitable negative dielectric anisotropy as described in (6), a driving voltage of the display device can be decreased, and an electric power consumption can also be decreased. Furthermore, a driving voltage of the display device can be adjusted by using a composition containing a compound having the suitable elastic constant $K_{33}$ as described in (7) as the display device, and the electric power consumption can also be adjusted.

In order to develop characteristics that are difficult to be output by a single compound, the liquid crystal compound is generally used in the form of a composition prepared by mixing the compound with a number of other liquid crystal compounds. Accordingly, the liquid crystal compound to be used for the display device preferably has a good compatibility with other liquid crystal compounds and so forth as described in (8). Moreover, the display device may be used in a wide temperature range including a temperature below a freezing point, and therefore a compound showing a good compatibility from a low temperature range may be preferred.

A first aim of the invention is to solve a defect of a background art and to provide a liquid crystal compound having general physical properties necessary for the liquid crystal compound, namely, stability to heat, light and so forth, a small viscosity, an optical anisotropy having a suitable magnitude, a negative dielectric anisotropy having a suitable magnitude, elastic constants $K_{33}$ and $K_{11}$ having a suitable magnitude and steep electrooptical characteristics, a wide temperature range of the nematic phase and an excellent compatibility with other liquid crystal compounds, in particular, to provide a liquid crystal compound having a wide temperature range of the nematic phase.

A second aim of the invention is to provide a liquid crystal composition containing the liquid crystal compound and having a high maximum temperature of the nematic phase, a low minimum temperature of the nematic phase, a small viscosity, a suitable optical anisotropy and a low threshold voltage, in particular, to provide a liquid crystal composition having a high maximum temperature of the nematic phase, and a low minimum temperature of the nematic phase.

A third aim of the invention is to provide a liquid crystal display device containing the composition and having a wide temperature range in which the device can be used, a short response time, a small electric power consumption, a large contrast and a low driving voltage, in particular, to provide a liquid crystal display device having a wide temperature range in which the device can be used.

Solution to Problem

The inventors of the invention have diligently continued to conduct research for solving the problem, as a result, have found that a biphenyl compound having a polar group such as halogen in a lateral group has a very large elastic constant $K_{33}$ ($K_{33}$: bend elastic constant), a very low viscosity, a high chemical stability, a wide temperature range of a nematic phase, a large optical anisotropy, and a negative dielectric anisotropy having a suitable magnitude. Furthermore, the inventors have found that, when a liquid crystal composition containing the compound is used, a liquid crystal device having steep electrooptical characteristics, a short response time, a wide operating temperature range and a small driving electric power can be prepared. Accordingly, the inventors have found that the compound is suitable for the liquid crystal display device, particularly a currently widely utilized liquid crystal display device according to an ECB mode, an IPS mode, a VA mode, a PSA mode and so forth, and thus have completed the invention.

The invention includes the items as described below.
Item 1. A compound represented by formula (i):

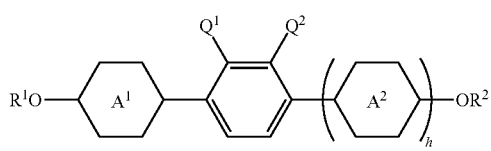

(i)

wherein $R^1$ and $R^2$ are independently alkyl having 1 to 8 carbons or alkenyl having 2 to 8 carbons;
ring $A^1$ is trans-1,4-cyclohexylene, 1,4-cyclohexenylene or 1,4-phenylene;

ring $A^2$ is trans-1,4-cyclohexylene, 1,4-cyclohexenylene, 2-fluoro-1,4-phenylene, 3-fluoro-1,4-phenylene, 2,3-difluoro-1,4-phenylene, 2-fluoro-3-chloro-1,4-phenylene or 2-chloro-3-fluoro-1,4-phenylene;
$Q^1$ and $Q^2$ are independently fluorine or chlorine; and
h is 0, 1 or 2, and ring $A^2$ when h is 2 may be identical or different.
Item 2. A compound represented by formula (1):

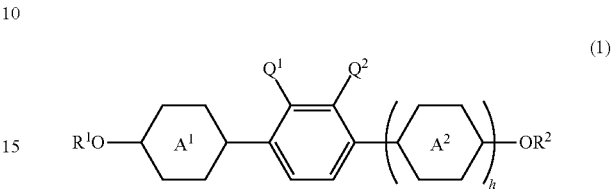

(1)

wherein $R^1$ and $R^2$ are independently alkyl having 1 to 8 carbons or alkenyl having 2 to 8 carbons;
ring $A^1$ is trans-1,4-cyclohexylene or 1,4-cyclohexenylene;
ring $A^2$ is trans-1,4-cyclohexylene, 1,4-cyclohexenylene, 2-fluoro-1,4-phenylene, 3-fluoro-1,4-phenylene, 2,3-difluoro-1,4-phenylene, 2-fluoro-3-chloro-1,4-phenylene or 2-chloro-3-fluoro-1,4-phenylene;
$Q^1$ and $Q^2$ are independently fluorine or chlorine; and
h is 0, 1 or 2, and ring $A^2$ when h is 2 may be identical or different.
Item 3. The compound according to item 2, wherein h is 0.
Item 4. The compound according to item 2, wherein h is 1.
Item 5. The compound according to any one of items 2 to 4, wherein ring $A^1$ is 1,4-cyclohexenylene.
Item 6. The compound according to any one of items 2 to 5, wherein one of $Q^1$ and $Q^2$ is fluorine and the other of $Q^1$ and $Q^2$ is chlorine.
Item 7. The compound according to any one of items 2 to 6, wherein one of $R^1$ and $R^2$ is alkenyl having 2 to 8 carbons.
Item 8. The compound according to item 2, represented by formula (1-a):

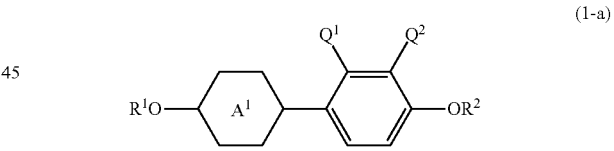

(1-a)

wherein $R^1$ and $R^2$ are independently straight-chain alkyl having 1 to 8 carbons or straight-chain alkenyl having 2 to 8 carbons;
ring $A^1$ is trans-1,4-cyclohexylene or 1,4-cyclohexenylene; and
$Q^1$ and $Q^2$ are independently fluorine or chlorine.
Item 9. The compound according to item 8, wherein ring $A^1$ is 1,4-cyclohexenylene.
Item 10. The compound according to item 8 or 9, wherein one of $Q^1$ and $Q^2$ is fluorine and the other of $Q^1$ and $Q^2$ is chlorine.
Item 11. The compound according to any one of items 8 to 10, wherein one of $R^1$ and $R^2$ is straight-chain alkenyl having 2 to 8 carbons.
Item 12. The compound according to item 11, wherein $R^1$ is $CH_3CH\!=\!CHCH_2\!-\!$.
Item 13. The compound according to item 2, represented by formula (1-b):

(1-b)

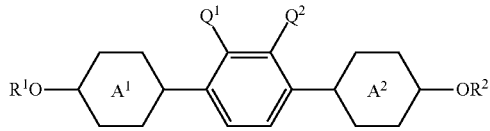

wherein $R^1$ and $R^2$ are independently straight-chain alkyl having 1 to 8 carbons or straight-chain alkenyl having 2 to 8 carbons;
ring $A^1$ and ring $A^2$ are independently trans-1,4-cyclohexylene or 1,4-cyclohexenylene; and
$Q^1$ and $Q^2$ are independently fluorine or chlorine.

Item 14. The compound according to item 13, wherein both of ring $A^1$ and ring $A^2$ are trans-1,4-cyclohexylene and both of $Q^1$ and $Q^2$ are fluorine.

Item 15. The compound according to item 2, represented by formula (1-c):

(1-c)

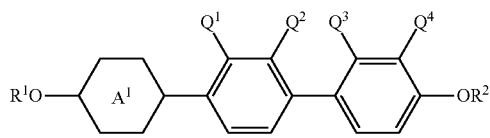

wherein $R^1$ and $R^2$ are independently straight-chain alkyl having 1 to 8 carbons or straight-chain alkenyl having 2 to 8 carbons;
ring $A^1$ is trans-1,4-cyclohexylene or 1,4-cyclohexenylene;
$Q^1$ and $Q^2$ are independently fluorine or chlorine; and
$Q^3$ and $Q^4$ are independently hydrogen, fluorine or chlorine, and one of $Q^3$ and $Q^4$ is fluorine.

Item 16. The compound according to item 15, wherein ring $A^1$ is trans-1,4-cyclohexylene, $Q^1$, $Q^2$ and $Q^4$ are fluorine, and $Q^3$ is hydrogen.

Item 17. The compound according to item 15, wherein ring $A^1$ is trans-1,4-cyclohexylene, and $Q^1$, $Q^2$, $Q^3$ and $Q^4$ are fluorine.

Item 18. The compound according to item 1, represented by formula (i-d):

(i-d)

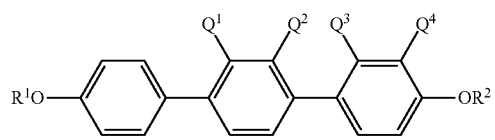

wherein $R^1$ and $R^2$ are independently straight-chain alkyl having 1 to 8 carbons or straight-chain alkenyl having 2 to 8 carbons;
$Q^1$ and $Q^2$ are independently fluorine or chlorine; and
$Q^3$ and $Q^4$ are independently hydrogen, fluorine or chlorine, and one of $Q^3$ and $Q^4$ is fluorine.

Item 19. A liquid crystal composition, containing at least one compound according to any one of items 1 to 18.

Item 20. The liquid crystal composition according to item 19, further containing at least one compound selected from the group of compounds represented by general formulas (2), (3) and (4):

(2)

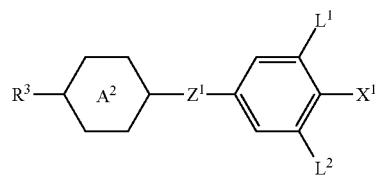

(3)

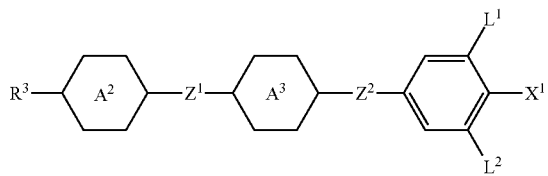

(4)

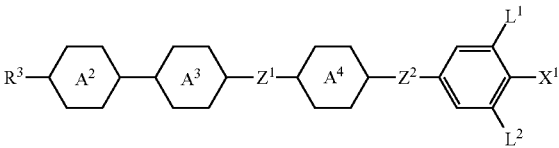

wherein $R^3$ is independently alkyl having 1 to 10 carbons or alkenyl having 2 to 10 carbons, and in the alkyl or alkenyl, arbitrary hydrogen may be replaced by fluorine, and arbitrary —$CH_2$— may be replaced by —O—;
$X^1$ is fluorine or chlorine;
ring $A^2$, ring $A^3$ and ring $A^4$ are independently trans-1,4-cyclohexylene, trans-1,3-dioxane-2,5-diyl, pyrimidine-2,5-diyl or trans-1-pyrane-2,5-diyl, or 1,4-phenylene in which arbitrary hydrogen may be replaced by fluorine;
$Z^1$ and $Z^2$ are independently —$(CH_2)_2$—, —$(CH_2)_4$—, —COO—, —$OCF_2$—, —CH=CH—, —C≡C—, —$CH_2O$— or a single bond; and
$L^1$ and $L^2$ are independently hydrogen or fluorine.

Item 21. The liquid crystal composition according to item 19, further containing at least one compound selected from the group of compounds represented by general formula (5):

(5)

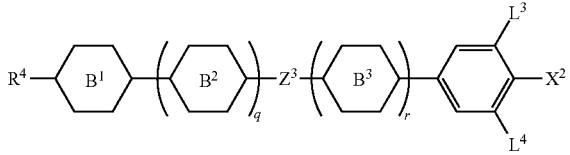

wherein $R^4$ is alkyl having 1 to 10 carbons or alkenyl having 2 to 10 carbons, and in the alkyl or alkenyl, arbitrary hydrogen may be replaced by fluorine, and arbitrary —$CH_2$— may be replaced by —O—;
$X^2$ is —C≡N or —C≡C—C≡N;
ring $B^1$, ring $B^2$ and ring $B^3$ are independently trans-1,4-cyclohexylene, 1,4-phenylene in which arbitrary hydrogen may be replaced by fluorine, trans-1,3-dioxane-2,5-diyl, trans-1-pyrane-2,5-diyl or pyrimidine-2,5-diyl;
$Z^3$ is —$(CH_2)_2$—, —COO—, —$CF_2O$—, —$OCF_2$—, —C≡C—, —$CH_2O$— or a single bond;
$L^3$ and $L^4$ are independently hydrogen or fluorine; and
q is 0, 1 or 2, and r is 0 or 1.

Item 22. The liquid crystal composition according to item 19, further containing at least one compound selected from the group of compounds represented by general formulas (6), (7), (8), (9), (10) and (11):

(6) 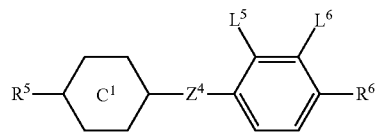

(7) 

(8) 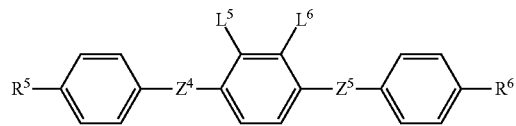

(9) 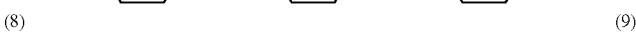

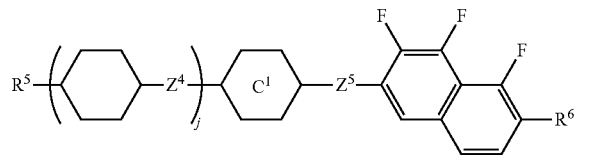 (10)

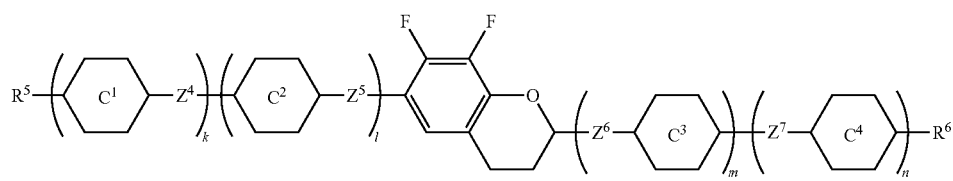

(11) 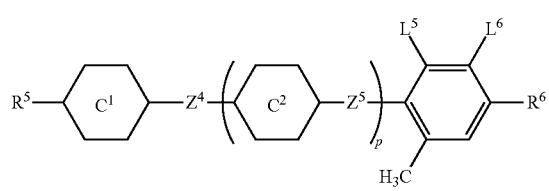

wherein $R^5$ is alkyl having 1 to 10 carbons or alkenyl having 2 to 10 carbons, and in the alkyl or alkenyl, arbitrary hydrogen may be replaced by fluorine, $R^6$ is alkoxy having 1 to 9 carbons or alkenyloxy having 2 to 9 carbons, and in the alkoxy or alkenyloxy, arbitrary hydrogen may be replaced by fluorine;

ring $C^1$, ring $C^2$, ring $C^3$ and ring $C^4$ are independently trans-1,4-cyclohexylene, 1,4-cyclohexenylene, 1,4-phenylene in which arbitrary hydrogen may be replaced by fluorine, trans-1-pyrane-2,5-diyl or trans-decahydro-2,6-naphthalene;

$Z^4$, $Z^5$, $Z^6$ and $Z^7$ are independently —$(CH_2)_2$—, —COO—, —$CH_2O$—, —$OCF_2$—, —$OCF_2(CH_2)_2$— or a single bond;

$L^5$ and $L^6$ are independently fluorine or chlorine; and j, k, l, m, n and p are independently 0 or 1, and a sum of k, l, m and n is 1 or 2.

Item 23. The liquid crystal composition according to item 19, further containing at least one compound selected from the group of compounds represented by general formulas (12), (13) and (14):

(12) 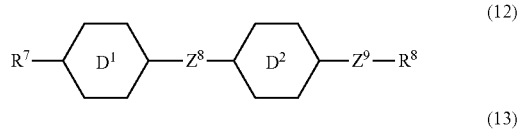

(13) 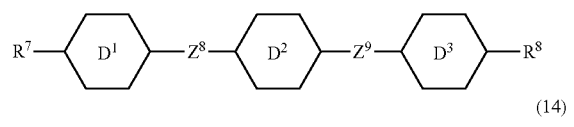

(14) 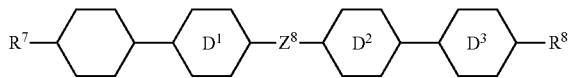

wherein $R^7$ and $R^8$ are independently alkyl having 1 to 10 carbons or alkenyl having 2 to 10 carbons, and in the alkyl or alkenyl, arbitrary hydrogen may be replaced by fluorine, and arbitrary —$CH_2$— may be replaced by —O—;

ring $D^1$, ring $D^2$ and ring $D^3$ are independently trans-1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^8$ and $Z^9$ are independently —C≡C—, —COO—, —$(CH_2)_2$—, —CH=CH— or a single bond.

Item 24. The liquid crystal composition according to item 20, further containing at least one compound selected from the group of compounds represented by general formula (5) according to item 21.

Item 25. The liquid crystal composition according to item 20, further containing at least one compound selected from the group of compounds represented by general formulas (12), (13) and (14) according to item 23.

Item 26. The liquid crystal composition according to item 21, further containing at least one compound selected from the group of compounds represented by general formulas (12), (13) and (14) according to item 23.

Item 27. The liquid crystal composition according to item 22, further containing at least one compound selected from the group of compounds represented by general formulas (12), (13) and (14) according to item 23.

Item 28. The liquid crystal composition according to any one of items 19 to 27, further containing at least one optically active compound and/or polymerizable compound.

Item 29. The liquid crystal composition according to any one of items 19 to 28, further containing at least one antioxidant and/or ultraviolet absorber.

Item 30. A liquid crystal display device containing the liquid crystal composition according to any one of items 19 to 29.

Advantageous Effects of Invention

A compound of the invention has general physical properties necessary for a liquid crystal compound, namely, stability to heat, light and so forth, a small viscosity, an optical anisotropy having a suitable magnitude, a negative dielectric anisotropy having a suitable magnitude and an excellent compatibility with other liquid crystal compounds. A liquid crystal composition of the invention contains at least one of the compounds and has a high maximum temperature of a nematic phase, a low minimum temperature of the nematic phase, a small viscosity, an optical anisotropy having a suitable magnitude, a suitable elastic constant $K_{33}$ ($K_{33}$: bend elastic constant) and a low threshold voltage. A liquid crystal display device of the invention contains the composition, and has a wide temperature range in which the device can be used, a short response time, a small electric power consumption, a large contrast ratio and a low driving voltage.

More specifically, as compared with a publicly known compound having a same structure, the compound of the invention has an excellent compatibility with other liquid crystal compounds and a small viscosity, and a wide liquid crystal temperature range. Moreover, as compared with a similar compound, the compound of the invention has a low threshold voltage, and also shows a relatively low viscosity. The compound of the invention is sufficiently physically and chemically stable under conditions in which the liquid crystal display device is ordinarily used, and is exceptional as a constituent of a nematic liquid crystal composition, and can be suitably used as a constituent of a liquid crystal composition for TN, STN, TFT, VA, IPS and PSA modes.

DESCRIPTION OF EMBODIMENTS

Usage of terms in the specification is as described below. A liquid crystal compound is a generic term for a compound having a liquid crystal phase such as a nematic phase or a smectic phase and a compound having no liquid crystal phase but being useful as a component of a liquid crystal composition. The liquid crystal compound, the liquid crystal composition and a liquid crystal display device may be abbreviated as "compound," "composition" and "device," respectively. The liquid crystal display device is a generic term for a liquid crystal display panel and a liquid crystal display module. A higher limit of a temperature range of the nematic phase is a phase transition temperature between the nematic phase and an isotropic phase, and may be abbreviated simply as "maximum temperature." A lower limit of the temperature range of the nematic phase may be abbreviated simply as "minimum temperature." A compound represented by formula (1) may be abbreviated as "compound (1)." The abbreviation may apply to a compound represented by formula (2) and so forth. In formula (1) and formulas (1) to (14), symbols such as $A^1$, $B^1$, $C^1$ and $D^1$ surrounded by a hexagonal shape correspond to ring $A^1$, ring $B^1$, ring $C^1$ and ring $D^1$, respectively. A plurality of identical symbols are described in an identical or different formula, and the symbols may be identical or different, respectively.

"Arbitrary" represents any of not only positions but also numbers without including the case where the number is zero (0). An expression "arbitrary A may be replaced by B, C or D" includes the case where arbitrary A is replaced by B, the case where arbitrary A is replaced by C, and the case where arbitrary A is replaced by D, and also the case where a plurality of A are replaced by at least two of B to D. For example, an expression "alkyl in which arbitrary —$CH_2$— may be replaced by —O— or —CH=CH—" includes alkyl, alkenyl, alkoxy, alkoxyalkyl, alkoxyalkenyl and alkenyloxyalkyl. Incidentally, according to the invention, it is not preferred that two successive —$CH_2$— are replaced by —O— to form —O—O— or the like. Then it is also not preferred that a terminal —$CH_2$— in alkyl is replaced by —O—. An amount of compound expressed in terms of percentage is expressed in terms of weight percent (% by weight) of the compound based on the total weight of the composition. The invention will be further explained below.

Compound (i) of the Invention

First, compound (i) will be further explained.

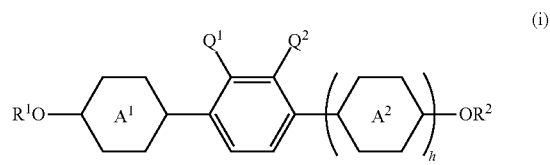

(i)

For compound (i), as described in Table 21 in Examples described later, each structure will be explained by a left-terminal group, a bonding group, a ring structure and a right-terminal group. Compound (i) is a two-ring, three-ring or four-ring compound having a benzene ring including a fluorine or chlorine atom in position 2 and position 3. The compound is physically and chemically very stable under conditions in which the device is ordinarily used, and has a good compatibility with other liquid crystal compounds. The composition containing the compound is stable under the conditions in which the device is ordinarily used. Even if the composition is stored at a low temperature, the compound does not precipitate as crystals (or as the smectic phase). The compound has general physical properties necessary for the compound, namely, a suitable optical anisotropy and a suitable negative dielectric anisotropy.

Physical properties such as the optical anisotropy and the dielectric anisotropy can be arbitrarily adjusted by suitably selecting the terminal group, the ring structure and the bonding group of compound (i). A preferred terminal group, ring $A^1$ and ring $A^2$ in compound (i), and an effect of types thereof on the physical properties of compound (i) will be explained below.

In compound (i), $R^1$ and $R^2$ are preferably a straight chain. When $R^1$ and $R^2$ are the straight chain, a temperature range of a liquid crystal phase is wide, and viscosity is small. When any one of $R^1$ and $R^2$ is a branched chain, compatibility with other liquid crystal compounds is good. A compound in which any one of $R^1$ and $R^2$ is an optically active group is useful as a chiral dopant. A reverse twisted domain generated in the device can be prevented by adding the compound to the composition. A compound in which $R^1$ and $R^2$ are not the optically active group is useful as a component of the composition.

In compound (i), $R^1$ and $R^2$ are independently alkyl having 1 to 8 carbons or alkenyl having 2 to 8 carbons. $R^1$ and $R^2$ can be selected with reference to the following specific examples according to an application of the compound. Herein, alkenyl is a group in which arbitrary —$(CH_2)_2$— is replaced by —CH=CH— in alkyl. Specific examples of groups in which arbitrary —$(CH_2)_2$— is replaced by —CH=CH— in $CH_3(CH_2)_3$— include $H_2C$=CH—$(CH_2)_2$— and $CH_3$—CH=CH—$CH_2$—. Thus, a term "arbitrary" means "at least one selected without distinction." In consideration of stability of the compound, $CH_2$=CH—$CH_2$—$CH_2$—CH=CH— in which double bonds are not adjacent is preferred to $CH_2=CH-CH=CH-CH_2-CH_2-$ in which the double bonds are adjacent.

A preferred configuration of $-CH=CH-$ in alkenyl depends on a position of a double bond. A trans configuration is preferred in alkenyl having the double bond in an even-numbered position, such as $-CH_2CH=CHCH_3$, $-CH_2CH=CHC_2H_5$ and $-CH_2CH=CHC_3H_7$. An alkenyl compound having the preferred configuration as described above has a wide temperature range of the liquid crystal phase and a large elastic constant $K_{33}$, can decrease the viscosity of the compound, and when the liquid crystal compound is added to the liquid crystal composition, can increase a maximum temperature ($T_{NI}$) of the nematic phase. Moreover, a cis configuration is preferred in alkenyl having the double bond in an odd-numbered position such as $-CH=CHCH_3$, $-CH=CHC_2H_5$, $-CH=CHC_3H_7$ and $-CH=CHC4H_9$. Furthermore, alkenyl having the double bond internally such as $-CH_2CH=CHCH_3$ is preferred to alkenyl having the double bond in a terminal such as $-(CH_2)_2CH=CH_2$ because the compound having such alkenyl has a large elastic constant $K_{33}$ and can decrease the viscosity of the compound.

Specific examples of preferred $R^1$ and $R^2$ include $-CH_3$, $-C_2H_5$, $-C_3H_7$, $-C_4H_9$, $-C_5H_{11}$, $-C_6H_{13}$, $-C_7H_{15}$, $-C_8H_{17}$, $-CH=CH_2$, $-CH=CHCH_3$, $-CH_2CH=CH_2$, $-CH=CHC_2H_5$, $-CH_2CH=CHCH_3$, $-(CH_2)_2CH=CH_2$, $-CH=CHC_3H_7$, $-CH_2CH=CHC_2H_5$, $-(CH_2)_2CH=CHCH_3$, $-(CH_2)_3CH=CH_2$, $-CH_2CH=CH(CH_2)_2CH=CH_2$ and $-CH_2CH=CH(CH_2)_2CH=CHCH_3$.

Specific examples of further preferred $R^1$ and $R^2$ include $-CH_3$, $-C_2H_5$, $-C_3H_7$, $-C_4H_9$, $-C_5H_{11}$, $-C_6H_{13}$, $-C_7H_{15}$, $-C_8H_{17}$, $-CH=CH_2$, $-CH=CHCH_3$, $-CH_2CH=CH_2$, $-CH=CHC_2H_5$, $-CH_2CH=CHCH_3$, $-(CH_2)_2CH=CH_2$, $-CH=CHC_3H_7$, $-CH_2CH=CHC_2H_5$, $-(CH_2)_2CH=CHCH_3$ and $-(CH_2)_3 CH=CH_2$.

Specific examples of most preferred $R^1$ and $R^2$ include $-CH_3$, $-C_2H_5$, $-C_4H_9$, $-C_6H_{13}$, $-C_8H_{17}$, $-CH=CH_2$, $-CH=CHCH_3$, $-CH_2CH=CH_2$, $-CH=CHC_2H_5$, $-CH_2CH=CHCH_3$, $-CH_2CH=CHC_2H_5$, $-(CH_2)_2CH=CHCH_3$ and $-(CH_2)_3CH=CH_2$.

As a ring structure in compound (i), ring $A^1$ includes trans-1,4-cyclohexylene, 1,4-cyclohexenylene or 1,4-phenylene, and ring $A^2$ includes trans-1,4-cyclohexylene, 1,4-cyclohexenylene, 2-fluoro-1,4-phenylene, 3-fluoro-1,4-phenylene, 2,3-difluoro-1,4-phenylene, 2-fluoro-3-chloro-1,4-phenylene or 2-chloro-3-fluoro-1,4-phenylene.

In 1,4-cyclohexylene, a configuration thereof is trans. Such a configuration allows an increase of a maximum temperature ($T_{NI}$) of the nematic phase of the liquid crystal phase of the liquid crystal compound.

When at least one ring is 1,4-cyclohexylene, the maximum temperature is high, the optical anisotropy is small, and the viscosity is small. When at least one ring is 1,4-phenylene, 2-fluoro-1,4-phenylene, 3-fluoro-1,4-phenylene, 2,3-difluoro-1,4-phenylene, 2-fluoro-3-chloro-1,4-phenylene or 2-chloro-3-fluoro-1,4-phenylene, the optical anisotropy is relatively large and an orientational order parameter is large. When at least two rings are 1,4-phenylene, 2-fluoro-1,4-phenylene, 3-fluoro-1,4-phenylene, 2,3-difluoro-1,4-phenylene, 2-fluoro-1,4-phenylene or 2-chloro-3-fluoro-1,4-phenylene, the optical anisotropy is large, the temperature range of the liquid crystal phase is wide, and the maximum temperature is high.

As a lateral group in compound i, $Q^1$ and $Q^2$ are independently fluorine or chlorine.

Compound (i) has a large negative dielectric anisotropy. A compound having a large dielectric anisotropy is useful as a component for decreasing a threshold voltage of the composition.

When the liquid crystal compound is such types of compound (i), the liquid crystal compound has a suitable negative dielectric anisotropy and a very good compatibility with other liquid crystal compounds. Furthermore, the liquid crystal compound has stability to heat, light and so forth, becomes the nematic phase in a wide temperature range, and has a small viscosity, a large optical anisotropy and suitable elastic constants $K_{33}$ and $K_{11}$. When compound (i) has three rings, the viscosity is small. When compound (i) has four rings, the maximum temperature is high. As described above, a compound having targeted physical properties can be obtained by suitably selecting the types of the terminal group, the ring structure and the bonding group, and the number of rings. Moreover, the liquid crystal composition containing the compound (i) is stable under the conditions in which the liquid crystal display device is ordinarily used, and the compound does not precipitate as the crystals (or as the smectic phase) even if the compound is stored at a low temperature.

Accordingly, compound (i) can be suitably applied to the liquid crystal composition to be used for the liquid crystal display device according to a display mode such as PC, TN, STN, ECB, OCB, IPS, VA and PSA, and can be particularly suitably applied to the liquid crystal composition to be used for the liquid crystal display device according to the display mode such as IPS, VA or PSA.

Compound (i) is obtained by selecting a predetermined group for $R^1$, $R^2$, $Q^1$, $Q^2$, $Q^3$ and $Q^4$ in the formula, and introduction of a selected group can be performed by a publicly known general organic synthesis method. Representative synthetic examples include methods as described in New Experimental Chemistry Course (Shin Jikken Kagaku Koza in Japanese), Vol. 14: Synthesis and Reaction of Organic Compound (1978) (Maruzen Co., Ltd.) or Experimental Chemistry Course (Jikken Kagaku Koza in Japanese), 4th edition, Vol. 19 to Vol. 26: Organic Synthesis I to VIII (1991) (Maruzen Co., Ltd.).

Next, a synthetic example of compound (i) is shown. In the following reaction route, $R^1$, $R^2$, $A^1$, $A^2$, $Q^1$, $Q^2$, $Q^3$, $Q^4$ and h in each formula are defined in the same way as described above.

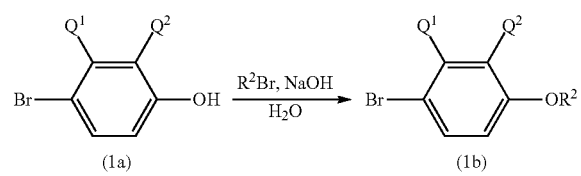

Compound (1a) is dissolved in water, alkyl halide such as bromoalkyl or alkenyl halide is added, and then sodium hydroxide is added while paying attention to development of heat. Then, phenol derivative (1b) is obtained by performing heating agitation at 80° C. for 1 hour.

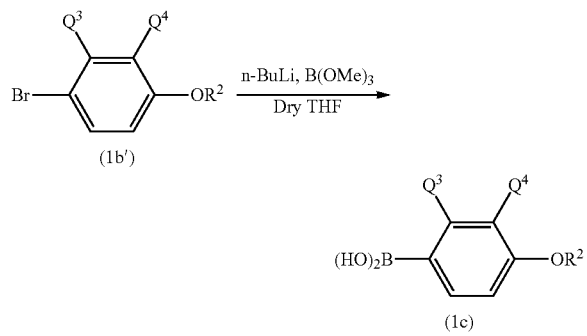

Compound (1b') obtained in a manner similar to obtaining compound (1b) is allowed to react with n-butyllithium to prepare a lithium salt, the salt is allowed to react with a boric acid ester, the resultant product is hydrolyzed in an acidic atmosphere, and thus dihydroxy borane derivative (1c) is obtained.

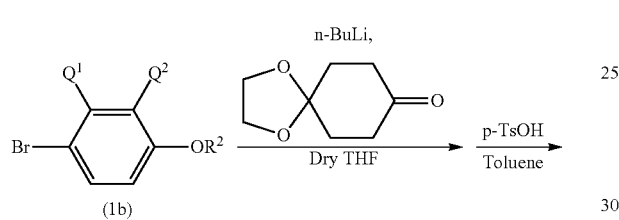

Compound (1b) is allowed to react with n-butyllithium to prepare a lithium salt, and the salt is allowed to react with cyclohexanedione monoethylene ketal, and the resultant product is hydrolyzed in an acidic atmosphere. Then, a dehydration reaction is performed with para-toluenesulfonic acid (hereinafter, abbreviated as p-TsOH), and thus cyclohexene derivative (1d) is obtained.

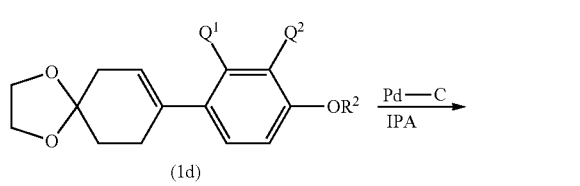

The compound (1d) is allowed to react with hydrogen in the presence of a catalyst such as Pd—C, and thus cyclohexane derivative (1e) is obtained.

In the following, a compound in which ring $A^1$ is cyclohexene, and a compound in which ring $A^1$ is cyclohexane will be collectively explained.

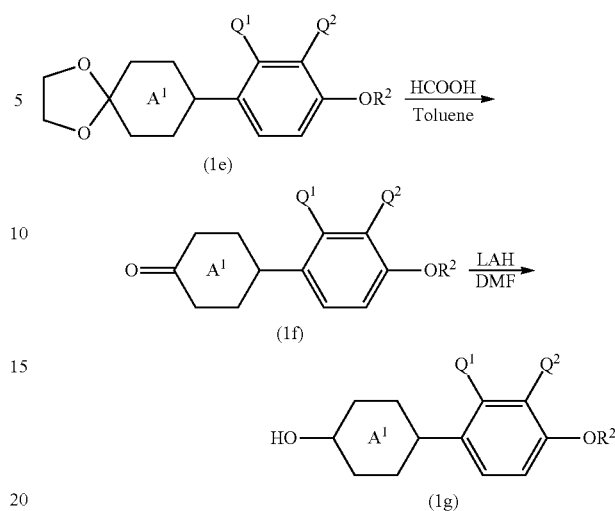

Compound (1d) in which ring $A^1$ is cyclohexene, and compound (1e) in which ring $A^1$ is cyclohexane are heated and agitated in the presence of formic acid, separately, and thus ketone derivative (1f) is obtained. The ketone derivative 1f is reduced with lithium aluminum hydride (hereinafter, abbreviated as LAH) or the like, and thus alcohol derivative (1g) is obtained.

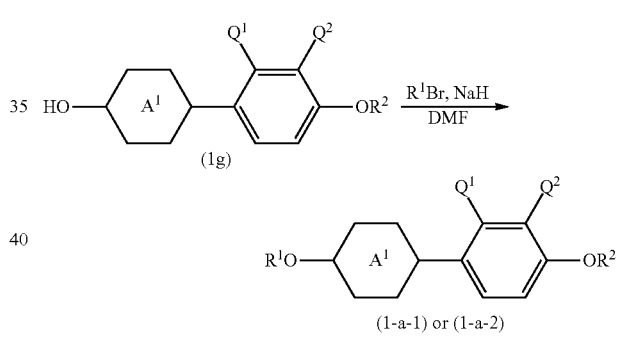

Sodium hydride (hereinafter, abbreviated as NaH) is added to a mixed solution of compound (1g) and alkyl halide or alkenyl halide such as bromoalkyl while paying attention to foam formation, and thus compound (1-a-1) in which ring $A^1$ is cyclohexene and compound (1-a-2) in which ring $A^1$ is cyclohexane can be synthesized.

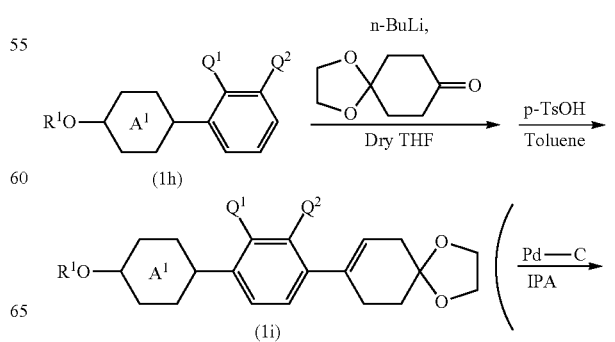

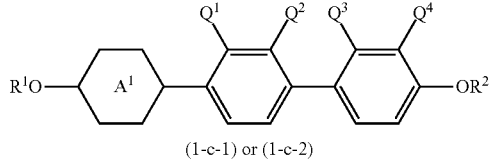

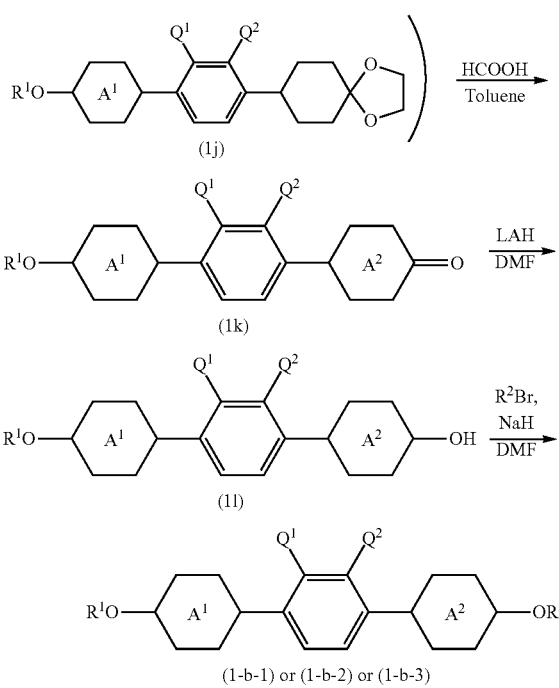

Compound (1h) is obtained in a manner similar to synthesis of compound (1-a-1) and compound (1-a-2). Compound (1l) is obtained from compound (1h) again in a manner similar to synthesis of compound (1-a-1) and a compound (1-a-2). A compound in which ring $A^2$ is cyclohexene is directly advanced to the next reaction, and a compound in which ring $A^2$ is cyclohexane is allowed to react with hydrogen in the presence of a catalyst such as Pd—C, and thus cyclohexane derivative (1j) is obtained.

In a manner similar to synthesis of compound (1-a-1) and compound (1-a-2), compound (1-b-1) in which both of ring $A^1$ and ring $A^2$ are cyclohexene, compound (1-b-2) in which $A^1$ is cyclohexane and ring $A^2$ is cyclohexene, or compound (1-b-3) in which both of ring $A^1$ and ring $A^2$ are cyclohexane can be synthesized from compound (1i) and compound (1j).

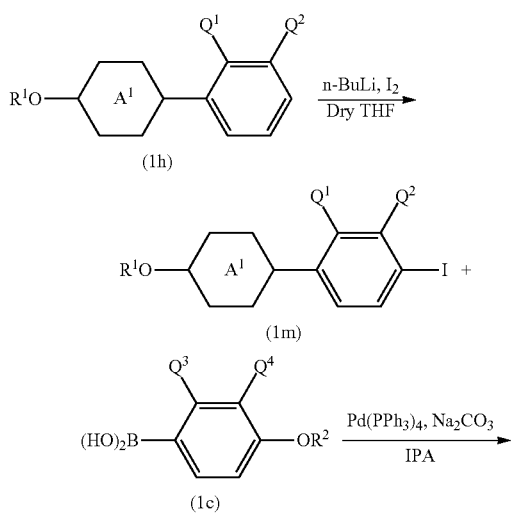

Compound (1h) obtained in the above step is allowed to react with n-butyllithium to prepare a lithium salt, the salt is allowed to react with iodine, and thus iodinated derivative (1m) is obtained. The compound (1m) is allowed to react with compound (1c) in the presence of a base such as sodium carbonate, and a catalyst such as $Pd(PPh_3)_4$, and thus compound (1-c-1) in which ring $A^1$ is cyclohexene, or compound (1-c-2) in which ring $A^1$ is cyclohexane can be synthesized.

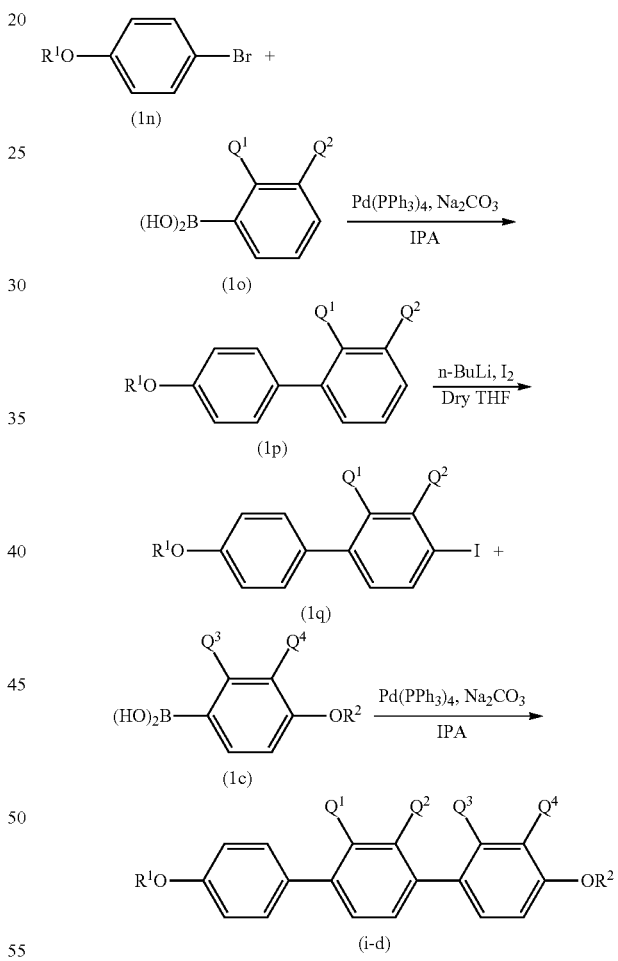

In a manner similar to the above step, compound (1n) is allowed to react with compound (1o) in the presence of a base such as sodium carbonate, and a catalyst such as $Pd(PPh_3)_4$, and thus compound (1p) is obtained. The compound (1p) is allowed to react with n-butyllithium to prepare a lithium salt, the salt is allowed to react with iodine, and thus iodinated derivative (1q) is obtained. The compound (1q) is allowed to react with compound (1c) in the presence of a base such as sodium carbonate, and a catalyst such as $Pd(PPh_3)_4$, and thus compound (i-d) can be synthesized.

Among kinds of compound (i), further preferred compounds include compounds (1-a-1), (1-a-2), (1-b-1) to (1-b-3), (1-c-1), (1-c-2) and (i-d).

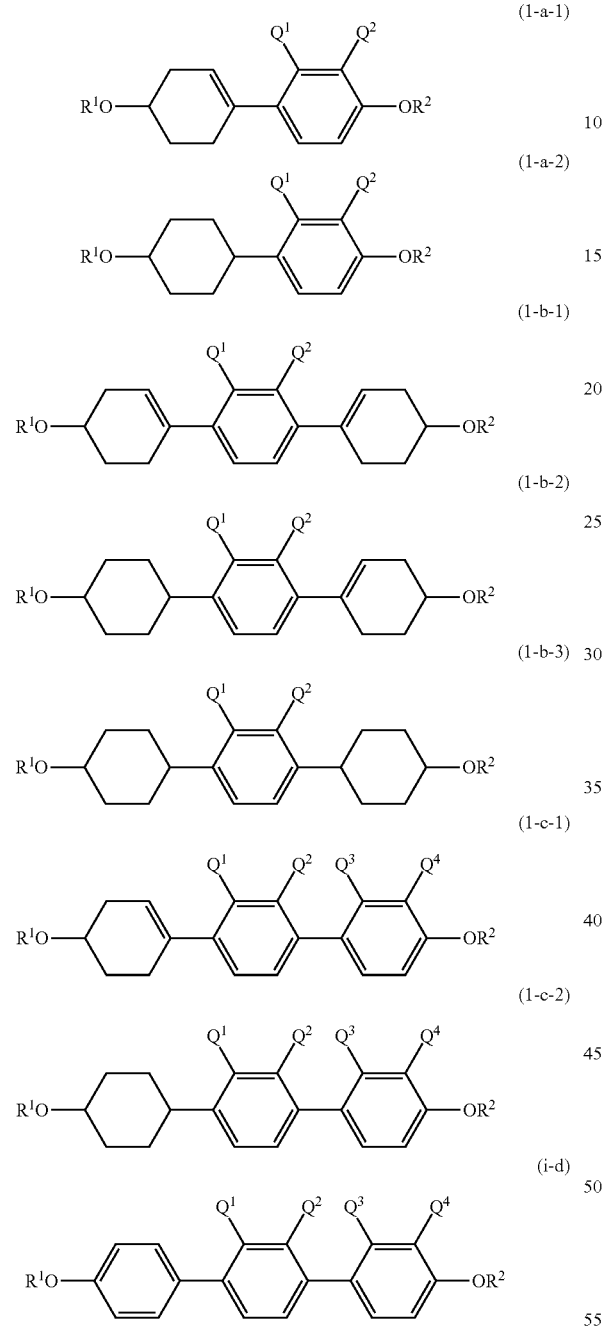

Compounds (1-a-1) and (1-a-2) have a good compatibility with other liquid crystal compositions, and a small viscosity. Compounds (1-b-1) to (1-b-3), (1-c-1), (1-c-2) and (i-d) have a high maximum temperature ($T_{NI}$) of the nematic phase. Compound (i-d) has a large optical anisotropy.

Liquid Crystal Composition of the Invention

Second, the liquid crystal composition will be further explained. The liquid crystal composition contains at least one compound selected from the group of formula (i) as component A. The liquid crystal composition may be a composition containing only component A or a composition of component A and one of other components, the name of which is not particularly shown in the specification. A liquid crystal composition having various characteristics can be provided by adding a component selected from components B, C, D and E shown below to component A.

As the component to be added to component A, component A is preferably mixed with component B including at least one compound selected from the group of formulas (2), (3) and (4), component C including at least one kind of compound selected from the group of formula (5), and component D including at least one compound selected from the group of formulas (6), (7), (8), (9), (10) and (11) or component E including at least one compound selected from formulas (12), (13) and (14). Each of the components can be appropriately combined and used depending on an aim of use of the composition.

Moreover, even when each component of the liquid crystal composition is an analog including an isotopic element of each element, the characteristics are not significantly different.

Preferred examples of component B include compounds (2-1) to (2-16), (3-1) to (3-112), and (4-1) to (4-54).

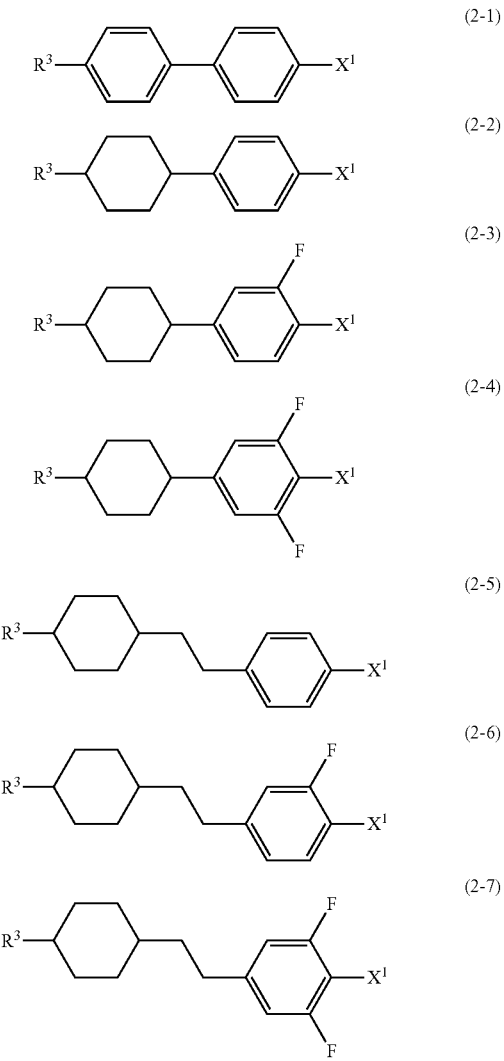

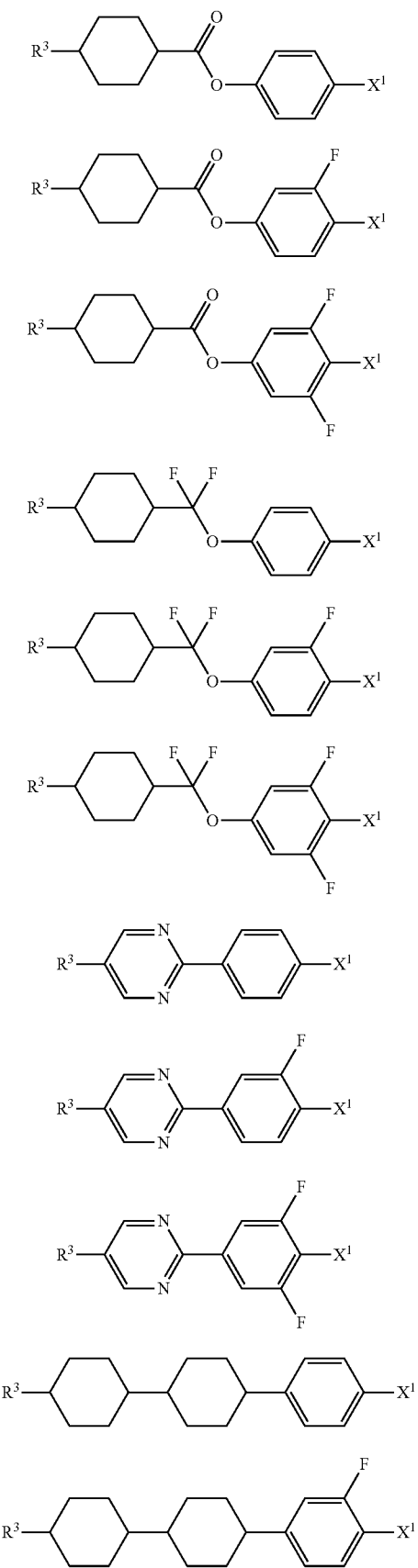
(2-8)
(2-9)
(2-10)
(2-11)
(2-12)
(2-13)
(2-14)
(2-15)
(2-16)
(3-1)
(3-2)
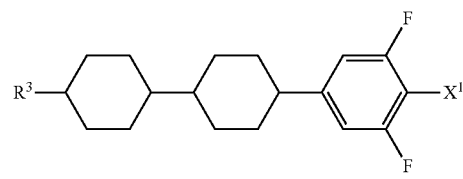
(3-3)
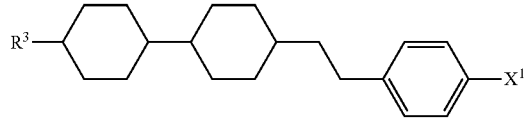
(3-4)
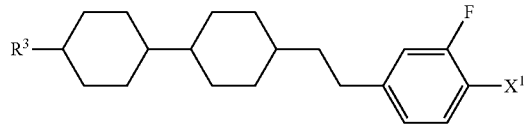
(3-5)
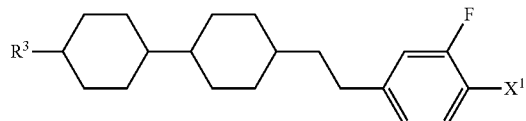
(3-6)
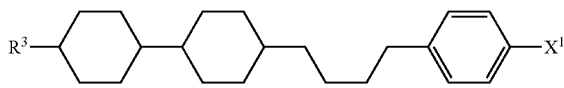
(3-7)
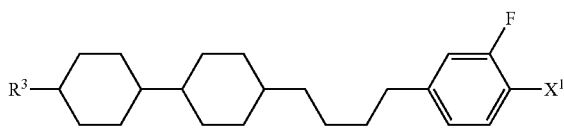
(3-8)
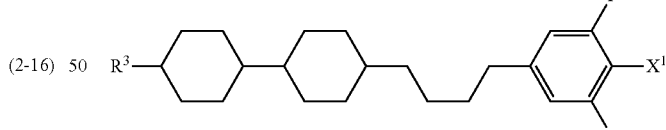
(3-9)
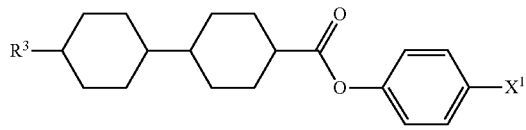
(3-10)
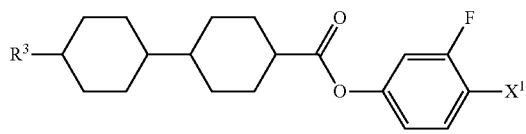
(3-11)

(3-12) 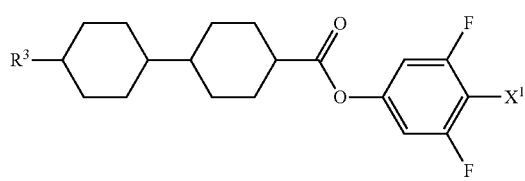
(3-13) 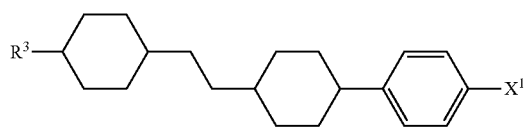
(3-14) 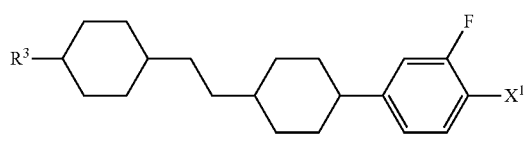
(3-15) 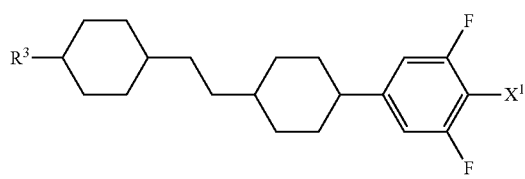
(3-16) 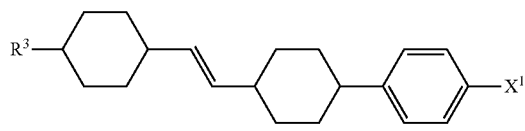
(3-17) 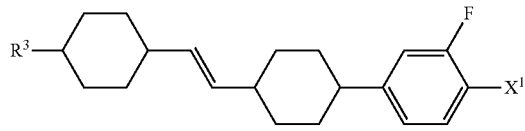
(3-18) 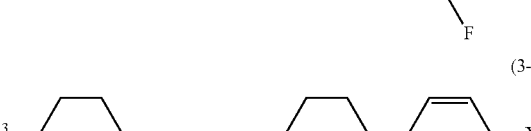
(3-19) 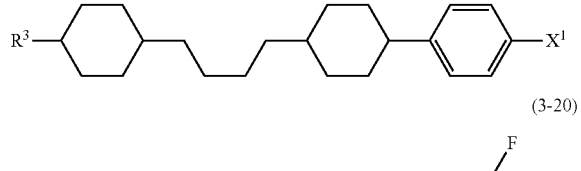
(3-20) 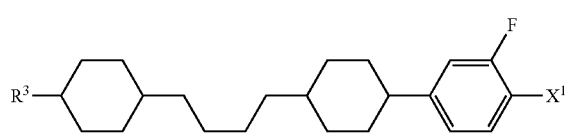
(3-21) 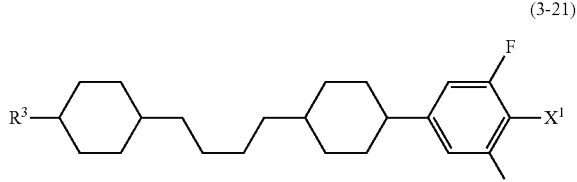
(3-22) 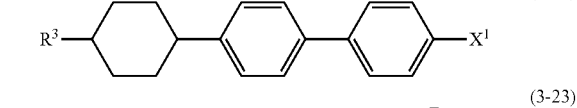
(3-23) 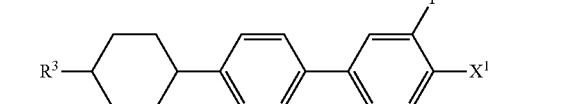
(3-24) 
(3-25) 
(3-26) 
(3-27) 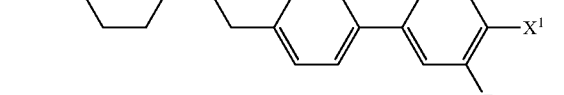
(3-28) 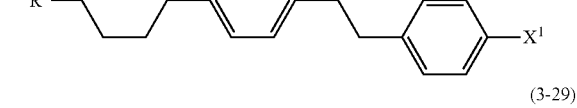
(3-29) 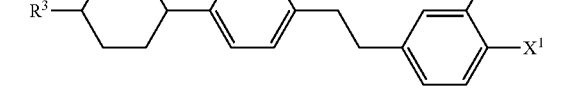
(3-30) 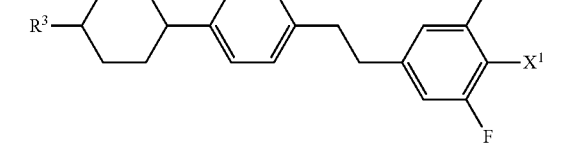

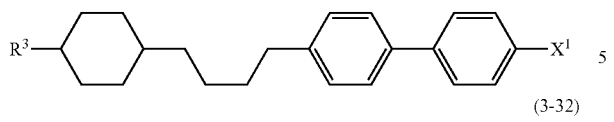
(3-31)
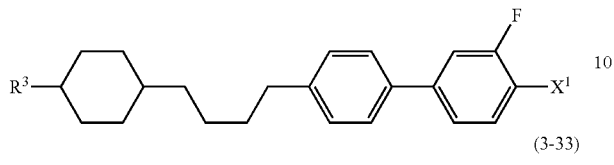
(3-32)
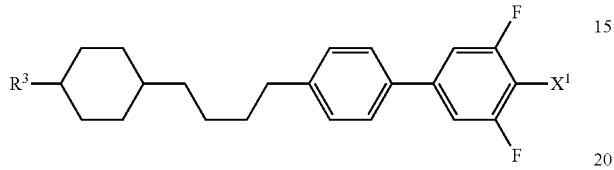
(3-33)
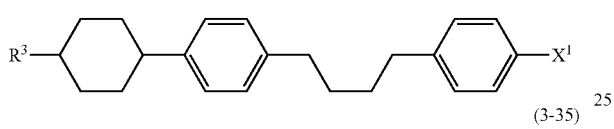
(3-34)
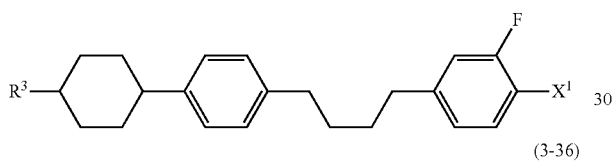
(3-35)
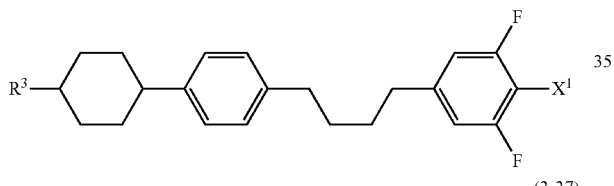
(3-36)
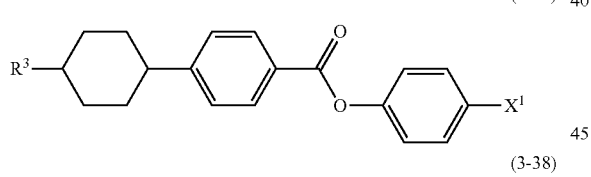
(3-37)
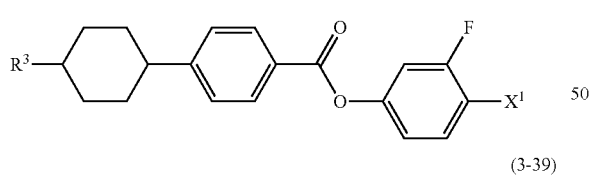
(3-38)
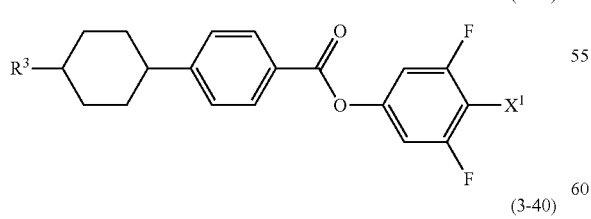
(3-39)
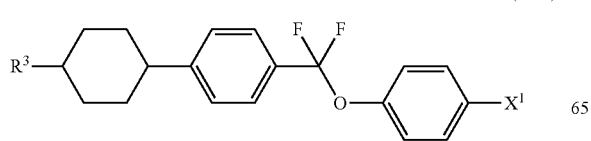
(3-40)
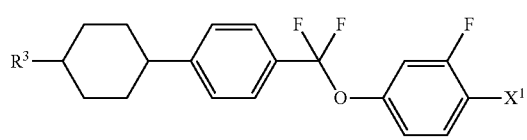
(3-41)
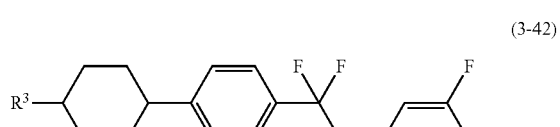
(3-42)
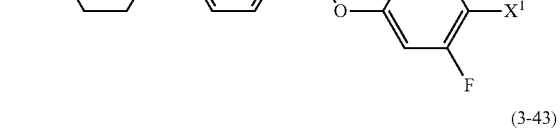
(3-43)
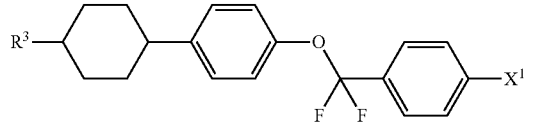
(3-44)
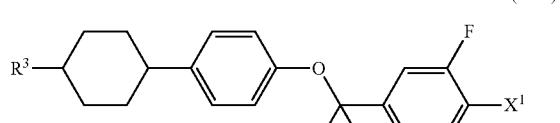
(3-45)
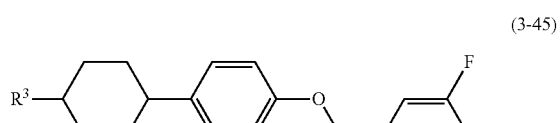
(3-46)
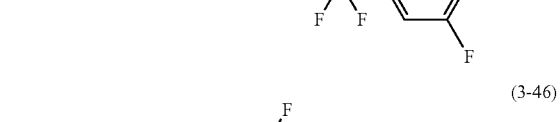
(3-47)
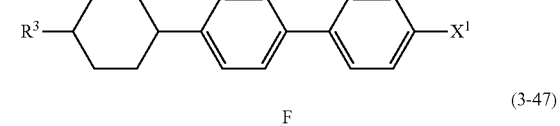
(3-48)
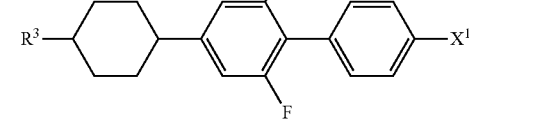
(3-49)

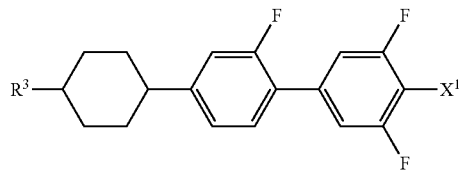
(3-50)
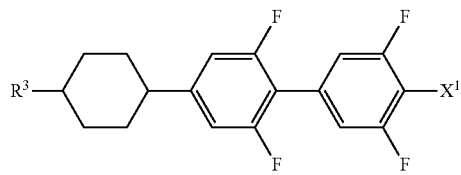
(3-51)
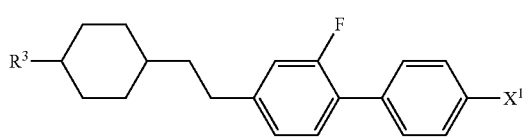
(3-52)
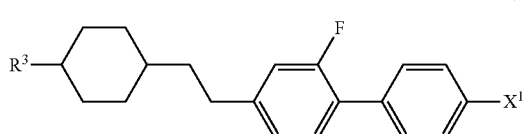
(3-53)
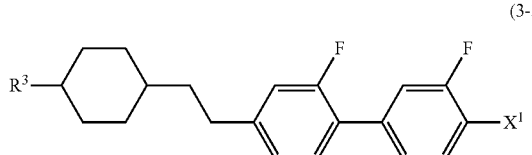
(3-54)
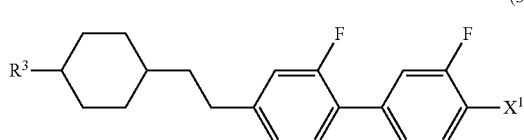
(3-55)
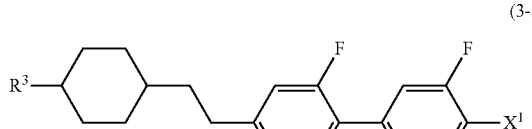
(3-56)
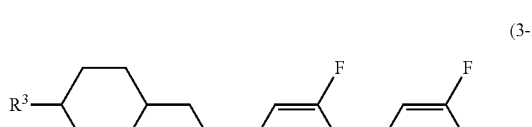
(3-57)
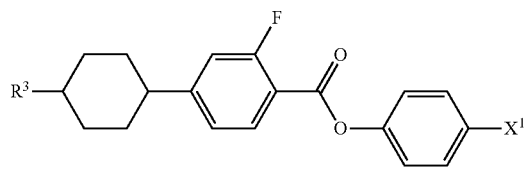
(3-58)
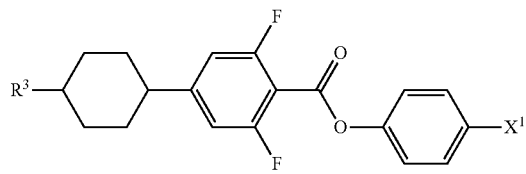
(3-59)
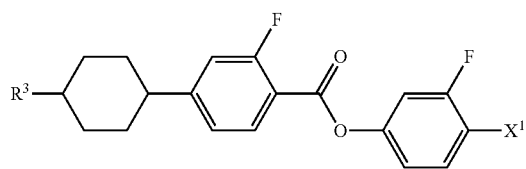
(3-60)
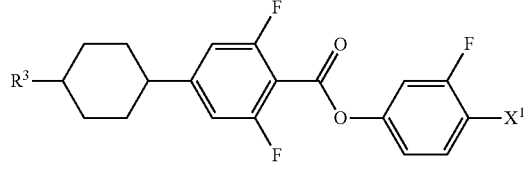
(3-61)
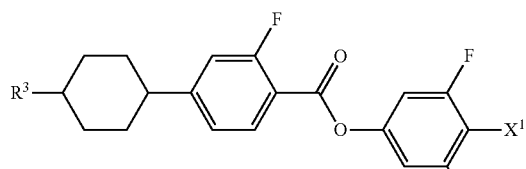
(3-62)
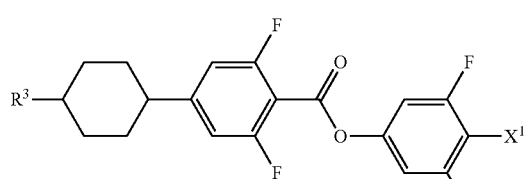
(3-63)
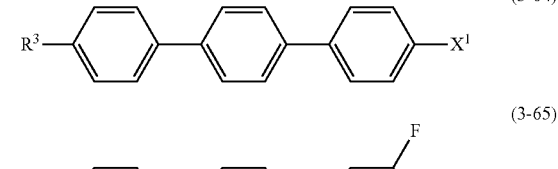
(3-64)
(3-65)

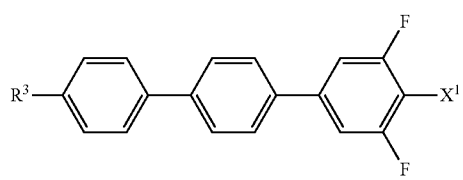
(3-66)
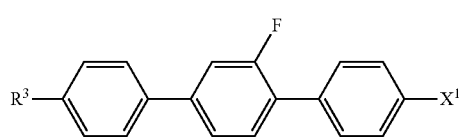
(3-67)
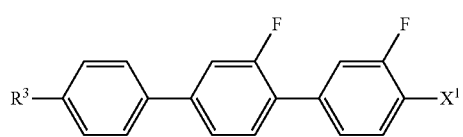
(3-68)
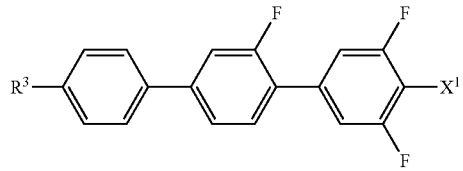
(3-69)
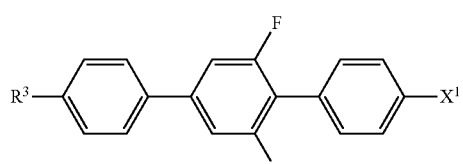
(3-70)
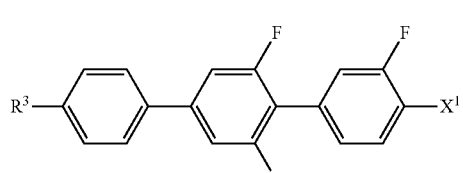
(3-71)
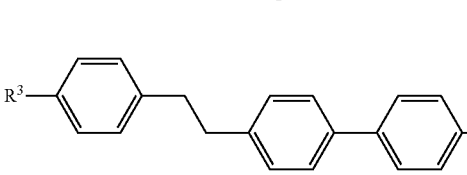
(3-72)
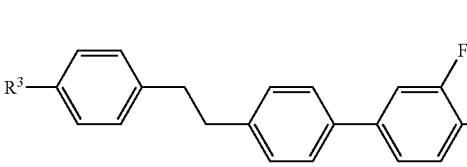
(3-73)
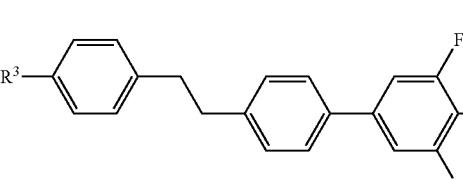
(3-74)
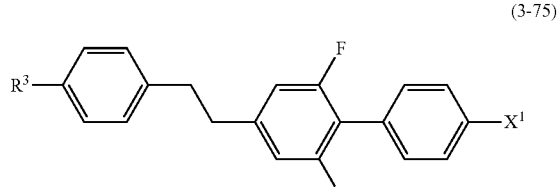
(3-75)
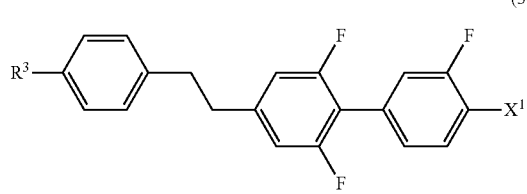
(3-76)
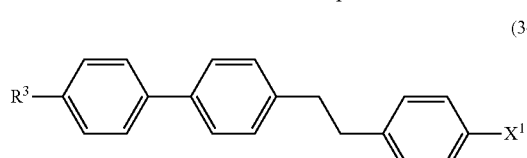
(3-77)
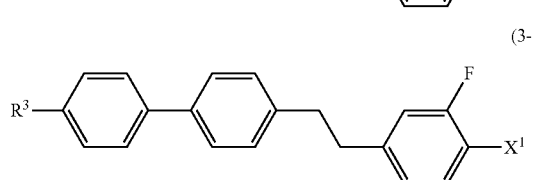
(3-78)
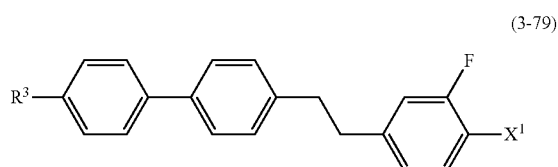
(3-79)
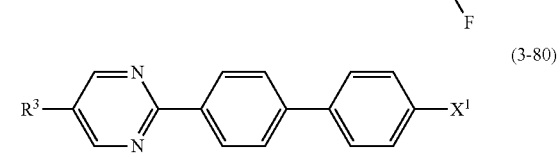
(3-80)
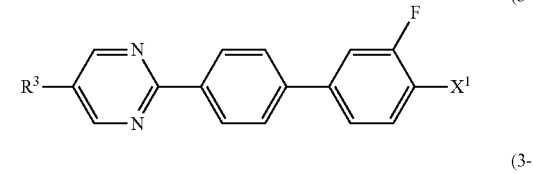
(3-81)
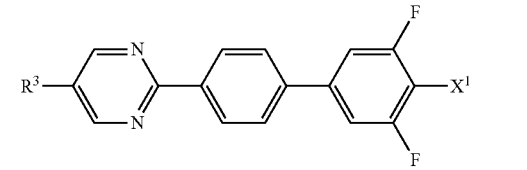
(3-82)
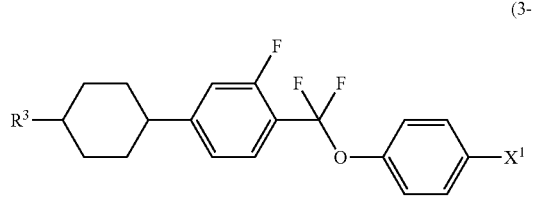
(3-83)

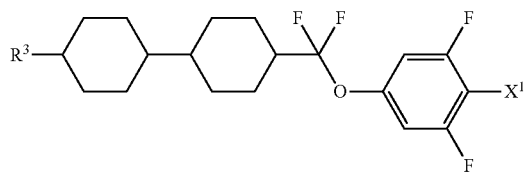
(3-100)
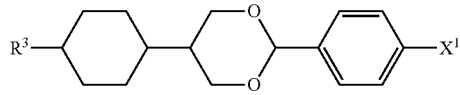
(3-101)
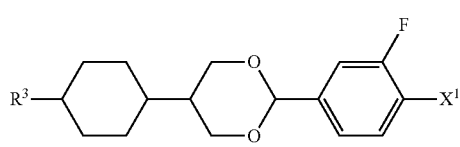
(3-102)
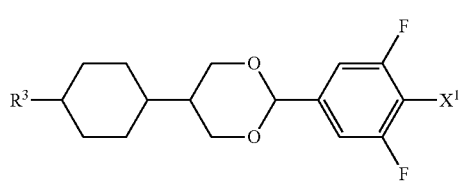
(3-103)
(3-104)
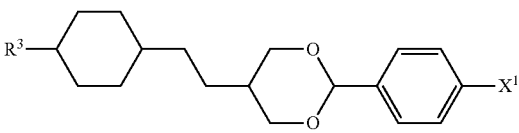
(3-105)
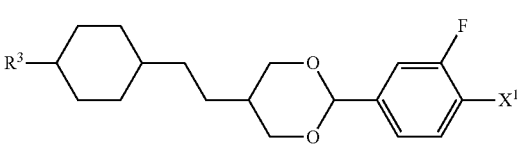
(3-106)
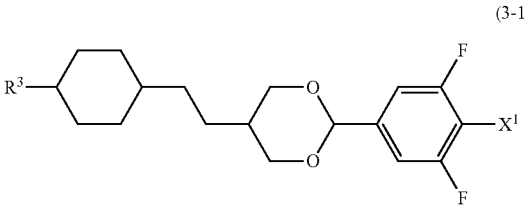
(3-107)
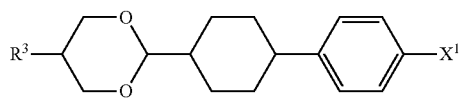
(3-108)
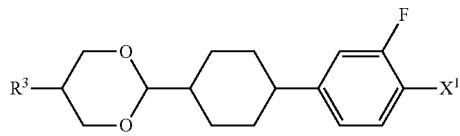
(3-109)
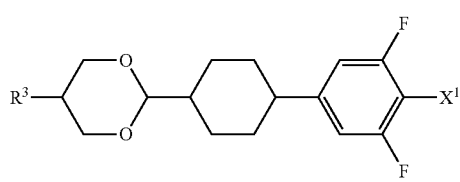
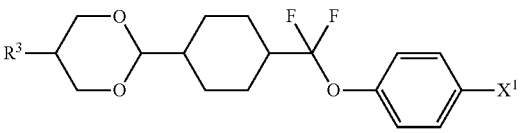
(3-110)
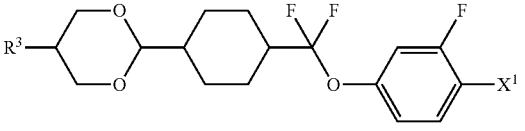
(3-111)
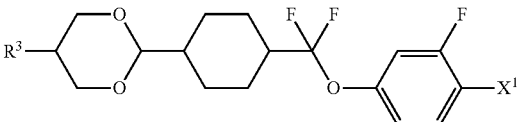
(3-112)
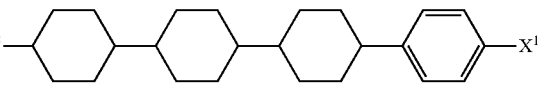
(4-1)
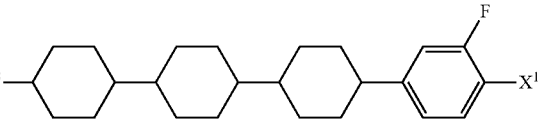
(4-2)
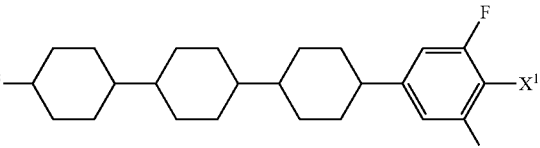
(4-3)
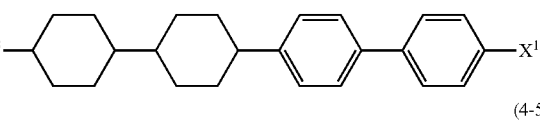
(4-4)
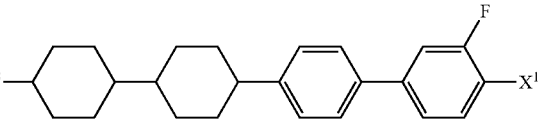
(4-5)
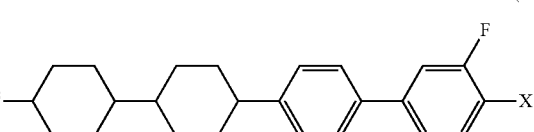
(4-6)
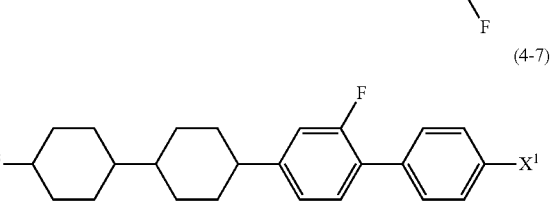
(4-7)

(4-8) 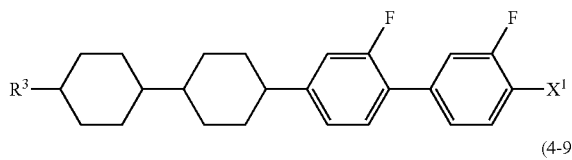
(4-9) 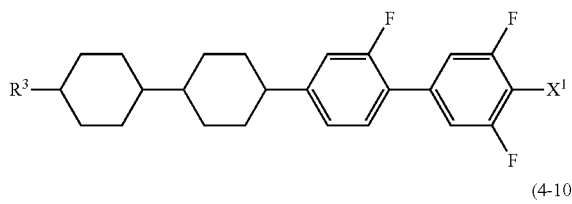
(4-10) 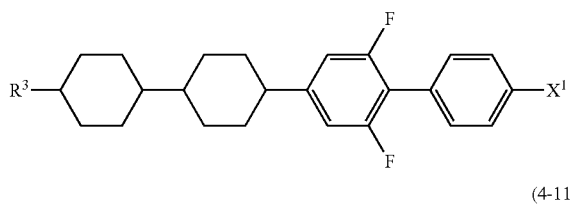
(4-11) 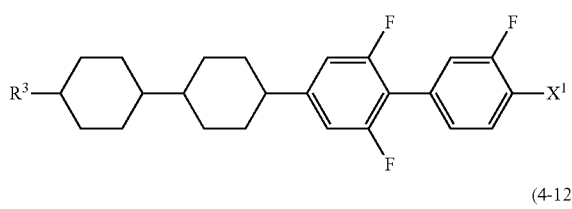
(4-12) 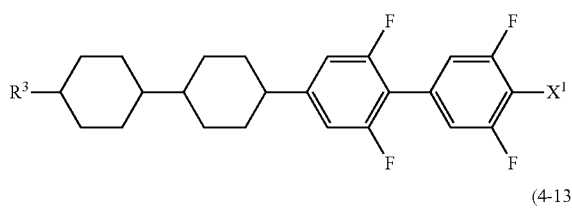
(4-13) 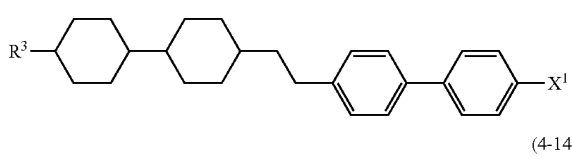
(4-14) 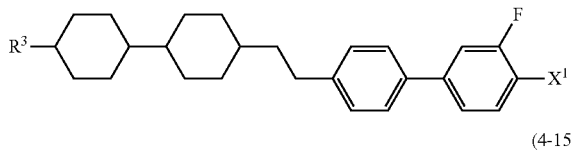
(4-15) 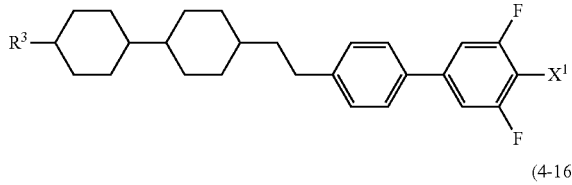
(4-16)
(4-17) 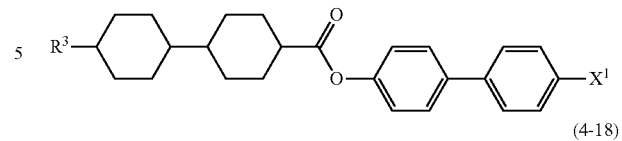
(4-18) 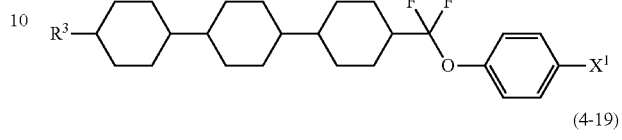
(4-19) 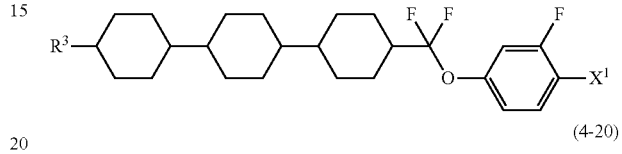
(4-20) 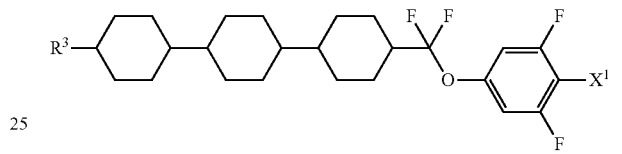
(4-21) 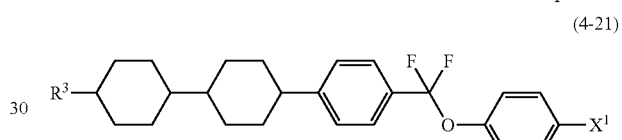
(4-22) 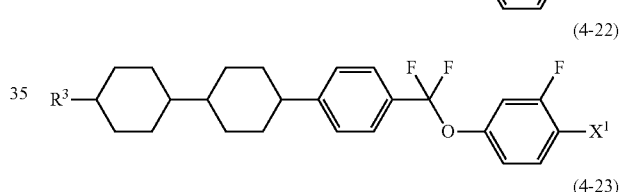
(4-23) 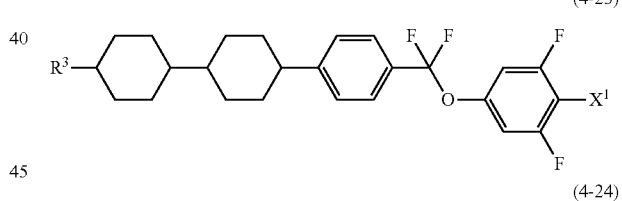
(4-24) 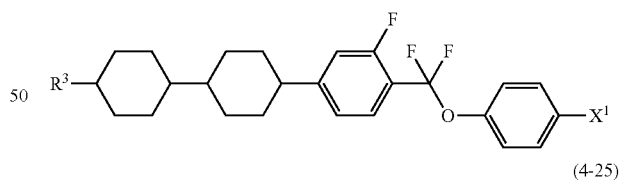
(4-25) 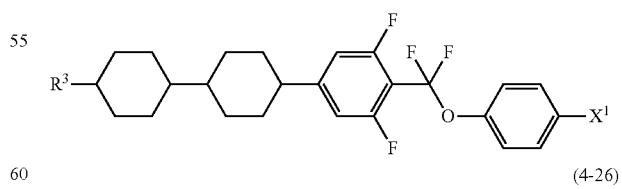
(4-26) 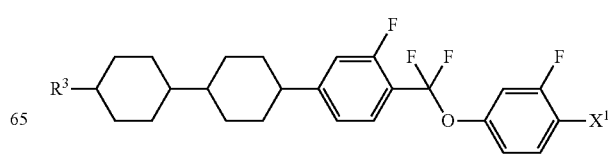

(4-27) 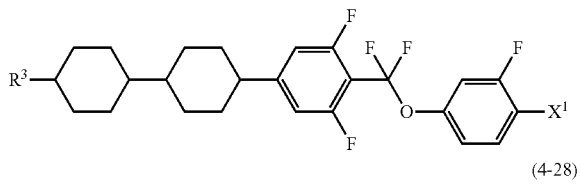
(4-28) 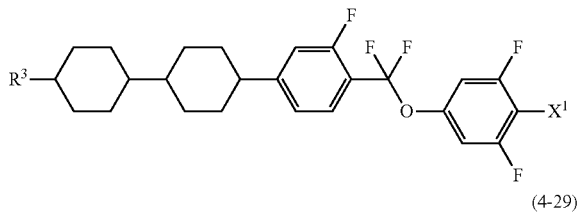
(4-29) 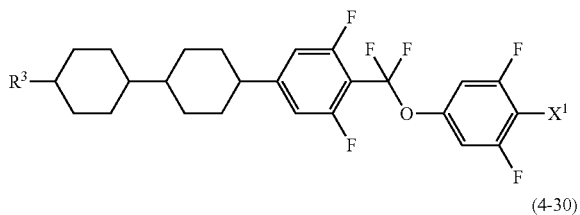
(4-30) 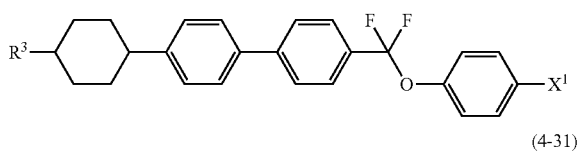
(4-31) 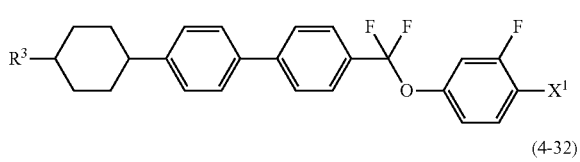
(4-32) 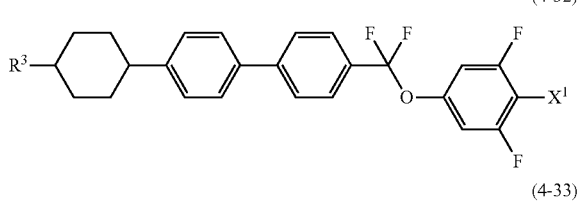
(4-33) 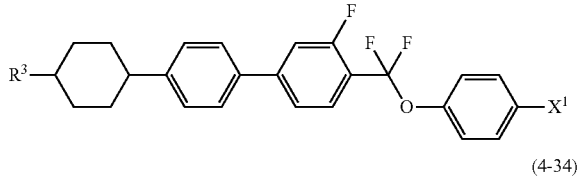
(4-34) 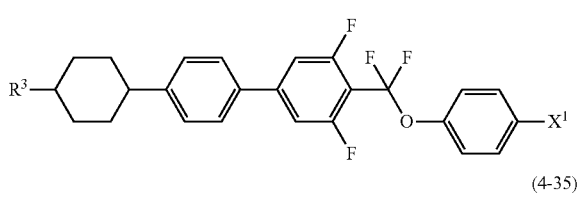
(4-35) 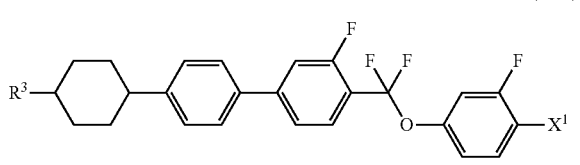
(4-36) 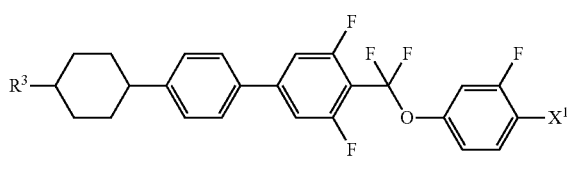
(4-37) 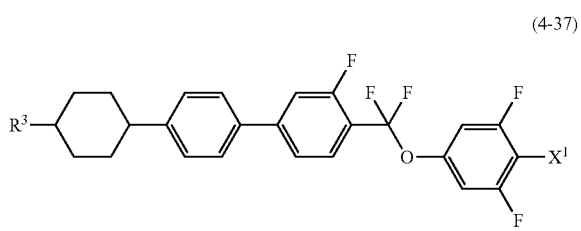
(4-38) 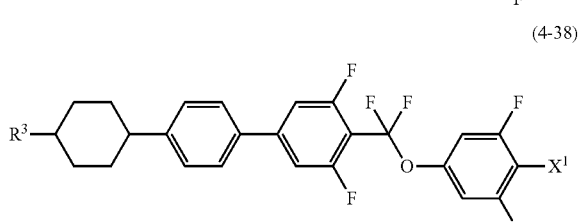
(4-39) 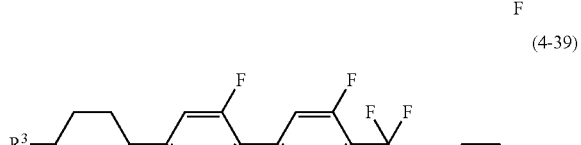
(4-40) 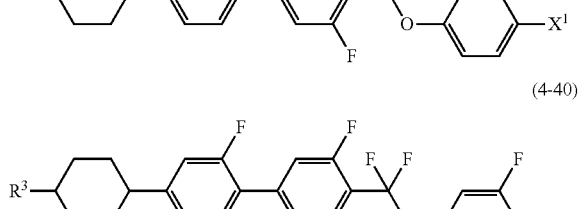
(4-41) 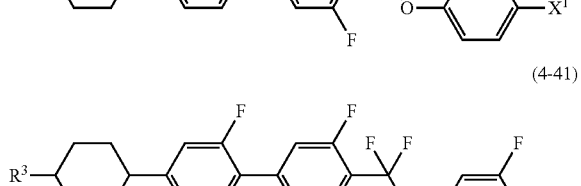
(4-42) 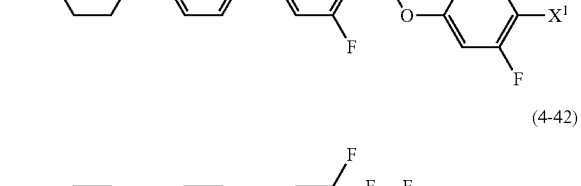
(4-43) 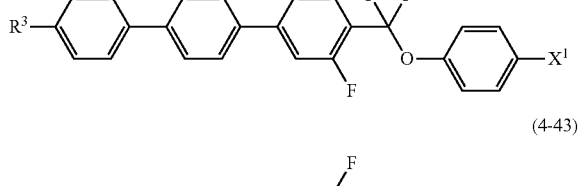
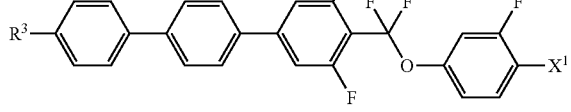

(4-44)
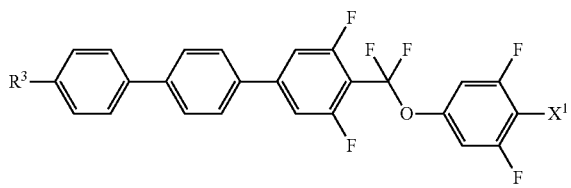

(4-45)
(4-46)
(4-47)
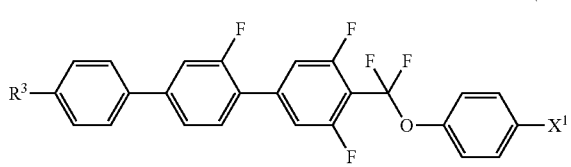

(4-48)
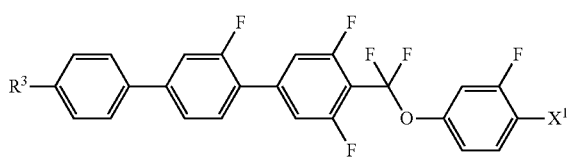

(4-49)
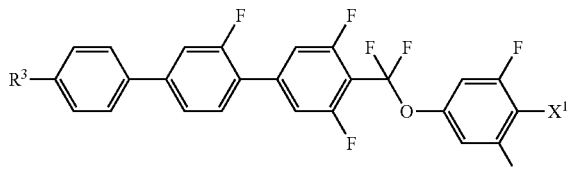

(4-50)
(4-51)
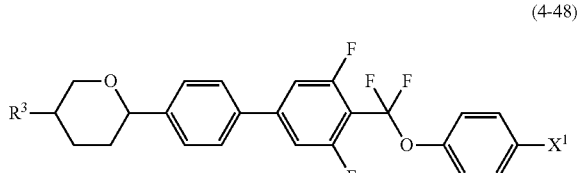
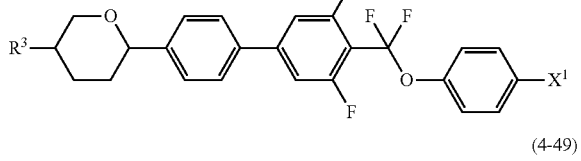

(4-52)
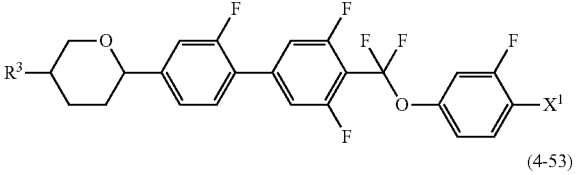

(4-53)
(4-54)
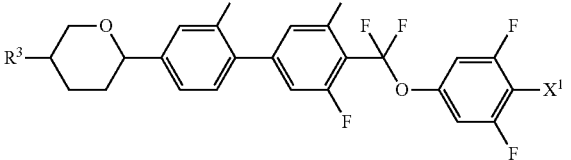

In the formulas, $R^3$ and $X^1$ are defined in the same way as described above.

The compounds represented by formulas (2) to (4), namely, component B, have a positive dielectric anisotropy and an exceptional heat stability and chemical stability, and therefore are used when preparing the liquid crystal composition for TFT and PSA. Content of component B in the liquid crystal composition is suitably in the range of 1 to 99% by weight, preferably, in the range of 10 to 97% by weight, further preferably, in the range of 40 to 95% by weight based on the total weight of the liquid crystal composition. Viscosity can be adjusted by further containing compounds (12) to (14) (component E).

Preferred examples of component C include compounds (5-1) to (5-64).

(5-1)
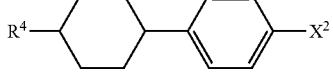

(5-2)
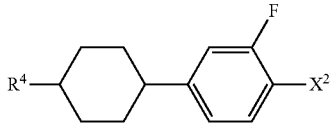

(5-3)
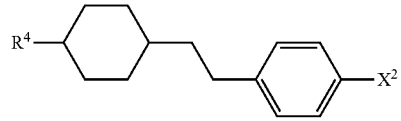

(5-4)
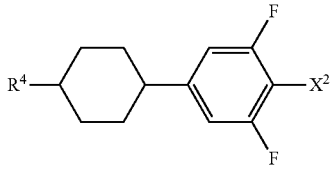

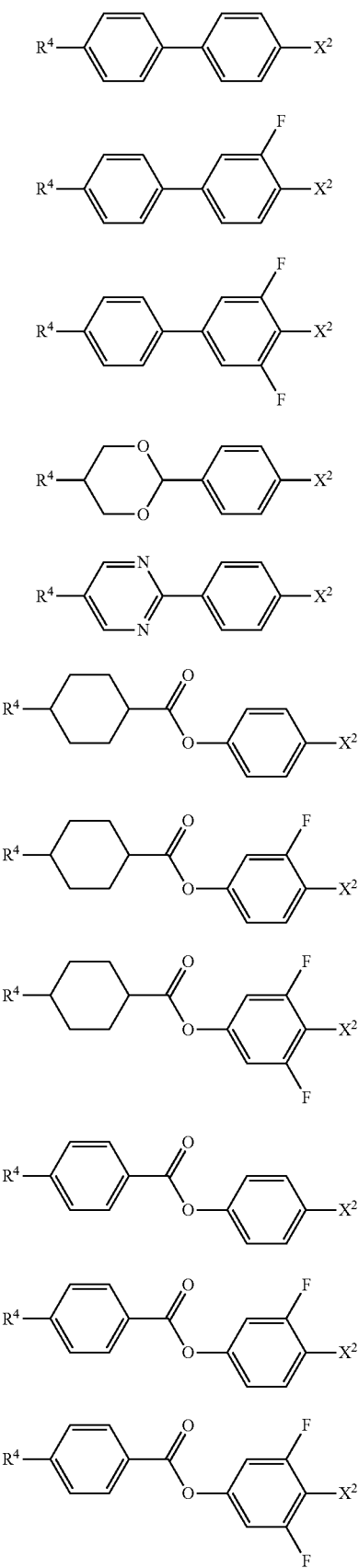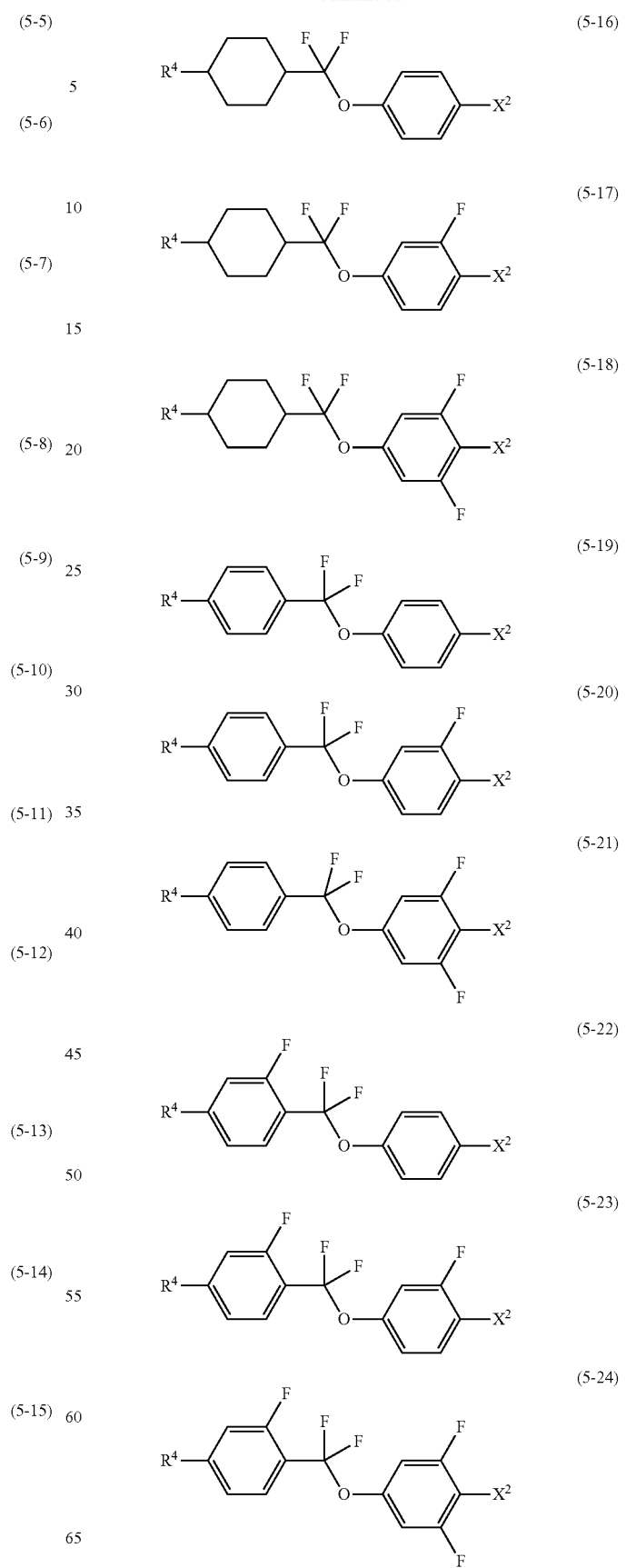

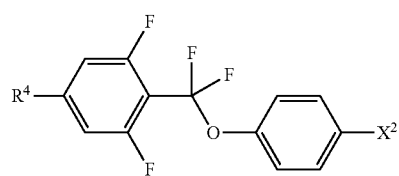 (5-25)
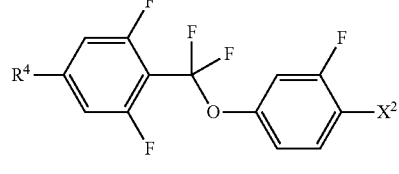 (5-26)
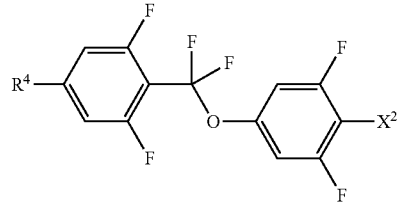 (5-27)
 (5-28)
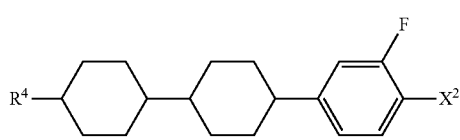 (5-29)
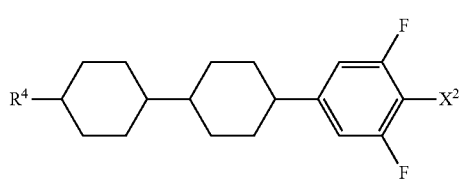 (5-30)
 (5-31)
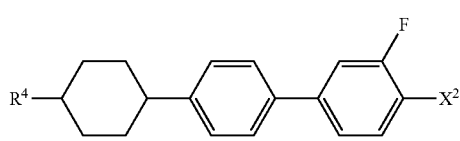 (5-32)
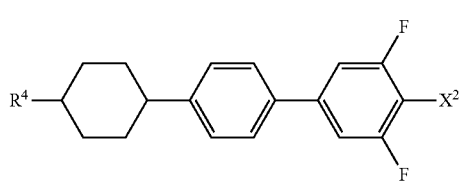 (5-33)
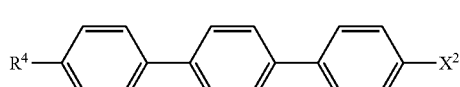 (5-34)
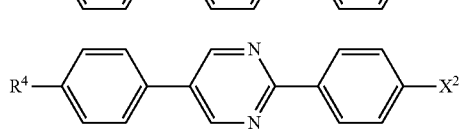 (5-35)
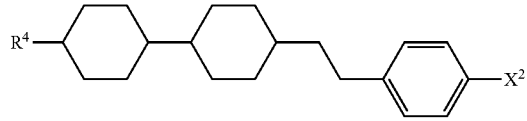 (5-36)
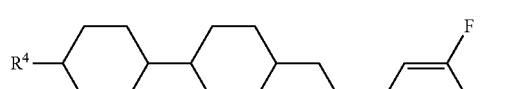 (5-37)
 (5-38)
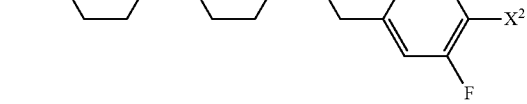 (5-39)
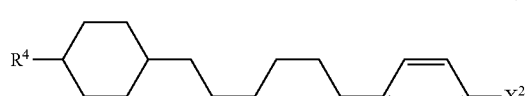 (5-40)
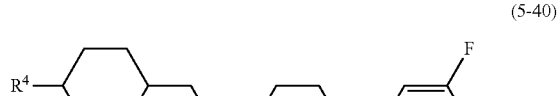 (5-41)
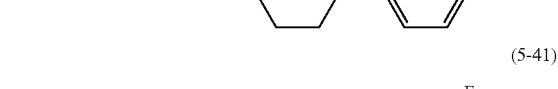 (5-42)
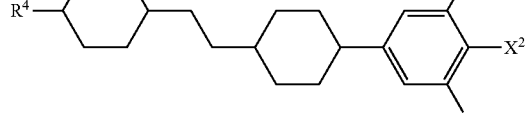 (5-43)
 (5-44)

(5-45) 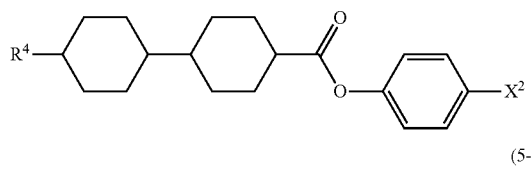
(5-46) 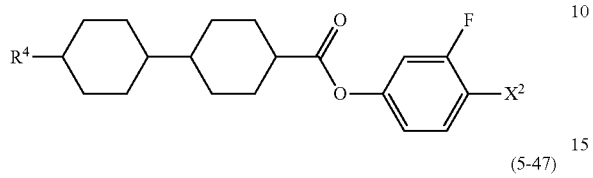
(5-47) 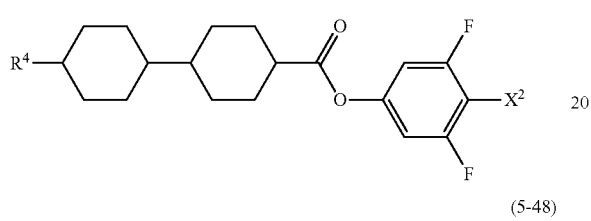
(5-48) 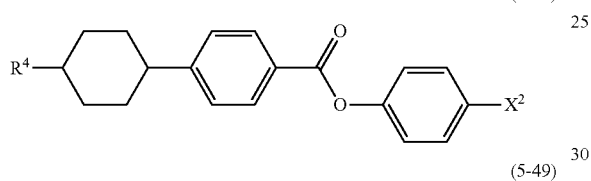
(5-49) 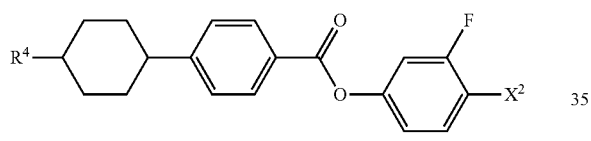
(5-50) 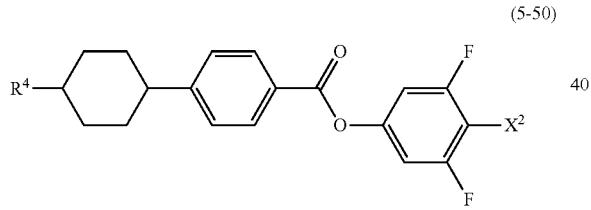
(5-51) 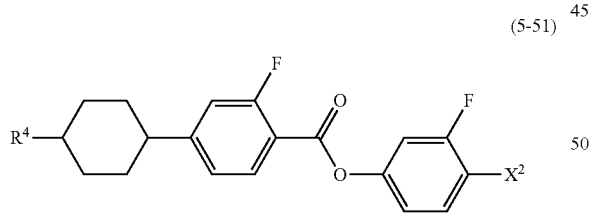
(5-52) 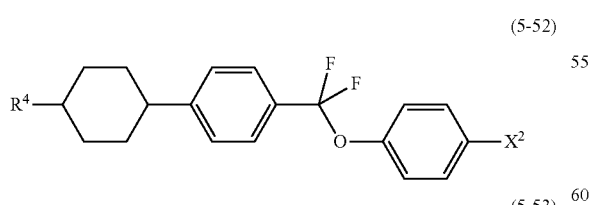
(5-53) 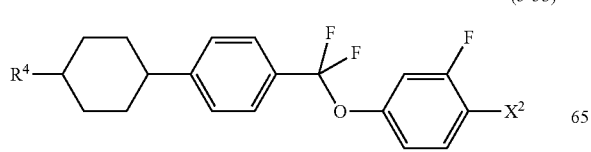
(5-54) 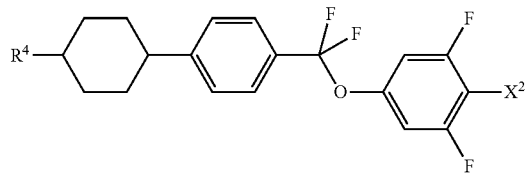
(5-55) 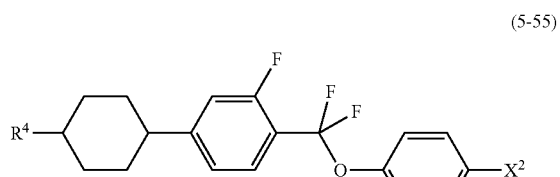
(5-56) 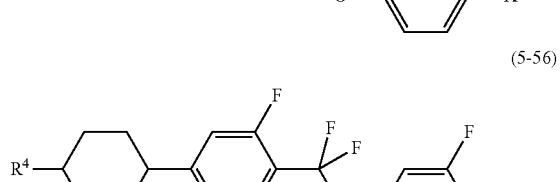
(5-57) 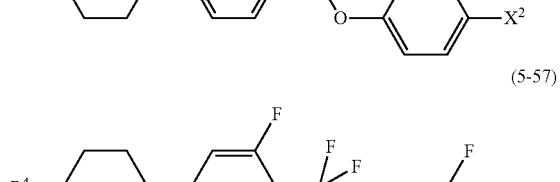
(5-58) 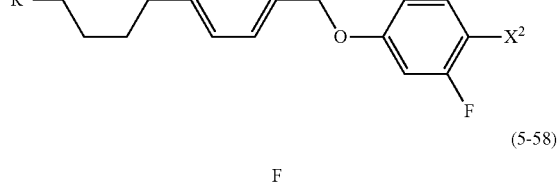
(5-59) 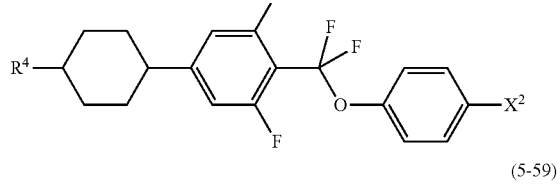
(5-60) 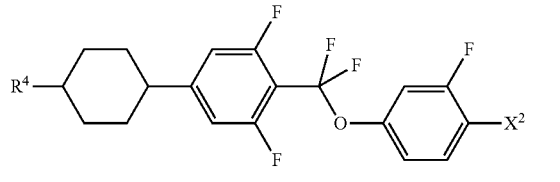
(5-61) 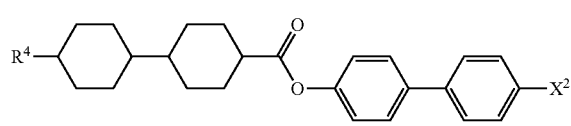

(5-62)
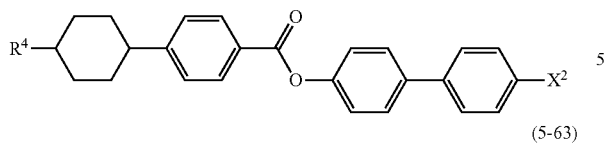

(5-63)
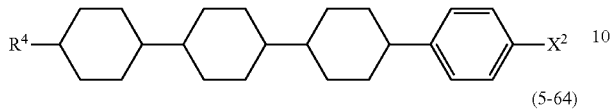

(5-64)
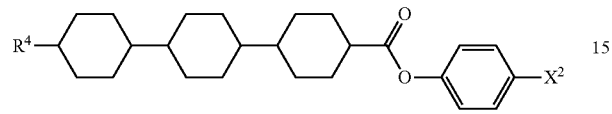

In the formulas, $R^4$ and $X^2$ are defined in the same way as described above.

The compounds (5), namely, component C, have a positive dielectric anisotropy and a very large value thereof, and therefore are mainly used when preparing the liquid crystal composition for an STN, TN or PSA mode. A threshold voltage of the composition can be decreased by containing the component C. Moreover, the viscosity and the optical anisotropy can be adjusted, and the temperature range of the liquid crystal phase can be extended. Furthermore, the composition can also be utilized for improvement of steepness.

When preparing the liquid crystal composition for the STN or TN mode, content of component C can be applied in the range of 0.1 to 99.9% by weight, preferably, in the range of 10 to 97% by weight, further preferably in the range of 40 to 95% by weight. Moreover, the threshold voltage, the temperature range of the liquid crystal phase, the optical anisotropy, the dielectric anisotropy, the viscosity and so forth can be adjusted by mixing the component described later.

Compounds (6) to (11), namely, component D, are preferred when preparing a liquid crystal composition having a negative dielectric anisotropy to be used for a vertical alignment mode (VA mode), a polymer sustained alignment mode (PSA mode) and so forth.

Specific suitable examples of the compounds (6) to (11), namely, component D, include compounds (6-1) to (6-6), (7-1) to (7-15), (8-1), (9-1) to (9-3), (10-1) to (10-11) and (11-1) to (11-10).

(6-1)
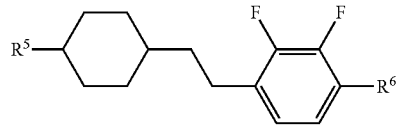

(6-2)
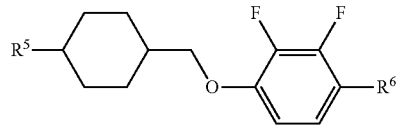

(6-3)
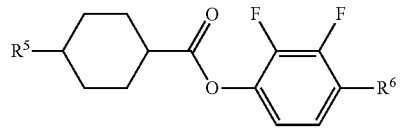

(6-4)
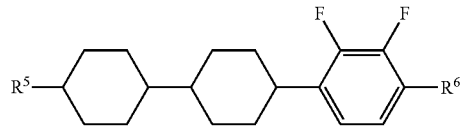

(6-5)
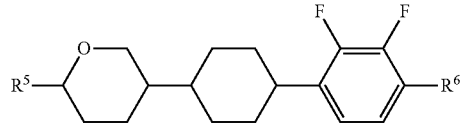

(6-6)
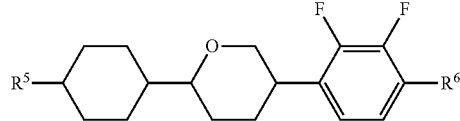

(7-1)
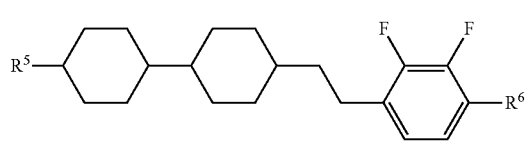

(7-2)
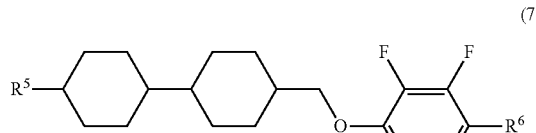

(7-3)
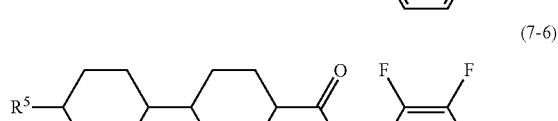

(7-4)
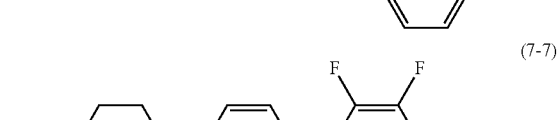

(7-5)
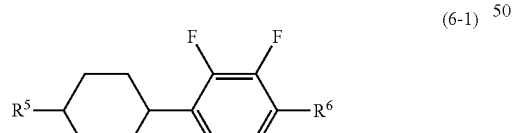

(7-6)
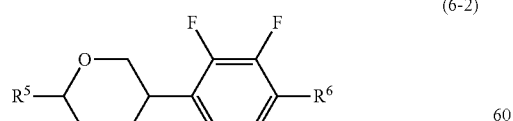

(7-7)
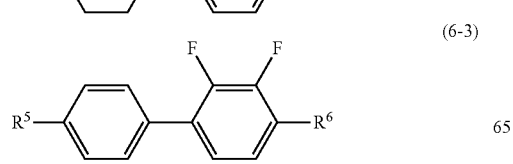

(7-8)
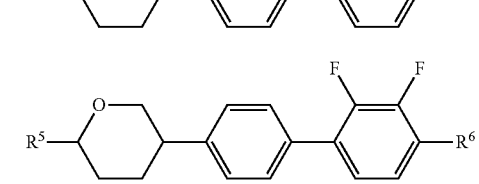

(7-9) 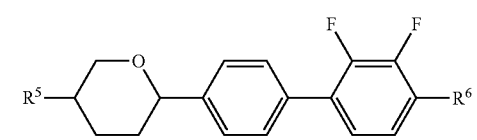
(7-10) 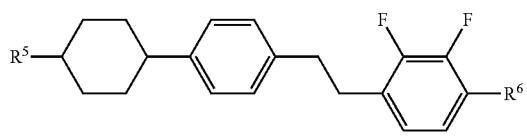
(7-11) 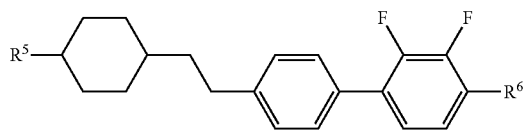
(7-12) 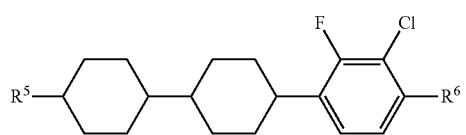
(7-13) 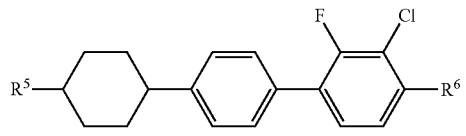
(7-14) 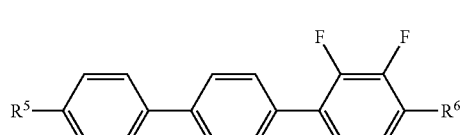
(7-15) 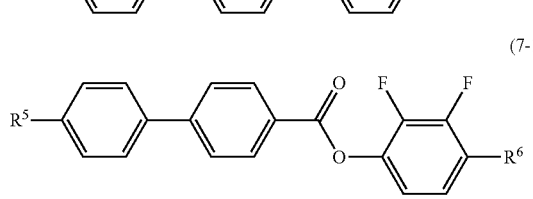
(8-1) 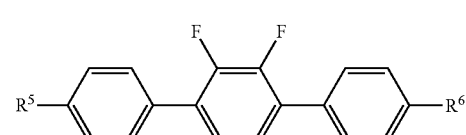
(9-1) 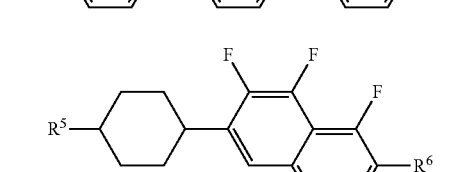
(9-2) 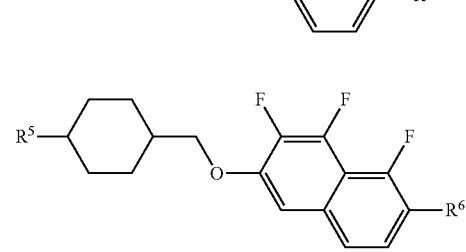
(9-3) 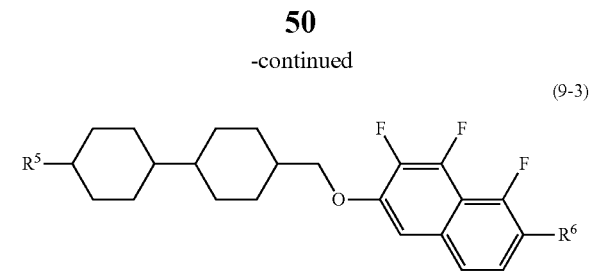
(10-1) 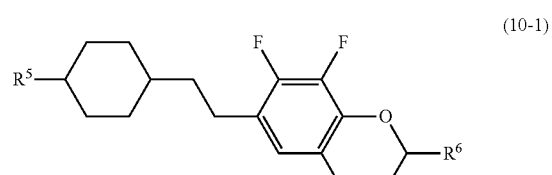
(10-2) 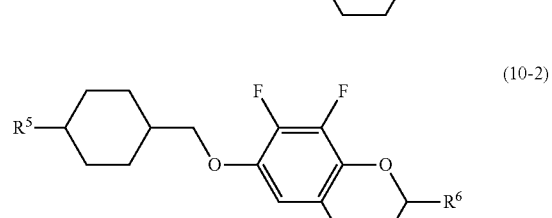
(10-3) 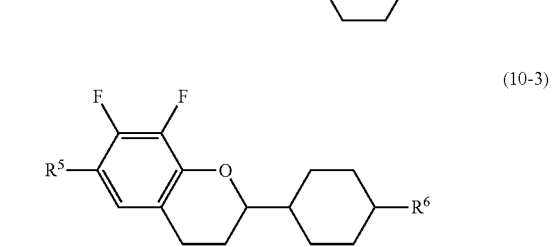
(10-4) 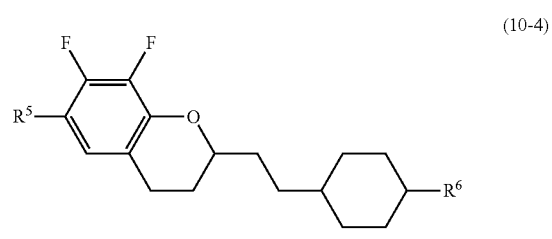
(10-5) 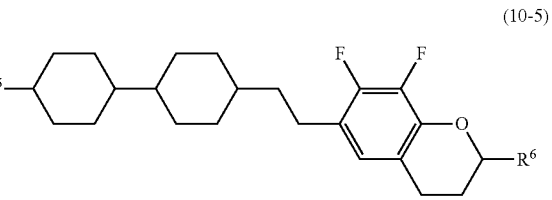
(10-6) 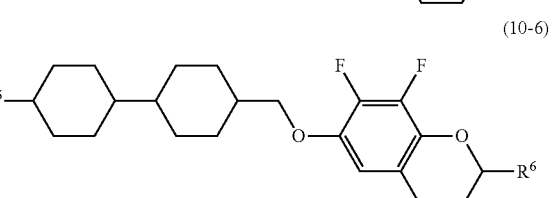
(10-7) 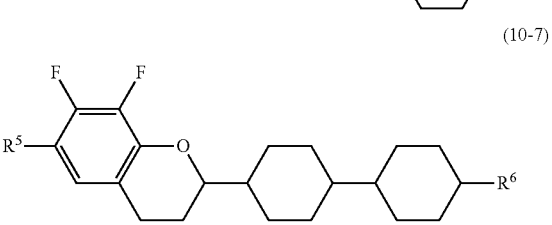

(10-8)
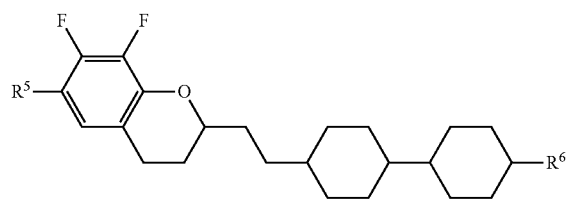

(10-9)
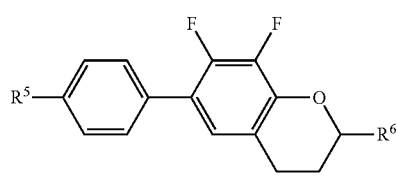

(10-10)
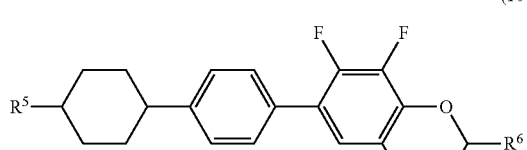

(10-11)
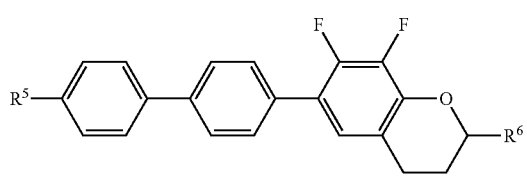

(11-1)
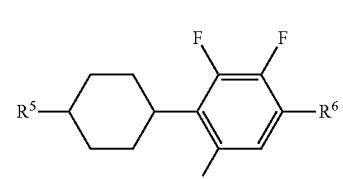

(11-2)
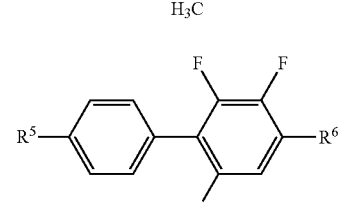

(11-3)
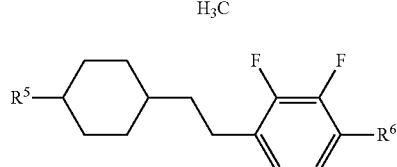

(11-4)
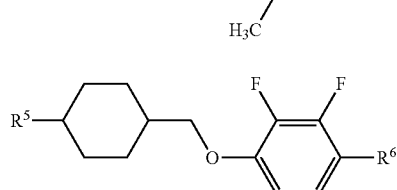

(11-5)
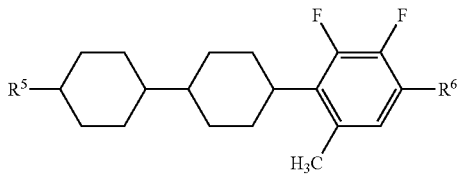
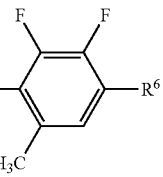

(11-6)
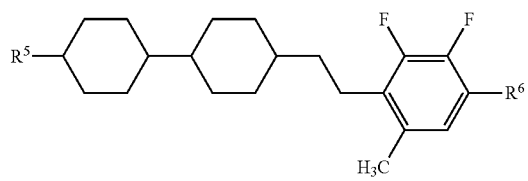

(11-7)
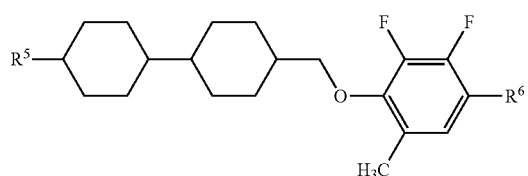

(11-8)
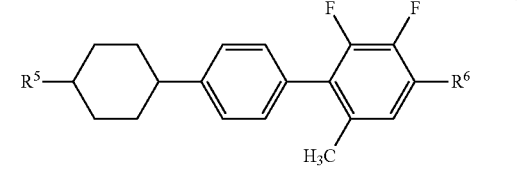

(11-9)
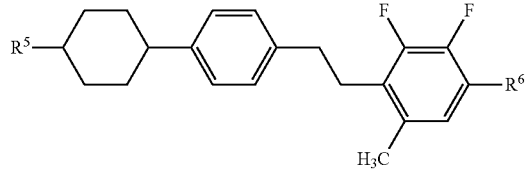

(11-10)
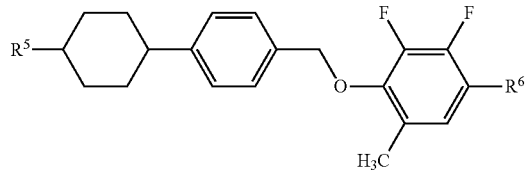

In the formulas, $R^5$ and $R^6$ are defined in the same way as described above.

The compounds of component D are mainly used for the liquid crystal composition for the VA mode or PSA mode in which a value of dielectric anisotropy is negative. If the content is increased, the threshold voltage of the composition is decreased but the viscosity is increased, and therefore the content is preferably decreased as long as a required value of the threshold voltage is satisfied.

Compound (6) of component D is a two-ring compound, and therefore mainly has an effect of adjusting the threshold voltage, the viscosity or the optical anisotropy. Moreover, compounds (7) and (8) are a three-ring compound, and therefore an effect on increasing a clearing point, extending the temperature range of the nematic phase, decreasing the threshold voltage, increasing the optical anisotropy and so forth is obtained. Moreover, compounds (9), (10) and (11) have an effect of decreasing the threshold voltage and so forth.

When preparing the composition for the VA mode or PSA mode, content of component D is preferably in the range of 40 to 99% by weight, further preferably, in the range of 50 to 95% by weight based on the total amount of the composition. The elastic constant can be controlled and a voltage-transmittance curve of the composition can be controlled by mixing component D. When mixing component D with the composition having the positive dielectric anisotropy, the content thereof is preferably 30% by weight or less based on the total amount of the composition.

Specific preferred examples of compounds (12), (13) and (14) (component E) include compounds (12-1) to (12-11), (13-1) to (13-19) and (14-1) to (14-6), respectively.

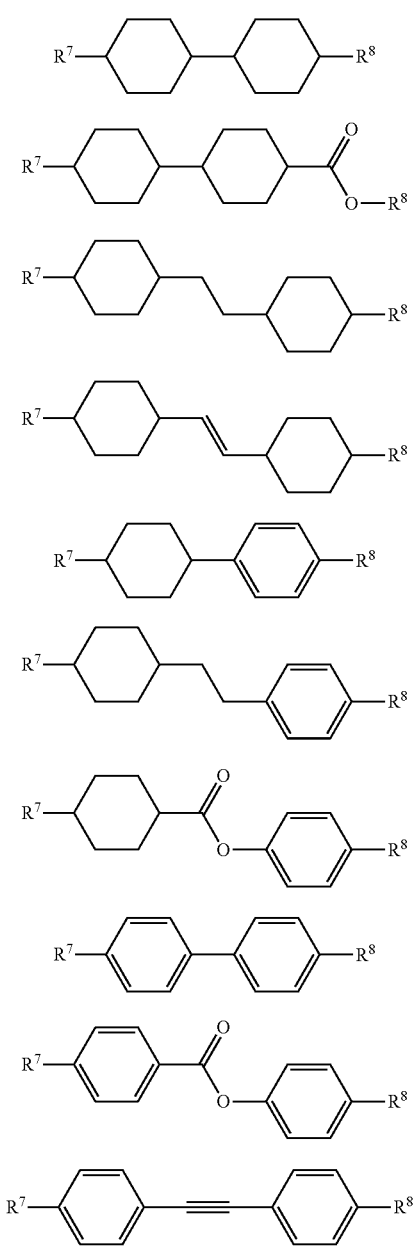

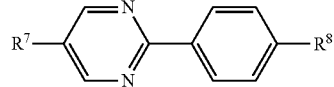

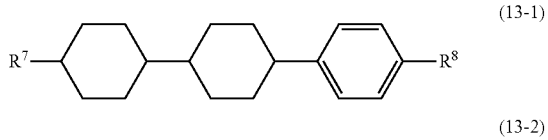

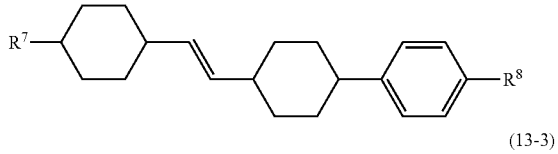

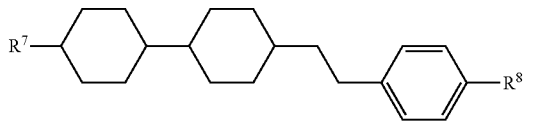

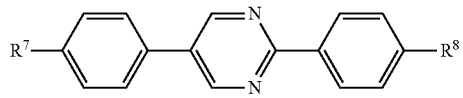
(13-12)

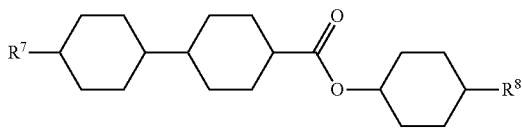
(13-13)

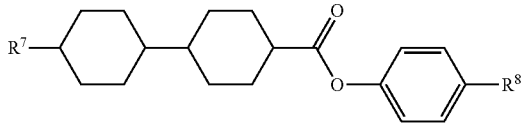
(13-14)

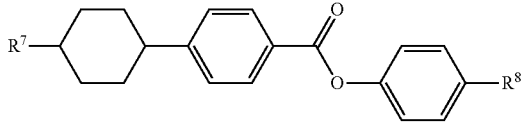
(13-15)

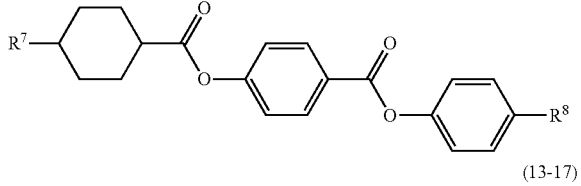
(13-16)

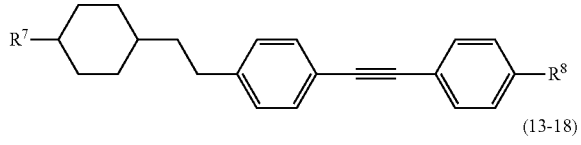
(13-17)

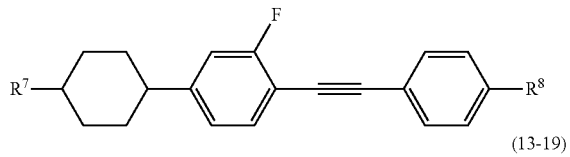
(13-18)

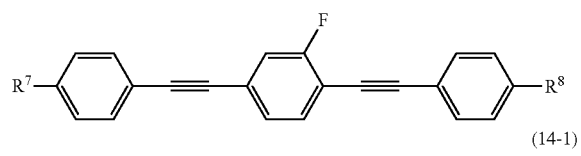
(13-19)

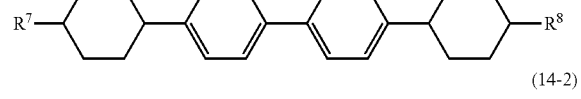
(14-1)

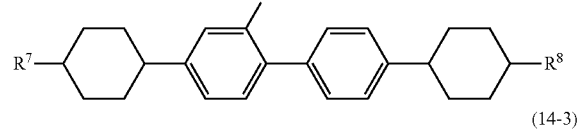
(14-2)

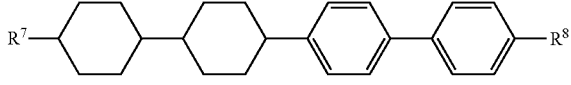
(14-3)

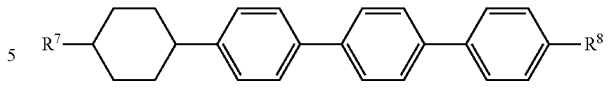
(14-4)

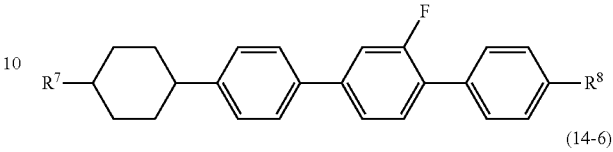
(14-5)

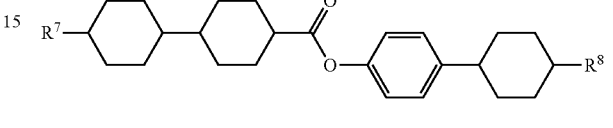
(14-6)

In the formulas, $R^7$ and $R^8$ are defined in the same way as described above.

Compounds (12) to (14) (component E) have a small absolute value of dielectric anisotropy and are close to neutrality. The threshold voltage, the temperature range of the liquid crystal phase, the optical anisotropy, the dielectric anisotropy, the viscosity and so forth can be adjusted by mixing component E.

Compound (12) mainly has an effect of adjusting the viscosity or the optical anisotropy, and compounds (13) and (14) have an effect of extending the temperature range of the nematic phase, such as increasing the clearing point, or an effect of adjusting the optical anisotropy.

If content of the compound being component E is increased, the threshold voltage of the liquid crystal composition is increased and the viscosity is decreased, and therefore the content is desirably high as long as a required value of the threshold voltage of the liquid crystal composition is satisfied. When preparing the liquid crystal composition for TFT or PSA, the content of component E is preferably 30% by weight or more, further preferably, 50% by weight or more based on the total amount of the composition. Moreover, when preparing the liquid crystal composition for TN, STN or PSA, the content of component E is preferably 30% by weight or more, further preferably, 40% by weight or more based on the total amount of the composition.

The liquid crystal composition preferably contains at least one of compound (i) at a ratio in the range of 0.1 to 99% by weight in order to keep excellent characteristics.

The liquid crystal composition can be generally prepared by known methods, for example, a method of dissolving a required component under a high temperature. Moreover, according to an application, an additive well known to those skilled in the art is added, and thus a liquid crystal composition containing an optically active compound or a polymerizable compound or a polymerization initiator, or a liquid crystal composition for a GH mode in which a dye is added can be prepared. Ordinarily, the additive is well known to those skilled in the art and is described in literatures or the like in detail.

The liquid crystal composition may further contain at least one optically active compound.

As the optically active compound, a publicly known chiral dopant is added. The chiral dopant has an effect of inducing a helical structure of liquid crystals to adjust a required twist angle, and to prevent an inverted twist. Specific examples of the chiral dopant include the optically active compounds as described below.

(Op-1)
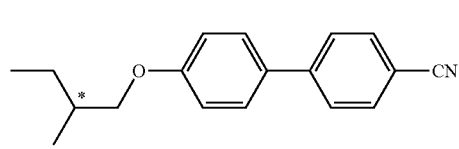
(Op-2)
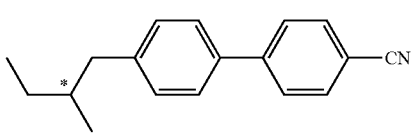
(Op-3)
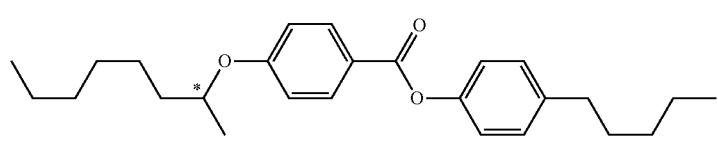
(Op-4)
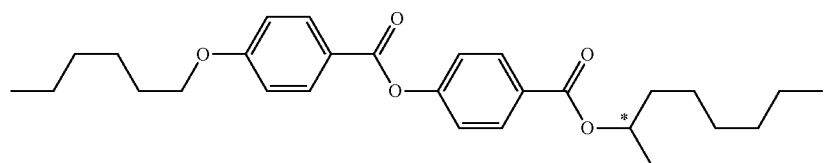
(Op-5)
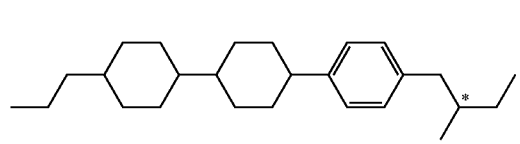
(Op-6)
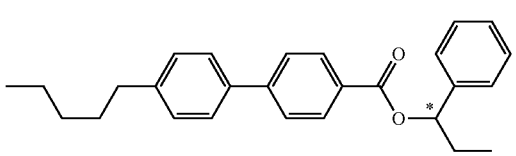
(Op-7)
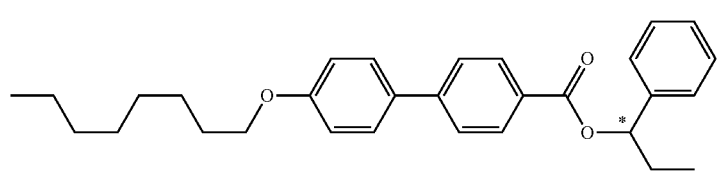
(Op-8)
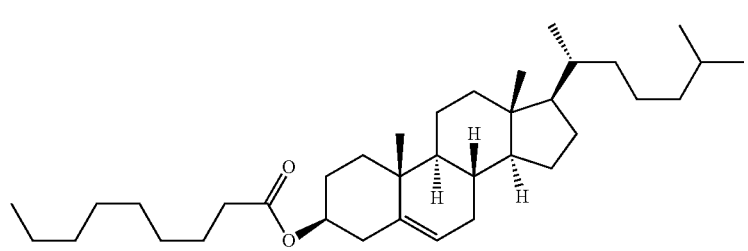
(Op-9)
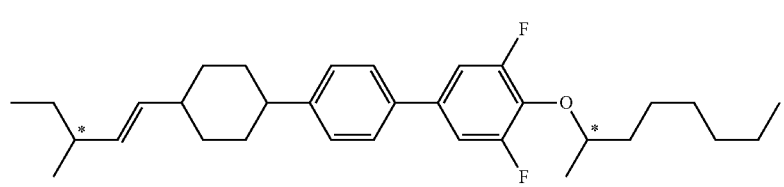
(Op-10)
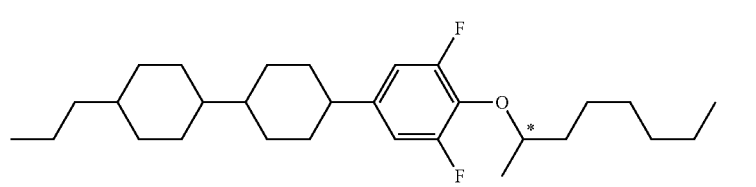
(Op-11)
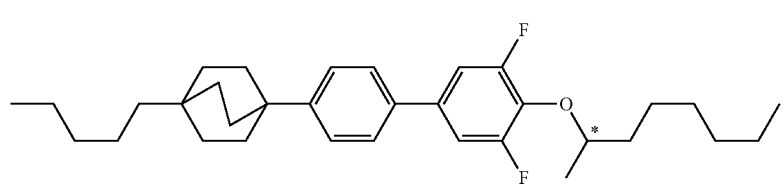

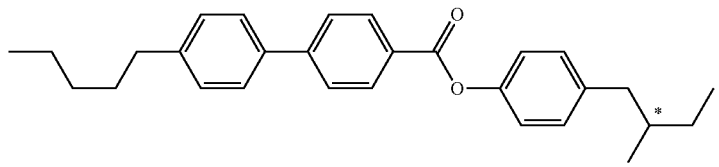
(Op-12)

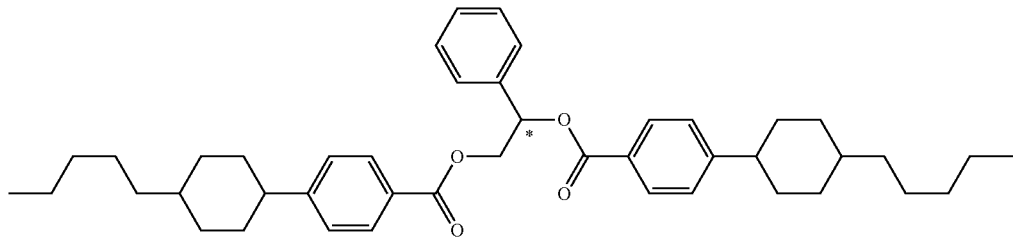
(Op-13)

For the liquid crystal composition, the optically active compounds are ordinarily added and a helical pitch is adjusted. In the case of the liquid crystal composition for TFT and TN, the helical pitch is preferably adjusted in the range of 40 to 200 micrometers. In the case of the liquid crystal composition for STN, the helical pitch is preferably adjusted in the range of 6 to 20 micrometers. In the case of a bistable TN mode, the helical pitch is preferably adjusted in the range of 1.5 to 4 micrometers. Moreover, two or more kinds of optically active compounds may be added for the purpose of adjusting temperature dependency of a pitch.

If a dichroic dye such as a merocyanine, styryl, azo, azomethine, azoxy, quinophthalone, anthraquinone or tetrazine dye is added, the liquid crystal composition can also be used as a liquid crystal composition for a GH mode.

The liquid crystal composition can also be used for NCAP prepared by microencapsulating nematic liquid crystals, a polymer dispersed liquid crystal display device (PDLCD) prepared by forming a three-dimensional network-polymer in liquid crystals, including a polymer network liquid crystal display device (PNLCD), for example, and for an electrically controlled birefringence (ECB) or a DS mode.

When an ultraviolet absorber or an antioxidant is added to the liquid crystal composition concerning the invention, deterioration of the liquid crystal composition and the liquid crystal display device containing the liquid crystal composition can be prevented. For example, the antioxidant can suppress a decrease of a value of specific resistance, when the liquid crystal composition is heated.

Specific examples of the ultraviolet absorber include a benzophenone ultraviolet absorber, a benzoate ultraviolet absorber and a triazole ultraviolet absorber.

Specific examples of the benzophenone ultraviolet absorber include 2-hydroxy-4-n-octoxybenzophenone.

Specific examples of the benzoate ultraviolet absorber include 2,4-di-t-butylphenyl-3,5-di-t-butyl-4-hydroxy benzoate.

Specific examples of the triazole ultraviolet absorber include 2-(2-hydroxy-5-methylphenyl)benzotriazole, 2-[2-hydroxy-3-(3,4,5,6-tetrahydroxyphthalimide-methyl)-5-methylphenyl]benzotriazole and 2-(3-t-butyl-2-hydroxy-5-methylphenyl)-5-chlorobenzotriazole.

Specific examples of the antioxidant include a phenolic antioxidant and an organosulfur antioxidant.

In particular, from a viewpoint of a high antioxidant effect without changing the characteristics of the liquid crystal composition, an antioxidant being compound (15) is preferred.

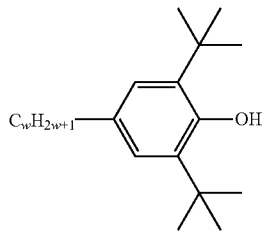
(15)

In formula (15), w is an integer from 1 to 15.

In compound (15), preferred w is 1, 3, 5, 7 or 9. Further preferred w is 1 or 7. Compound (15) where w is 1 is effective when preventing a decrease of a specific resistance caused by heating in air because the compound (15) has a large volatility. Compound (15) where w is 7 is effective in maintaining a large voltage holding ratio at room temperature and also at a temperature close to the maximum temperature of the nematic phase after the device has been used for a long period of time.

Specific examples of the phenolic antioxidant include 2,6-di-t-butyl-4-methylphenol, 2,6-di-t-butyl-4-ethylphenol, 2,6-di-t-butyl-4-propylphenol, 2,6-di-t-butyl-4-butylphenol, 2,6-di-t-butyl-4-pentylphenol, 2,6-di-t-butyl-4-hexylphenol, 2,6-di-t-butyl-4-heptylphenol, 2,6-di-t-butyl-4-octylphenol, 2,6-di-t-butyl-4-nonylphenol, 2,6-di-t-butyl-4-decylphenol, 2,6-di-t-butyl-4-undecylphenol, 2,6-di-t-butyl-4-dodecylphenol, 2,6-di-t-butyl-4-tridecylphenol, 2,6-di-t-butyl-4-tetradecylphenol, 2,6-di-t-butyl-4-pentadecylphenol, 2,2'-methylenebis(6-t-butyl-4-methylphenol), 4,4'-butylidenebis(6-t-butyl-3-methylphenol), 2,6-di-t-butyl-4-(2-octadecyloxycarbonyl)ethylphenol, and pentaerythritoltetrakis[3-(3,5-di-t-butyl-4-hydroxyphenyl)propionate].

Specific examples of the organosulfur antioxidant include dilauryl-3,3'-thiopropionate, dimyristyl-3,3'-thiopropionate, distearyl-3,3'-thiopropionate, pentaerythritoltetrakis(3-laurylthiopropionate) and 2-mercaptobenzimidazole.

For an amount of addition of the additive typified by the ultraviolet absorber and the antioxidant, the additive can be added and used within the range of amount where an aim of the invention is not adversely affected and an aim for adding the additive can be attained.

For example, when adding the ultraviolet absorber or the antioxidant, a ratio of the addition is ordinarily in the range of 10 ppm to 500 ppm, preferably, in the range of 30 to 300 ppm, further preferably, in the range of 40 to 200 ppm based on the total weight of the liquid crystal composition concerning the invention.

In addition, the liquid crystal composition concerning the invention may contain impurities such as a raw material for synthesis, a by-product, a reactional solvent and a synthesis catalyst mixed in a process for synthesizing each compound constituting the liquid crystal composition, and a process for preparing the liquid crystal composition.

The polymerizable compound is mixed with the composition to be adapted for the device having the polymer sustained alignment (PSA) mode. Preferred examples of the polymerizable compound include a compound having a polymerizable group such as acrylate, methacrylate, vinyl, vinyloxy, propenyl ether, epoxy (oxirane, oxetane) and vinyl ketone. Particularly preferred examples include an acrylate derivative or a methacrylate derivative. A preferred ratio of the polymerizable compound is 0.05% by weight or more for achieving the effect thereof, and 10% by weight or less for avoiding a poor display. A further preferred ratio is in the range of 0.1% by weight to 2% by weight. The polymerizable compound is preferably polymerized by irradiation with ultraviolet light or the like in the presence of a suitable initiator such as a photopolymerization initiator. Suitable conditions for polymerization, suitable types of the initiator and suitable amounts thereof are known to those skilled in the art and are described in literatures. For example, Irgacure 651 (registered trademark), Irgacure 184 (registered trademark) or Darocure 1173 (registered trademark) (Ciba Japan K.K.), each being a photoinitiator, is suitable for radical polymerization. The polymerizable compound contains the photopolymerization initiator, preferably, in the range of 0.1% by weight to 5% by weight. The polymerizable compound contains the photopolymerization initiator, particularly preferably, in the range of 1% by weight to 3% by weight.

The liquid crystal composition concerning the invention can be prepared, for example, by mixing and shaking individual compounds when the compound constituting each component is a liquid, or by mixing individual compounds and converting the mixture into a liquid in each other by dissolution and heating the compounds when the compound contains a solid. Moreover, the liquid crystal composition concerning the invention can also be prepared by other publicly known methods.

When the liquid crystal composition concerning the invention is used, the maximum temperature of the nematic phase is allowed to be 70° C. or higher and the minimum temperature of the nematic phase to be −20° C. or lower, and thus the temperature range of the nematic phase is wide. Accordingly, the liquid crystal display device containing the liquid crystal composition can be used in a wide temperature range.

When the liquid crystal composition concerning the invention is applied, the liquid crystal composition having the optical anisotropy in the range of 0.05 to 0.18, preferably, in the range of 0.09 to 0.13 can be obtained by appropriately adjusting the composition and so forth. The liquid crystal composition in the numerical value range can be suitably used as the liquid crystal display device to be operated according to the TN mode, STN mode or TFT mode.

Moreover, when the liquid crystal composition concerning the invention is applied, the liquid crystal composition having the dielectric anisotropy, ordinarily, in the range of −5.0 to −2.0, preferably, in the range of −4.5 to −2.5 can be obtained. The liquid crystal composition in the numerical value range can be suitably used as the liquid crystal display device to be operated according to the IPS mode, VA mode or PSA mode.

Liquid Crystal Display Device of the Invention

The liquid crystal composition concerning the invention can be used not only for a liquid crystal display device having an operating mode such as the PC mode, TN mode, STN mode or OCB mode to be driven according to an AM mode, but also for a liquid crystal display device having the operating mode such as the PC mode, TN mode, STN mode, OCB mode, VA mode, IPS mode or PSA mode to be driven according to a passive matrix (PM) mode.

The liquid crystal display devices according to the AM mode and the PM mode can also be applied to any of liquid crystal displays according to a reflective type, a transmissive type and a transreflective type.

The liquid crystal composition concerning the invention can also be used for a dynamic scattering (DS) mode device prepared by using a liquid crystal composition in which a conducting agent is added, a nematic curvilinear aligned phase (NCAP) device prepared by microencapsulating the liquid crystal composition, a polymer dispersed (PD) device in which a three-dimensional network-polymer is formed in the liquid crystal composition, and a polymer network (PN) device, for example.

Above all, the liquid crystal composition concerning the invention has the characteristics as described above, and therefore can be used suitably for the liquid crystal display device according to the AM mode prepared by utilizing the liquid crystal compositions having the negative dielectric anisotropy to be driven according to the operating mode such as the VA mode, IPS mode, or PSA mode, particularly suitably, for the liquid crystal display device according to the AM mode to be driven according to the VA mode.

In addition, a direction of an electric field is perpendicular to a glass substrate surface in the liquid crystal display device to be driven according to the TN mode, VA mode or PSA mode. On the other hand, the direction of the electric field is parallel to the substrate surface in the liquid crystal display device to be driven according to the IPS mode and so forth. Structure of the liquid crystal display device to be driven according to the VA mode is reported in K. Ohmuro, S. Kataoka, T. Sasaki and Y. Koike, SID '97 Digest of Technical Papers, 28, 845 (1997), and structure of the liquid crystal display device to be driven according to the IPS mode is reported in WO 91/10936 A (family: U.S. Pat. No. 5,576,867 B).

EXAMPLES

Examples of Compound (i)

In the following, the invention will be explained in more detail by way of Examples, but the invention is not limited by the Examples. In addition, unless otherwise noted, "%" is expressed in terms of "% by weight." A compound obtained was identified using a nuclear magnetic resonance spectrum obtained by $^1$H NMR analysis, a gas chromatogram obtained by gas chromatography (GC) analysis and so forth. Measurement was carried out according to a method as described later. In addition, C stands for crystals, SA stands for a smectic A phase, SB stands for a smectic B phase, SX stands for a smectic phase having an unanalyzed phase structure, N stands for a nematic phase, I stands for an isotropic phase, and all units of a phase transition temperature are ° C. in each Example.

$^1$H-NMR Analysis: DRX-500 (made by Bruker BioSpin Corporation) was used for measurement. Measurement was carried out using a solution in which a sample was dissolved in a deuterated solvent capable of dissolving the sample, such as $CDCl_3$, at room temperature by means of a nuclear magnetic resonance apparatus. Tetramethylsilane (TMS) was used as a reference material for a zero point of δ values. In addition, s, d, t, q and m mean a singlet, a doublet, a triplet, a quartet and a multiplet, respectively.

Gas Chromatographic Analysis: GC-2014 gas chromatograph made by Shimadzu Corporation was used for measurement. A carrier gas was helium (2 ml per minute). A sample injector and a detector (FID) were set to 280° C. and 300° C., respectively. A capillary column DB-1 (length 30 m, bore 0.32 mm, film thickness 0.25 μm; dimethylpolysiloxane as a stationary phase, non-polar) made by Agilent Technologies, Inc. was used for separation of component compounds. After the column was kept at 180° C. for 2 minutes, the column was heated to 280° C. at a rate of 5° C. per minute.

The sample was dissolved in toluene, and prepared to be a solution of 1% by weight, and 1 microliter of the solution obtained was injected into the sample injector. As the recorder, C-R7A Chromatopac made by Shimadzu Corporation or the equivalent thereof was used. In the resulting gas chromatogram obtained, the retention time of the peak and a peak area value corresponding to each of the component compounds are shown.

As a solvent for diluting the sample, for example, chloroform or hexane may also be used. Moreover, as the column, such columns may also be used as capillary column HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd.

A ratio of the peak areas in the gas chromatogram corresponds to a ratio of the component compounds. In general, weight percent of the component compound in an analytical sample is not completely identical with a percentage of each of the peak areas in the analytical sample. However, because a correction coefficient is essentially 1 (one) when the column described above in the invention was used, the weight percent of the component compounds in the analytical sample substantially corresponds to the percentage of each of the peak areas in the analytical sample. The reason is that no large difference exists in the correction coefficient of components in a liquid crystal compound. In order to more accurately determine a composition ratio of the liquid crystal compounds in the liquid crystal composition using the gas chromatogram, an internal standard method using the gas chromatogram is applied. A predetermined amount of each accurately weighed liquid crystal compound component (test component) and a standard liquid crystal compound (reference material) are simultaneously measured by gas chromatography, and a relative intensity of the area ratio between a peak obtained of the test component and a peak obtained of the reference material is calculated in advance. When correction is performed using the relative intensity of the peak area of each component to the reference material, the composition ratio of the liquid crystal compounds in the liquid crystal composition can be more accurately determined from the gas chromatographic analysis.

Example 1

According to the synthetic scheme shown below, 1-(4-butoxycyclohex-1-enyl)-4-ethoxy-2,3-difluorobenzene (1-a-1-20) was prepared.

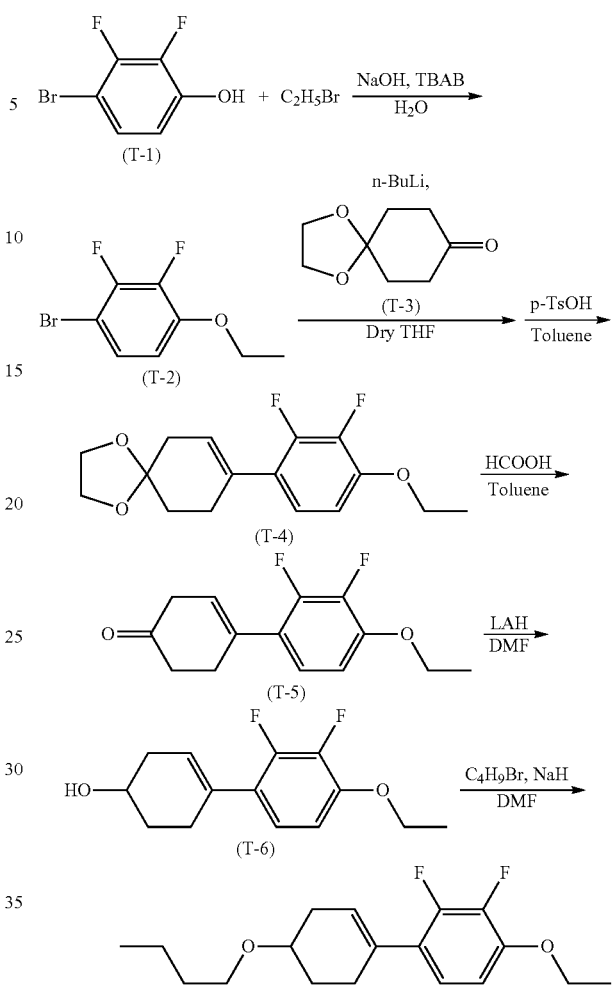

Synthesis of 1-ethoxy-2,3-difluorobromobenzene (T-2)

To an aqueous (400 ml) solution of 4-bromo-2,3-difluorophenol (T-1) (195.0 g), bromoethane (196.2 g) and tetrabutylammonium bromide (hereinafter, abbreviated as TBAB) (24.2 g), sodium hydroxide (75.9 g) was added, and heating agitation was carried out at 80° C. for 6 hours in a nitrogen atmosphere. After completion of the reaction, extraction was carried out with heptane, an organic layer was washed with water and a saturated aqueous solution of sodium chloride, and then the resultant solution was dried over anhydrous magnesium sulfate and concentrated under reduced pressure, and thus a black oily matter was obtained. The resultant material was purified by distillation, and thus 1-ethoxy-2,3-difluorobromobenzene (T-2) was obtained as a colorless oily matter (230.0 g, yield: 97%).

Synthesis of Compound (T-4)

Compound (T-2) (142.2 g) obtained in the above step was dissolved in dry tetrahydrofuran (hereinafter, abbreviated as DryTHF) (500 ml), and the resultant solution was cooled to −70° C., n-BuLi (364 ml) was added dropwise in a nitrogen atmosphere, and agitation was carried out at −70° C. for 2 hours. Then, a DryTHF solution of cyclohexanedione monoethylene ketal (T-3) (93.6 g) was slowly added dropwise, the resultant solution was heated to room temperature and agitated for 16 hours. After completion of the reaction, 2N—HCl (200 ml) was added, extraction was carried out with toluene, an organic layer was washed with water and a saturated aqueous solution of sodium chloride, and then the resultant solution was dried over anhydrous magnesium sulfate and concentrated under reduced pressure, and thus a light brown solid was obtained. The resultant material was dissolved in toluene (400 ml), p-TsOH (4.74 g) was added, and heating reflux was carried out for 4 hours while performing dehydration. After completion of the reaction, extraction was carried out with toluene, an organic layer was washed with water and a saturated aqueous solution of sodium chloride, and then the resultant solution was dried over anhydrous magnesium sulfate and concentrated under reduced pressure, and thus a light brown solid was obtained. The resultant material was subjected to silica gel column chromatography (heptane:ethyl acetate=20:1 in a volume ratio) and recrystallization (Solmix), and thus (T-4) was obtained as a colorless crystal (126.1 g, yield: 71%).

Synthesis of Compound (T-5)

Compound (T-4) (29.6 g) obtained in the above step was dissolved in toluene (300 ml), formic acid (30 ml) was added, and heating reflux was carried out for 4 hours. After completion of the reaction, extraction was carried out with toluene, an organic layer was washed with water, a saturated aqueous solution of sodium hydrogencarbonate, water and a saturated aqueous solution of sodium chloride, and then the resultant solution was dried over anhydrous magnesium sulfate and concentrated under reduced pressure, and thus a colorless solid was obtained. The resultant material was subjected to recrystallization (Solmix), and thus (T-5) was obtained as a colorless crystal (22.7 g, yield: 90%).

Synthesis of Compound (T-6)

To a suspended solution of LAH (1.71 g) in dimethylformamide (hereinafter, abbreviated as DMF) (100 ml), a DMF solution of compound (T-5) (22.7 g) obtained in the above step was added dropwise under ice cooling while paying attention to foam formation. After completion of the dropwise addition, the resultant solution was heated to room temperature and agitated for 5 hours. After completion of the reaction, ice-cooled 2N—HCl (100 ml) was added, extraction was carried out with ethyl acetate, an organic layer was washed with water, a saturated aqueous solution of sodium hydrogencarbonate, water and a saturated aqueous solution of sodium chloride, and then the resultant solution was dried over anhydrous magnesium sulfate and concentrated under reduced pressure, and a colorless solid was obtained. The resultant material was subjected to recrystallization (Solmix), and thus (T-6) was obtained as a colorless crystal (22.7 g, yield: 99%).

Synthesis of 1-(4-butoxycyclohex-1-enyl)-4-ethoxy-2,3-difluorobenzene (1-a-1-20)

To a suspended solution of NaH (1.06 g) in DMF (100 ml), a DMF solution of compound (T-6) (10.2 g) obtained in the above step was added dropwise while paying attention to foam formation. Then, a DMF solution of bromobutane (6.05 g) was added dropwise, and heating agitation was carried out at 100° C. for 12 hours. After completion of the reaction, extraction was carried out with toluene, an organic layer was washed with water, a saturated aqueous solution of ammonium chloride, water and a saturated aqueous solution of sodium chloride, and then the resultant solution was dried over anhydrous magnesium sulfate and concentrated under reduced pressure, and thus a colorless solid was obtained. The resultant material was subjected to silica gel column chromatography (heptane:ethyl acetate=20:1 in a volume ratio) and recrystallization (Solmix), and thus 1-(4-butoxycyclohex-1-enyl)-4-ethoxy-2,3-difluorobenzene (1-a-1-20) was obtained as a colorless crystal (7.44 g, yield: 60%).

As described in items of Composition Examples below, physical properties were calculated according to an extrapolation method from values obtained by measurement after preparing a sample by mixing 15% by weight of the compound and 85% by weight of mother liquid crystals (A). Extrapolated value=(measured value of a sample−0.85×measured value of mother liquid crystals (A))/0.15. The physical properties of the compound were determined as follows: NI=−35.4° C., $\Delta\epsilon$=−5.29, $\Delta$n=0.080, $\eta$=38.7 mPa·s, $K_{33}/K_{11}$=1.148, and C, 6.2 Iso.

$^1$H-NMR (CDCl$_3$): $\delta$ (ppm); 6.87 (t, 1H), 6.64 (t, 1H), 5.82 (s, 1H), 4.10 (q, 2H), 3.64-3.59 (m, 1H), 3.55-3.49 (m, 2H), 2.55-2.43 (m, 3H), 2.22-2.15 (m, 1H), 2.05-2.01 (m, 1H), 1.78-1.70 (m, 1H), 1.61-1.55 (m, 2H), 1.45 (t, 3H), 1.44-1.35 (m, 2H), 0.93 (t, 3H).

Example 2

According to the synthetic scheme shown below, 1-(4-butoxycyclohexyl)-4-ethoxy-2,3-difluorobenzene (1-a-2-22) was prepared.

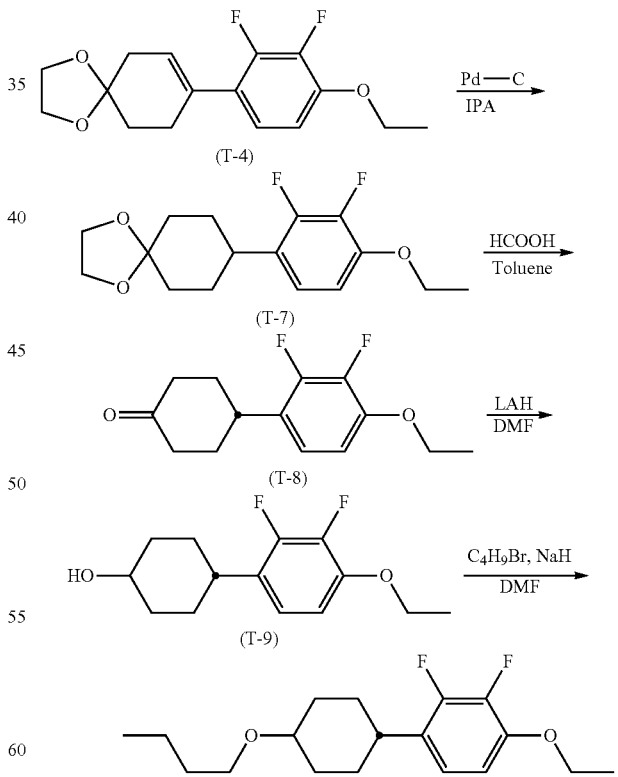

Synthesis of Compound (T-7)

Compound (T-4) (88.8 g) obtained in Example 1 was dissolved in isopropyl alcohol (hereinafter, abbreviated as IPA)

(400 ml), Pd—C was added, and agitation was carried out at room temperature for 6 hours in a hydrogen atmosphere. After completion the reaction, Pd—C was filtered off, and the resultant solution was concentrated under reduced pressure, and thus a colorless solid was obtained. The resultant material was subjected to silica gel column chromatography (heptane:ethyl acetate=20:1 in a volume ratio) and recrystallization (Solmix), and thus (T-5) was obtained as a colorless crystal (87.6 g, yield: 99%).

Synthesis of Compound (T-8)

Compound (T-7) (87.6 g) obtained in the above step was dissolved in toluene (300 ml), formic acid (100 ml) was added, and heating reflux was carried out for 4 hours. After completion of the reaction, extraction was carried out with toluene, an organic layer was washed with water, a saturated aqueous solution of sodium hydrogencarbonate, water and a saturated aqueous solution of sodium chloride, and then the resultant solution was dried over anhydrous magnesium sulfate and concentrated under reduced pressure, and thus a colorless solid was obtained. The resultant material was subjected to recrystallization (Solmix), and thus (T-8) was obtained as a colorless crystal (67.2 g, yield: 89%).

Synthesis of Compound (T-9)

To a suspended solution of LAH (5.1 g) in DMF (400 ml), a DMF solution of compound (T-8) (67.2 g) obtained in the above step was added dropwise under ice cooling while paying attention to foam formation. After completion of the dropwise addition, the resultant solution was heated to room temperature and agitated for 5 hours. After completion of the reaction, ice-cooled 2N—HCl (100 ml) was added, extraction was carried out with ethyl acetate, an organic layer was washed with water, a saturated aqueous solution of sodium hydrogencarbonate, water and a saturated aqueous solution of sodium chloride, and the resultant solution was dried over anhydrous magnesium sulfate and concentrated under reduced pressure, and thus a colorless solid was obtained. The resultant material was subjected to recrystallization (Solmix), and thus (T-9) was obtained as a colorless crystal (65.7 g, yield: 97%).

Synthesis of 1-(4-butoxycyclohexyl)-4-ethoxy-2,3-difluorobenzene (1-a-2-22)

To a suspended solution of NaH (1.06 g) in DMF (100 ml), a DMF solution of compound (T-9) (10.3 g) obtained in the above step was added dropwise while paying attention to foam formation. Then, a DMF solution of bromobutane (6.05 g) was added dropwise, and heating agitation was carried out at 100° C. for 12 hours. After completion of the reaction, extraction was carried out with toluene, an organic layer was washed with water, a saturated aqueous solution of ammonium chloride, water and a saturated aqueous solution of sodium chloride, and the resultant solution was dried over anhydrous magnesium sulfate and concentrated under reduced pressure, and thus a colorless solid was obtained. The resultant material was subjected to silica gel column chromatography (heptane:ethyl acetate=20:1 in a volume ratio) and recrystallization (Solmix), and thus 1-(4-butoxycyclohexyl)-4-ethoxy-2,3-difluorobenzene (1-a-2-22) was obtained as a colorless crystal (9.41 g, yield: 75%).

Physical properties of the compound were determined as follows: NI=−16.1° C., Δ∈=−7.62, Δn=0.065, η=44.6 mPa·s, $K_{33}/K_{11}$=1.144, and C, 40.3 Iso. The physical properties were measured in a manner similar to Example 1.

$^1$H-NMR (CDCl$_3$): δ (ppm); 6.81 (t, 1H), 6.66 (t, 1H), 4.08 (q, 2H), 3.84 (t, 2H), 3.29-3.23 (m, 1H), 2.78-2.74 (m, 1H), 2.15 (d, 2H), 1.89 (d, 2H), 1.59-1.34 (m, 8H), 1.43 (t, 3H), 0.93 (t, 3H).

Example 3

From compound (T-9) (10.3 g), NaH (1.06 g) and bromoethane (4.81 g), 1-(4-ethoxy-cyclohexyl)-4-ethoxy-2,3-difluorobenzene (1-a-2-4) was obtained as a colorless crystal (7.82 g, yield: 63%) in a manner similar to Example 2.

Physical properties of the compound were determined as follows: NI=−26.1° C., Δ∈=−7.57, Δn=0.067, η=42.7 mPa·s, $K_{33}/K_{11}$=1.260, and C, 64.7 Iso. The physical properties were measured in a manner similar to Example 1.

$^1$H-NMR (CDCl$_3$): δ (ppm); 6.94 (t, 1H), 6.66 (t, 1H), 4.09 (t, 2H), 3.90 (t, 2H), 3.15-3.20 (m, 1H), 2.75-2.69 (m, 1H), 2.07 (d, 2H) and 1.86 (d, 2H), 1.55-1.23 (m, 4H), 1.32 (t, 3H), 1.10 (t, 3H).

Example 4

From compound (T-9) (10.3 g), NaH (1.06 g) and crotyl bromide (5.91 g), (E)-1-(4-(but-2-enyloxy)cyclohexyl)-4-ethoxy-2,3-difluorobenzene (1-a-2-60) was obtained as a colorless crystal (7.17 g; yield: 57%) in a manner similar to Example 2.

Physical properties of the compound were determined as follows: NI=−13.4° C., Δ∈=−7.38, Δn=0.083, η=48.6 mPa·s, $K_{33}/K_{11}$=1.286 and C, 60.8 Iso. The physical properties were measured in a manner similar to Example 1.

$^1$H-NMR (CDCl$_3$): δ (ppm); 6.94 (d, 1H), 6.66 (d, 1H), 5.69-5.67 (m, 2H), 4.09 (q, 2H) and 4.04 (d, 2H), 2.79-2.72 (m, 2H), 2.05 (d, 3H), 1.86-1.45 (m, 8H), 1.32 (t, 3H).

Example 5

According to the synthetic scheme shown below, 1-(4-butoxycyclohexyl)-4-(4-ethoxycyclohexyl)-2,3-difluorobenzene (1-b-3-6) was prepared.

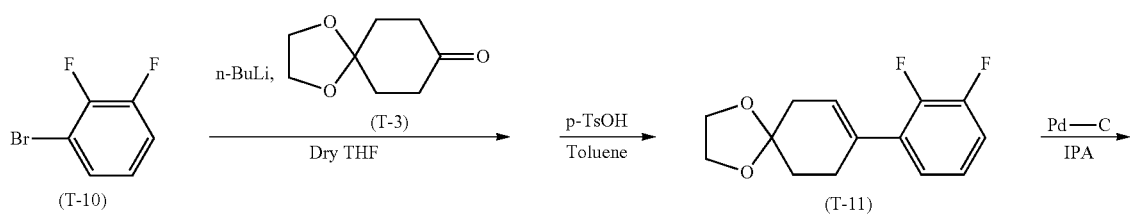

-continued

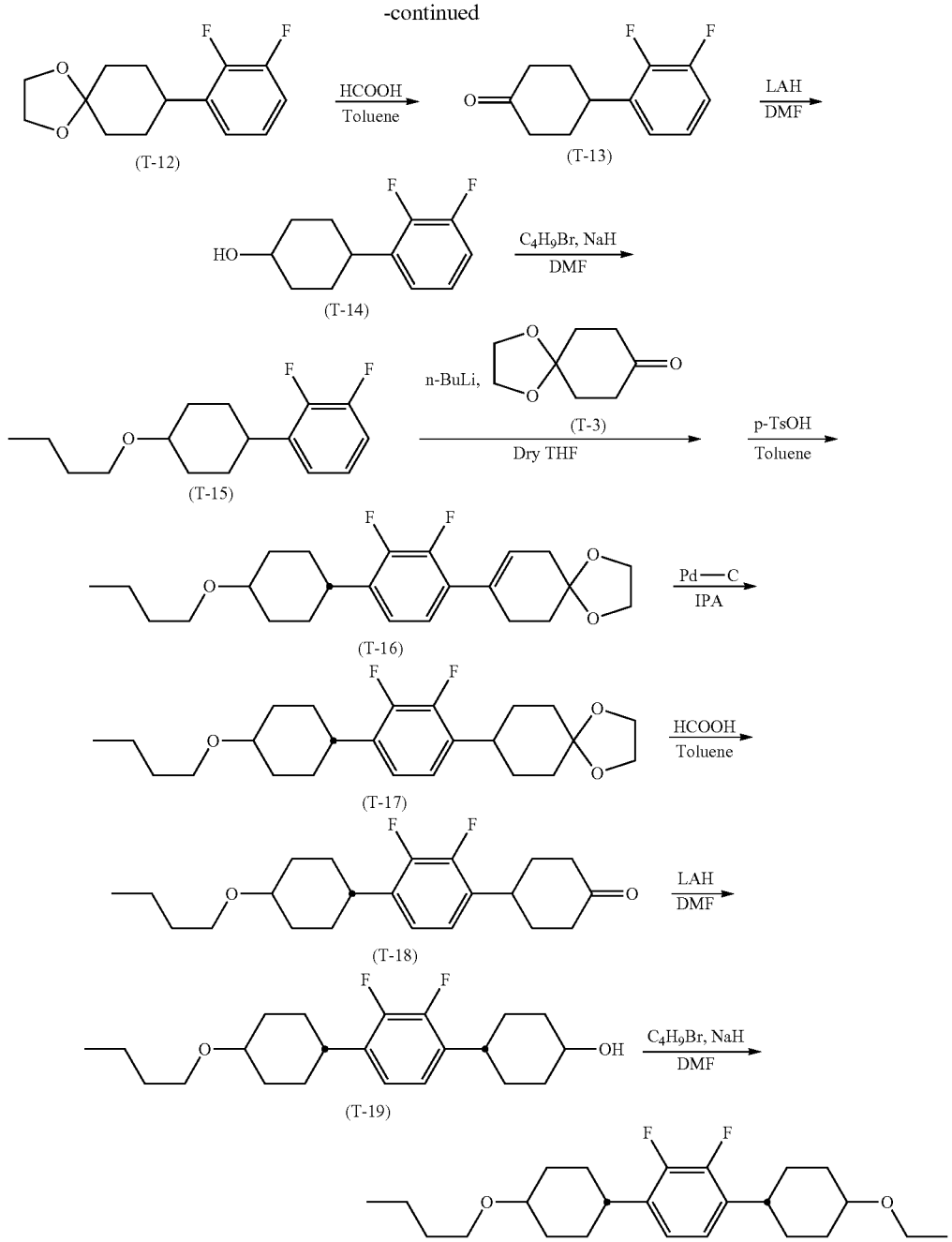

Synthesis of Compound (T-11)

Then 2,3-difluorobromobenzene (T-10) (115.2 g) was dissolved in DryTHF (600 ml), and the resultant solution was cooled to −70° C. In a nitrogen atmosphere, n-BuLi (364 ml) was added dropwise, and agitation was carried out at −70° C. for 2 hours. Then, a DryTHF solution of cyclohexanedione monoethylene ketal (T-3) (93.6 g) was slowly added dropwise at −70° C., and the resultant solution was heated to room temperature and agitated for 16 hours. After completion of the reaction, 2N—HCl (200 ml) was added, extraction was carried out with toluene, an organic layer was washed with water and a saturated aqueous solution of sodium chloride, and then the resultant solution was dried over anhydrous magnesium sulfate and concentrated under reduced pressure, and thus a light brown solid was obtained. The resultant material was dissolved in toluene (400 ml), p-TsOH (4.74 g) was added, and heating reflux was carried out for 4 hours while performing dehydration. After completion of the reaction, extraction was carried out with toluene, an organic layer was washed with water and a saturated aqueous solution of sodium chloride, and then the resultant solution was dried over anhydrous magnesium sulfate and concentrated under reduced pressure, and thus a light brown solid was obtained. The resultant material was subjected to silica gel column chromatography (heptane:ethyl acetate=20:1 in a volume ratio) and recrystallization (Solmix), and thus (T-11) was obtained as a colorless crystal (121.0 g, yield: 80%).

Synthesis of Compound (T-12)

Compound (T-11) (60.5 g) obtained in the above step was dissolved in IPA (200 ml), Pd—C was added, and agitation was carried out at room temperature for 6 hours in a hydrogen atmosphere. After completion of the reaction, Pd—C was filtered off and the resultant solution was concentrated under reduced pressure, and thus a colorless solid was obtained. The resultant material was subjected to silica gel column chromatography (heptane:ethyl acetate=20:1 in a volume ratio) and recrystallization (Solmix), and thus (T-12) was obtained as a colorless crystal (59.2 g, yield: 97%).

Synthesis of Compound (T-13)

Compound (T-12) (59.2 g) obtained in the above step was dissolved in toluene (200 ml), formic acid (50 ml) was added, and heating reflux was carried out for 4 hours. After completion of the reaction, extraction was carried out with toluene, an organic layer was washed with water, a saturated aqueous solution of sodium hydrogencarbonate, water and a saturated aqueous solution of sodium chloride, and then the resultant solution was dried over anhydrous magnesium sulfate and concentrated under reduced pressure, and thus a colorless solid was obtained. The resultant material was subjected to recrystallization (Solmix), and thus (T-13) was obtained as a colorless crystal (40.6 g, yield: 83%).

Synthesis of Compound (T-14)

In a suspended solution of LAH (3.7 g) in DMF (50 ml), a DMF solution of compound (T-13) (40.6 g) obtained in the above step was added dropwise under ice cooling while paying attention to foam formation. After completion of the dropwise addition, the resultant solution was heated to room temperature and agitated for 5 hours. After completion of the reaction, ice-cooled 2N—HCl (50 ml) was added, extraction was carried out with ethyl acetate, an organic layer was washed with water, a saturated aqueous solution of sodium hydrogencarbonate, water and a saturated aqueous solution of sodium chloride, and then the resultant solution was dried over anhydrous magnesium sulfate and concentrated under reduced pressure, and thus a colorless solid was obtained. The resultant material was subjected to recrystallization (Solmix), and thus (T-14) was obtained as a colorless crystal (40.6 g, yield: 99%).

Synthesis of Compound (T-15)

In a suspended solution of NaH (10.1 g) in DMF (100 ml), a DMF solution of compound (T-14) (40.6 g) obtained in the above step was added dropwise while paying attention to foam formation. Then, a DMF solution of bromobutane (28.9 g) was added dropwise, and heating agitation was carried out at 100° C. for 12 hours. After completion of the reaction, extraction was carried out with toluene, an organic layer was washed with water, a saturated aqueous solution of ammonium chloride, water and a saturated aqueous solution of sodium chloride, and then the resultant solution was dried over anhydrous magnesium sulfate and concentrated under reduced pressure, and thus a colorless solid was obtained. The resultant material was subjected to silica gel column chromatography (heptane:ethyl acetate=20:1 in a volume ratio), and thus (T-15) was obtained as a colorless liquid (36.3 g, yield: 71%).

Synthesis of Compound (T-16)

Compound (T-15) (12.1 g) obtained in the above step was dissolved in DryTHF (100 ml), and then the resultant solution was cooled to −70° C. In a nitrogen atmosphere, n-BuLi (41 ml) was added dropwise, and agitation was carried out at −70° C. for 2 hours. Then, a DryTHF solution of cyclohexanedione monoethylene ketal (T-3) (7.80 g) was slowly added dropwise at −70° C., and the resultant solution was heated to room temperature and agitated for 16 hours. After completion of the reaction, 2 N—HCl (50 ml) was added, extraction was carried out with toluene, an organic layer was washed with water and a saturated aqueous solution of sodium chloride, and then the resultant solution was dried over anhydrous magnesium sulfate and concentrated under reduced pressure, and thus a light brown solid was obtained. The resultant material was dissolved in toluene (100 ml), p-TsOH (0.11 g) was added, and heating reflux was carried out for 4 hours while performing dehydration. After completion of the reaction, extraction was carried out with toluene, an organic layer was washed with water and a saturated aqueous solution of sodium chloride, and then the resultant solution was dried over anhydrous magnesium sulfate and concentrated under reduced pressure, and thus a light brown solid was obtained. The resultant material was subjected to silica gel column chromatography (heptane:ethyl acetate=20:1 in a volume ratio) and recrystallization (Solmix), and thus (T-16) was obtained as a colorless crystal (10.1 g, yield: 55%).

Synthesis of Compound (T-17)

Compound (T-16) (10.1 g) obtained in the above step was dissolved in IPA (100 ml), Pd—C was added, and agitation was carried out at room temperature for 6 hours in a hydrogen atmosphere. After completion of the reaction, Pd—C was filtered off and the resultant solution was concentrated under reduced pressure, and thus a colorless solid was obtained. The resultant material was subjected to silica gel column chromatography (heptane:ethyl acetate=20:1 in a volume ratio) and recrystallization (Solmix), and thus (T-17) was obtained as a colorless crystal (9.8 g, yield: 96%).

Synthesis of Compound (T-18)

Compound (T-17) (9.8 g) obtained in the above step was dissolved in toluene (100 ml), formic acid (20 ml) was added, and heating reflux was carried out for 4 hours. After completion of the reaction, extraction was carried out with toluene, an organic layer was washed with water, a saturated aqueous solution of sodium hydrogencarbonate, water and a saturated aqueous solution of sodium chloride, and then the resultant solution was dried over anhydrous magnesium sulfate and concentrated under reduced pressure, and thus a colorless solid was obtained. The resultant material was subjected to recrystallization (Solmix), and thus (T-18) was obtained as a colorless crystal (7.5 g, yield: 86%).

Synthesis of Compound (T-19)

In a suspended solution of LAH (0.39 g) in DMF (40 ml), a DMF solution of compound (T-18) (7.5 g) obtained in the above step was added dropwise under ice cooling while paying attention to foam formation. After completion of the dropwise addition, the resultant solution was heated to room temperature and agitated for 5 hours. After completion of the reaction, ice-cooled 2N—HCl (50 ml) was added, extraction was carried out with ethyl acetate, an organic layer was washed with water, a saturated aqueous solution of sodium hydrogencarbonate, water and a saturated aqueous solution of sodium chloride, and then the resultant solution was dried over anhydrous magnesium sulfate and concentrated under reduced pressure, and thus a colorless solid was obtained. The resultant material was subjected to recrystallization (Solmix), and thus (T-19) was obtained as a colorless crystal (6.7 g, yield: 89%).

Synthesis of 1-(4-butoxycyclohexyl)-4-(4-ethoxycyclohexyl)-2,3-difluorobenzene (1-b-3-6)

In a suspended solution of NaH (0.27 g) in DMF (50 ml), a DMF solution of compound (T-19) (3.5 g) obtained in the above step was added dropwise while paying attention to foam formation. Then, a DMF solution of bromobutane (11.9 g) was added dropwise, and heating agitation was carried out at 100° C. for 12 hours. After completion of the reaction, extraction was carried out with toluene, an organic layer was washed with water, a saturated aqueous solution of ammonium chloride, water and a saturated aqueous solution of sodium chloride, and then the resultant solution was dried over anhydrous magnesium sulfate and concentrated under reduced pressure, and thus a colorless solid was obtained. The resultant material was subjected to silica gel column chromatography (heptane:ethyl acetate=20:1 in a volume ratio) and recrystallization (Solmix), and thus 1-(4-butoxycyclohexyl)-4-(4-ethoxycyclohexyl)-2,3-difluorobenzene (1-b-3-6) was obtained as a colorless crystal (1.79 g, yield: 48%).

Physical properties of the compound were determined as follows: NI=62.6° C., $\Delta\epsilon$=−5.13, $\Delta$n=0.092, $\eta$=64.8 mPa·s, $K_{33}/K_{11}$=1.346, C, 65.1; N, 99.9; Iso. The physical properties were measured in a manner similar to Example 1.

$^1$H-NMR (CDCl$_3$): δ (ppm); 6.86 (d, 2H), 3.55 (q, 2H), 3.49 (t, 2H), 3.31-3.24 (m, 2H), 2.83-2.77 (m, 2H), 2.15 (d, 4H), 1.89 (d, 4H), 1.58-1.35 (m, 12H), 1.21 (t, 3H), 0.93 (t, 3H).

Example 6

Synthesis of 4-ethoxy-2,3-difluorophenylboronic acid (T-20)

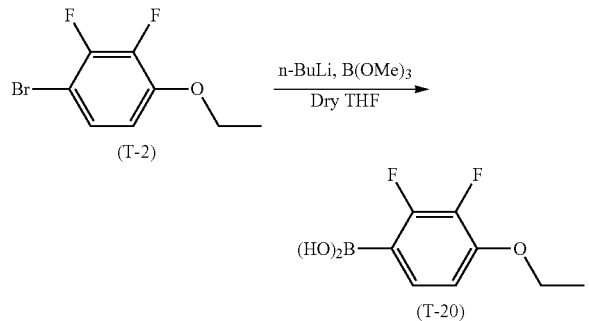

According to the synthetic scheme shown above, compound (T-2) (129.5 g) obtained as an intermediate of Example 1 was dissolved in DryTHF (500 ml), and the resultant solution was cooled to −70° C. In a nitrogen atmosphere, n-BuLi (500 ml) was added dropwise, and agitation was carried out at −70° C. for 2 hours. Then, a DryTHF solution of trimethyl borate (129.5 g) was slowly added dropwise at −70° C., and the resultant solution was heated to room temperature and agitated for 16 hours. After completion of the reaction, 2N—HCl (200 ml) was added, and then extraction was carried out with toluene, an organic layer was washed with water and a saturated aqueous solution of sodium chloride, and then the resultant solution was dried over anhydrous magnesium sulfate and concentrated under reduced pressure, and thus a light brown solid was obtained. The resultant material was subjected to recrystallization (heptane:toluene=4:1 in a volume ratio), and thus (T-20) was obtained as a colorless crystal (117.2 g, yield: 71%).

According to the synthetic scheme shown below, 4-(4-butoxycyclohex-1-enyl)-4'-ethoxy-2,2',3,3'-tetrafluorobiphenyl (1-c-1-52) was prepared.

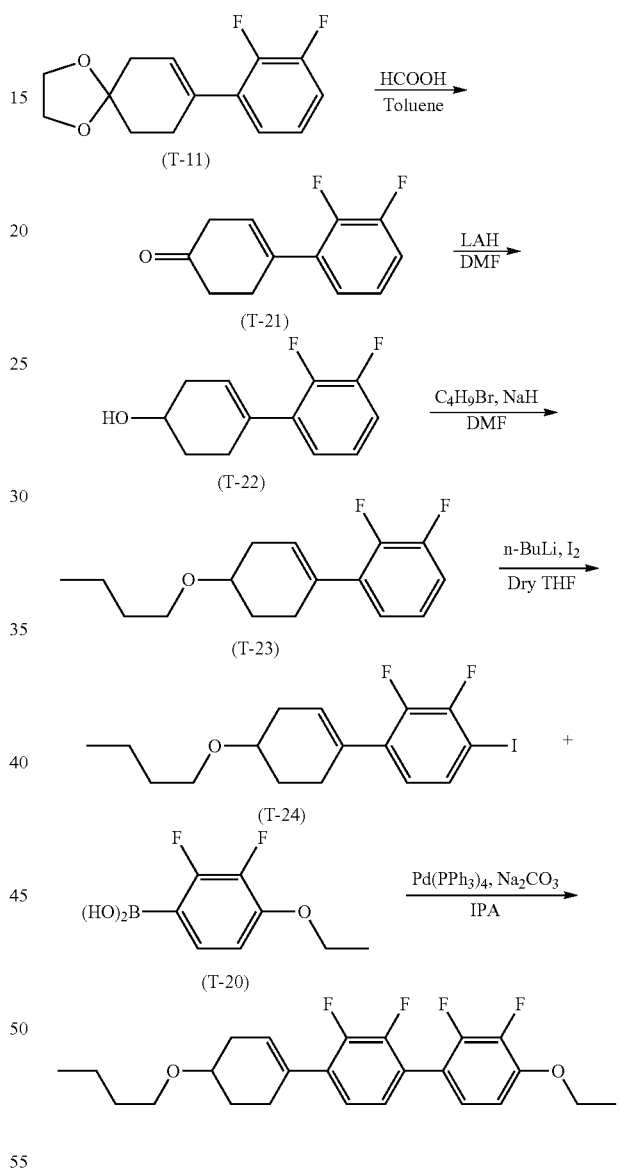

Synthesis of Compound (T-23)

According to the synthetic scheme shown above, compound (T-23) was obtained from compound (T-11) (60.5 g) as a colorless liquid (12.7 g, yield: 41%) in a manner similar to synthesis of compound (T-15) in Example 5.

Synthesis of Compound (T-24)

Compound (T-23) (12.7 g) obtained in the above step was dissolved in DryTHF (100 ml), and the resultant solution was cooled to −70° C. In a nitrogen atmosphere, n-BuLi (43 ml)

was added dropwise, and agitation was carried out at −70° C. for 2 hours. Then, a DryTHF solution of iodine (4.40 g) was slowly added dropwise at −70° C., the resultant solution was heated to room temperature and agitated for 16 hours. After completion of the reaction, extraction was carried out with toluene, an organic layer was washed with water and a saturated aqueous solution of sodium chloride, and then the resultant solution was dried over anhydrous magnesium sulfate and concentrated under reduced pressure, and thus a light brown solid was obtained. The resultant material was subjected to silica gel column chromatography (heptane:ethyl acetate=20:1 in a volume ratio) and recrystallization (Sol-mix), and thus (T-24) was obtained as a colorless crystal (14.2 g, yield: 76%).

Synthesis of 4-(4-butoxycyclohex-1-enyl)-4'-ethoxy-2,2',3,3'-tetrafluorobiphenyl (1-c-1-52)

Compound (T-24) (7.10 g) obtained in the above step and compound (T-20) (4.02 g) were dissolved in IPA, Pd(PPh$_3$)$_4$ (0.21 g) and sodium carbonate (5.76 g) were added, and heating reflux was carried out for 6 hours. After completion of the reaction, extraction was carried out with ethyl acetate, an organic layer was washed with a 2N—NaOH aqueous solution, a saturated aqueous solution of sodium hydrogencarbonate, water and a saturated aqueous solution of sodium chloride, and then the resultant solution was dried over anhydrous magnesium sulfate and concentrated under reduced pressure, and thus a light brown solid was obtained. The resultant material was subjected to silica gel column chromatography (heptane:ethyl acetate=20:1 in a volume ratio) and recrystallization (heptane:ethanol=1:1 in a volume ratio), and thus 4-(4-butoxycyclohex-1-enyl)-4'-ethoxy-2,2',3,3'-tetrafluorobiphenyl (1-c-1-52) was obtained as a colorless crystal (4.05 g, yield: 53%).

Physical properties of the compound were determined as follows: NI=73.9° C., Δ∈=−8.31, Δn=0.172, η=87.6 mPa·s, K$_{33}$/K$_{11}$=1.132, C, 51.2; N, 70.5; Iso. The physical properties were measured in a manner similar to Example 1.

$^1$H-NMR (CDCl$_3$): δ (ppm); 7.06-7.02 (m, 3H), 6.81 (t, 1H), 5.95 (s, 1H), 4.17 (q, 2H), 3.68-3.63 (m, 1H), 3.57-3.48 (m, 2H), 2.61-2.49 (m, 3H), 2.25-2.20 (m, 1H), 2.08-2.05 (m, 1H), 1.82-1.76 (m, 1H), 1.62-1.54 (m, 2H), 1.49 (t, 3H), 1.44-1.37 (m, 2H), 0.94 (t, 3H).

Example 7

Synthesis of 4-ethoxy-3-fluorophenylboronic acid (T-27)

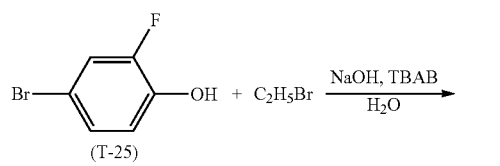

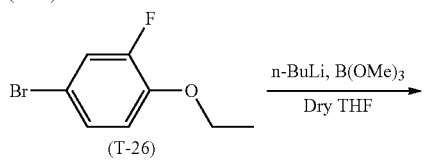

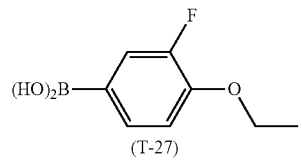

To an aqueous (400 ml) solution of 4-bromo-2-fluorophenol (T-25) (76.4 g), bromoethane (52.3 g) and TBAB (6.44 g), sodium hydroxide (20.2 g) was added, and heating agitation was carried out at 80° C. for 6 hours in a nitrogen atmosphere. After completion of the reaction, extraction was carried out with heptane, an organic layer was washed with water and a saturated aqueous solution of sodium chloride, and then the resultant solution was dried over anhydrous magnesium sulfate and concentrated under reduced pressure, and thus a black oily matter was obtained. The resultant material was purified by distillation, and thus 1-ethoxy-2,3-difluorobromobenzene (T-26) was obtained as a colorless oily matter (78.0 g, yield: 90%).

The compound (T-26) (43.8 g) was dissolved in DryTHF (400 ml), and the resultant solution was cooled to −70° C. In a nitrogen atmosphere, n-BuLi (133 ml) was added dropwise, and agitation was carried out at −70° C. for 2 hours. Then, a DryTHF solution of trimethyl borate (64.8 g) was slowly added dropwise at −70° C., and the resultant solution was heated to room temperature and agitated for 16 hours. After completion of the reaction, 2N—HCl (200 ml) was added, and then extraction was carried out with toluene, an organic layer was washed with water and a saturated aqueous solution of sodium chloride, and then the resultant solution was dried over anhydrous magnesium sulfate and concentrated under reduced pressure, and thus a light brown solid was obtained. The resultant material was subjected to recrystallization (heptane:toluene=4:1 in a volume ratio), (T-27) was obtained as a colorless crystal (23.9 g, yield: 65%).

From compound (T-24) (7.10 g), 4-ethoxy-3-fluorophenylboronic acid (T-27) (3.67 g), Pd(PPh$_3$)$_4$ (0.21 g) and sodium carbonate (5.76 g), 4-(4-butoxycyclohex-1-enyl)-4'-ethoxy-2,3,3'-trifluorobiphenyl (1-c-1-51) was obtained as a colorless crystal (3.83 g, yield: 52%) in a manner similar to Example 6.

Physical properties of the compound were determined as follows: NI=87.9° C., Δ∈=−5.17, Δn=0.192, η=78.1 mPa·s, K$_{33}$/K$_{11}$=1.05, C, 35.9; C, 46.6; SA, 81.8; N, 97.5; Iso. The physical properties were measured in a manner similar to Example 1.

$^1$H-NMR (CDCl$_3$): δ (ppm); 7.31-7.24 (m, 2H), 7.10-7.02 (m, 3H), 5.94 (s, 1H), 4.16 (q, 2H), 3.67-3.62 (m, 1H), 3.57-3.48 (m, 2H), 2.60-2.49 (m, 3H), 2.25-2.20 (m, 1H), 2.08-2.04 (m, 1H), 1.82-1.75 (m, 1H), 1.62-1.56 (m, 2H), 1.48 (t, 3H), 1.44-1.36 (m, 2H), 0.94 (t, 3H).

Example 8

According to the synthetic scheme shown below, 4-(4-butoxycyclohexyl)-4'-ethoxy-2,2',3,3'-tetrafluorobiphenyl (1-c-2-52) was prepared.

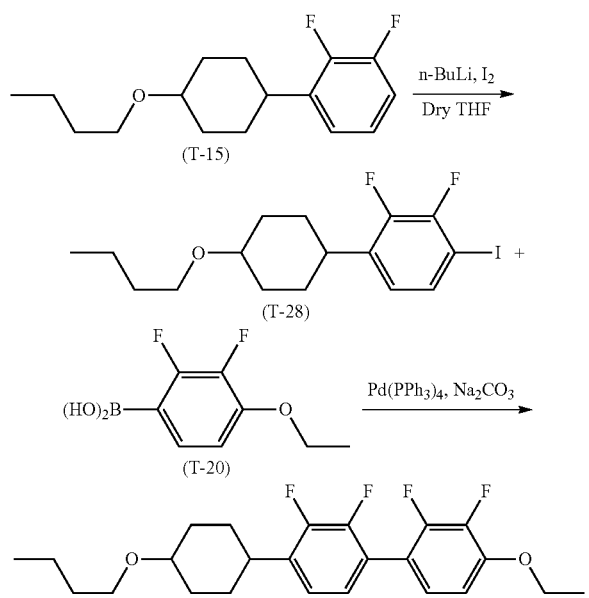

Synthesis of Compound (T-28)

Compound (T-15) (24.2 g) obtained as an intermediate in Example 5 was dissolved in DryTHF (100 ml), and the resultant solution was cooled to −70° C. In a nitrogen atmosphere, n-BuLi (82 ml) was added dropwise, and agitation was carried out at −70° C. for 2 hours. Then, a DryTHF solution of iodine (13.8 g) was slowly added dropwise at −70° C., and the resultant solution was heated to room temperature and agitated for 16 hours. After completion of the reaction, extraction was carried out with toluene, an organic layer was washed with water and a saturated aqueous solution of sodium chloride, and then the resultant solution was dried over anhydrous magnesium sulfate and concentrated under reduced pressure, and thus a light brown solid was obtained. The resultant material was subjected to silica gel column chromatography (heptane:ethyl acetate=20:1 in a volume ratio) and recrystallization (Solmix), and thus (T-24) was obtained as a colorless crystal (24.2 g, yield: 68%).

Synthesis of 4-(4-butoxycyclohexyl)-4'-ethoxy-2,2', 3,3'-tetrafluorobiphenyl (1-c-2-52)

Compound (T-28) (6.10 g) obtained in the above step and compound (T-20) (3.72 g) were dissolved in IPA, Pd(PPh$_3$)$_4$ (0.18 g) and sodium carbonate (4.92 g) were added, and heating reflux was carried out for 6 hours. After completion of the reaction, extraction was carried out with ethyl acetate, an organic layer was washed with 2N—NaOH aqueous solution, a saturated aqueous solution of sodium hydrogencarbonate, water and a saturated aqueous solution of sodium chloride, and then the resultant solution was dried over anhydrous magnesium sulfate and concentrated under reduced pressure, and thus a light brown solid was obtained. The resultant material was subjected to silica gel column chromatography (heptane:ethyl acetate=20:1 in a volume ratio) and recrystallization (heptane:ethanol=1:1 in a volume ratio), and thus 4 (4-butoxycyclohexyl)-4'-ethoxy-2,2',3,3'-tetrafluorobiphenyl (1-c-2-52) was obtained as a colorless crystal (3.74 g, yield: 57%).

Physical properties of the compound were determined as follows: NI=92.6° C., Δ∈=−9.45, Δn=0.148, η=95.3 mPa·s, K$_{33}$/K$_{11}$=1.323, C, 62.9; N, 108.3; Iso. The physical properties were measured in a manner similar to Example 1.

$^1$H-NMR (CDCl$_3$): δ (ppm); 7.06-6.99 (m, 3H), 6.80 (t, 1H), 4.17 (q, 2H), 3.50 (t, 2H), 3.31-3.27 (m, 1H), 2.91-2.87 (m, 2H), 2.20 (d, 2H), 1.96 (d, 2H), 1.61-1.52 (m, 4H), 1.48 (t, 3H), 1.45-1.36 (m, 3H), 0.93 (t, 3H).

Example 9

From compound (T-28) (6.10 g), 4-ethoxy-3-fluorophenylboronic acid (T-27) (3.42 g), Pd(PPh$_3$)$_4$ (0.18 g) and sodium carbonate (4.92 g), 4-(4-butoxycyclohexyl)-4'-ethoxy-2,3,3'-trifluorobiphenyl (1-c-2-51) was obtained as a colorless crystal (3.21 g, yield: 51%) in a manner similar to Example 8.

Physical properties of the compound were determined as follows: NI=105.3° C., Δ∈=−5.78, Δn=0.160, η=83.7 mPa·s, K$_{33}$/K$_{11}$=1.388, C, 49.8; C, 58.2; SA, 72.8; N, 124.6; Iso. The physical properties were measured in a manner similar to Example 1.

$^1$H-NMR (CDCl$_3$): δ (ppm); 7.29-7.23 (m, 2H), 7.07 (t, 1H), 7.03-6.99 (m, 2H), 4.15 (q, 2H), 3.49 (t, 2H), 3.32-3.26 (m, 1H), 2.90-2.85 (m, 2H), 2.18 (d, 2H), 1.94 (d, 2H), 1.59-1.51 (m, 4H), 1.48 (t, 3H), 1.45-1.35 (m, 3H), 0.94 (t, 3H).

Example 10

From 4-(4-ethoxy-cyclohexyl)-2,3-difluoroiodobenzene (5.67 g), 4-ethoxy-3-fluorophenylboronic acid (T-27) (3.72 g), Pd(PPh$_3$)$_4$ (0.17 g) and sodium carbonate (4.92 g), 4-(4-ethoxy-cyclohexyl)-4'-ethoxy-2,2',3,3'-tetrafluorobiphenyl (1-c-2-8) was obtained as a colorless crystal (3.56 g, yield: 58%) in a manner similar to Example 8.

Physical properties of the compound were determined as follows: NI=90.6° C., Δ∈=−10.22, Δn=0.149, η=92.1 mPa·s, K$_{33}$/K$_{11}$=1.707, C, 99.5; N, 114.0; Iso. The physical properties were measured in a manner similar to Example 1.

$^1$H-NMR (CDCl$_3$): δ (ppm); 7.06-6.98 (m, 3H), 6.80 (t, 1H), 4.17 (q, 2H), 4.15 (q, 2H), 3.31-3.27 (m, 1H), 2.20 (d, 2H), 1.96 (d, 2H), 1.59-1.51 (m, 2H), 1.48 (t, 3H), 1.45 (t, 3H), 1.45-1.36 (m, 3H).

Example 11

According to the synthetic scheme shown below, 4"-butoxy-4-ethoxy-2,2',3,3'-tetrafluoro-1,1':4',1"-terphenyl (i-d-52) was prepared.

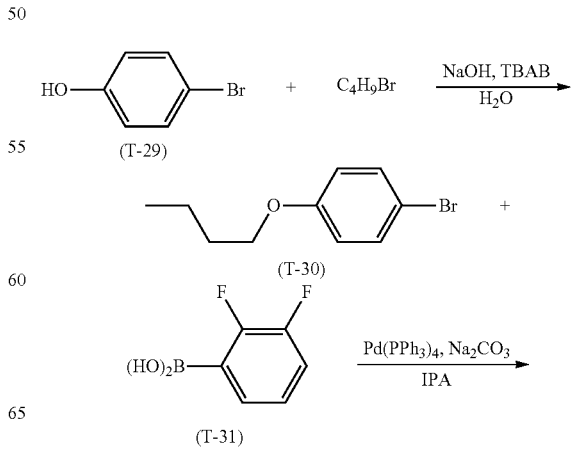

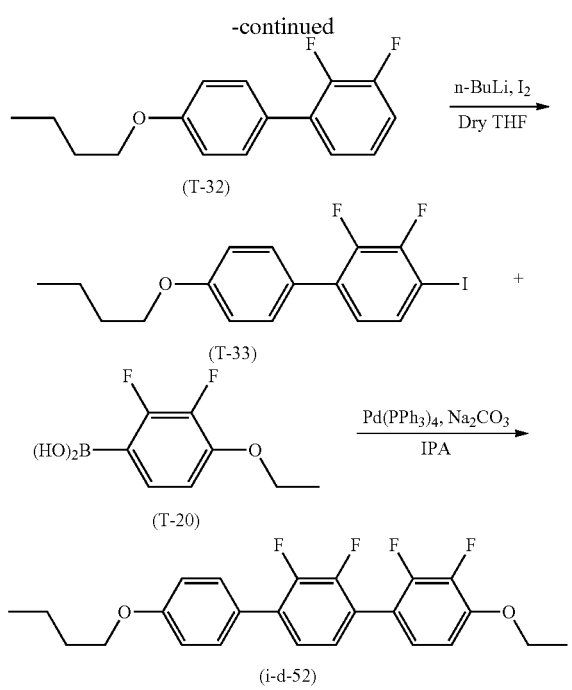

To an aqueous (200 ml) solution of 4-bromophenol (T-29) (34.6 g), bromobutane (30.1 g) and TBAB (3.22 g), sodium hydroxide (10.1 g) was added, and heating agitation was carried out at 80° C. for 6 hours in a nitrogen atmosphere. After completion of the reaction, extraction was carried out with heptane, an organic layer was washed with water and a saturated aqueous solution of sodium chloride, and then the resultant solution was dried over anhydrous magnesium sulfate and concentrated under reduced pressure, and thus a black oily matter was obtained. The resultant material was purified by distillation, and thus 1-butoxybromobenzene (T-30) was obtained as a colorless oily matter (39.4 g, yield: 86%).

Synthesis of 4-(4-butoxyphenyl)-2,3-difluorobenzene (T-32)

Compound (T-30) (39.4 g) obtained in the above step and 2,3-difluorophenylboronic acid (T-31) (28.5 g) were dissolved in IPA, Pd(PPh$_3$)$_4$ (1.04 g) and sodium carbonate (27.3 g) were added, and heating reflux was carried out for 6 hours. After completion of the reaction, extraction was carried out with ethyl acetate, an organic layer was washed with 2N—NaOH aqueous solution, a saturated aqueous solution of sodium hydrogencarbonate, water, and a saturated aqueous solution of sodium chloride, and then the resultant solution was dried over anhydrous magnesium sulfate and concentrated under reduced pressure, and thus a light brown solid was obtained. The resultant material was subjected to silica gel column chromatography (heptane:ethyl acetate=20:1 in a volume ratio) and recrystallization (heptane:ethanol=1:1 in a volume ratio), and thus 4-(4-butoxyphenyl)-2,3-difluorobenzene (T-32) was obtained as a colorless crystal (34.7 g, yield: 77%).

Synthesis of 4-(4-butoxyphenyl)-2,3-difluoroiodobenzene (T-33)

Compound (T-32) (34.7 g) obtained in the above step was dissolved in DryTHF (300 ml), and the resultant solution was cooled to −70° C. In a nitrogen atmosphere, n-BuLi (132 ml) was added dropwise, agitation was carried out at −70° C. for 2 hours. Then, a DryTHF solution of iodine (16.6 g) was slowly added dropwise at −70° C., and the resultant solution was heated to room temperature and agitated for 16 hours. After completion of the reaction, extraction was carried out with toluene, and an organic layer was washed with water and a saturated aqueous solution of sodium chloride, and then the resultant solution was dried over anhydrous magnesium sulfate and concentrated under reduced pressure, and thus a light brown solid was obtained. The resultant material was subjected to silica gel column chromatography (heptane:ethyl acetate=20:1 in a volume ratio) and recrystallization (Sol-mix), and thus (T-33) was obtained as a colorless crystal (38.0 g, yield: 74%).

Compound (T-33) (3.88 g) obtained in the above step and compound (T-20) (2.02 g) were dissolved in IPA, Pd(PPh$_3$)$_4$ (0.12 g) and sodium carbonate (1.59 g) were added, and heating reflux was carried out for 6 hours. After completion of the reaction, extraction was carried out with ethyl acetate, an organic layer was washed with 2N—NaOH aqueous solution, a saturated aqueous solution of sodium hydrogencarbonate, water and a saturated aqueous solution of sodium chloride, and then the resultant solution was dried over anhydrous magnesium sulfate and concentrated under reduced pressure, and thus a light brown solid was obtained. The resultant material was subjected to silica gel column chromatography (heptane:ethyl acetate=20:1 in a volume ratio) and recrystallization (heptane:ethanol=1:1 in a volume ratio), and thus 4"-butoxy-4-ethoxy-2,2',3,3'-tetrafluoro-1,1':4',1"-terphenyl (i-d-52) was obtained as a colorless crystal (2.80 g, yield: 67%).

Physical properties of the compound were determined as follows: NI=148.6° C., Δ∈=−9.32, Δn=0.247, η=85.6 mPa·s, K$_{33}$/K$_{11}$=1.633, C, 102.8; N, 170.4; Iso. The physical properties were measured in a manner similar to Example 1.

$^1$H-NMR (CDCl$_3$): δ (ppm); 7.56 (d, 2H), 7.23 (t, 1H), 7.15 (t, 1H), 7.09 (t, 1H), 7.00 (d, 2H), 6.85 (t, 1H), 4.18 (q, 2H), 4.03 (t, 2H), 1.85-1.77 (m, 2H), 1.56-1.50 (m, 2H), 1.48 (t, 3H), 1.10 (t, 3H).

Example 12

From 4-(4-butoxyphenyl)-2,3-difluoroiodobenzene (T-33) (3.88 g), 4-thoxy-3-fluorophenylboronic acid (T-27) (1.84 g), Pd(PPh$_3$)$_4$ (0.12 g) and sodium carbonate (1.59 g), 4"-butoxy-4-ethoxy-2',3,3'-trifluoro-1,1':4',1"-terphenyl (i-d-51) was obtained as a colorless crystal (2.48 g, yield 62%) in a manner similar to Example 11.

Physical properties of the compound were determined as follows: NI=162.6° C., Δ∈=−4.93, Δn=0.281, η=79.6 mPa·s, K$_{33}$/K$_{11}$=1.739, C, 88.8; N, 183.2; Iso. The physical properties were measured in a manner similar to Example 1.

$^1$H-NMR (CDCl$_3$): δ (ppm); 7.56 (d, 2H), 7.40-7.15 (m, 4H), 7.04 (t, 1H), 6.99 (d, 2H), 4.17 (q, 2H), 4.02 (t, 2H), 1.85-1.76 (m, 2H), 1.56-1.47 (m, 2H), 1.49 (t, 3H), 1.00 (t, 3H).

Example 13

From 4-(4-butoxyphenyl)-2,3-difluoroiodobenzene (T-33) (3.88 g), 3-chloro-4-ethoxy-2-fluorophenylboronic acid (2.18 g), Pd(PPh$_3$)$_4$ (0.12 g) and sodium carbonate (1.59 g), 4"-butoxy-3-chloro-4-ethoxy-2,2',3'-trifluoro-1,1':4',1"-terphenyl (i-d-57) was obtained as a colorless crystal (3.08 g, yield: 71%) in a manner similar to Example 11.

Physical properties of the compound were determined as follows: NI=132.6° C., Δ∈=−9.02, Δn=0.235, η=106.6 mPa·s, $K_{33}/K_{11}$=1.702, C, 131.3; N, 156.1; Iso. The physical properties were measured in a manner similar to Example 1.

$^1$H-NMR (CDCl$_3$): δ (ppm); 7.53 (d, 2H), 7.29-7.20 (m, 2H), 7.14 (t, 1H), 7.00 (d, 2H), 6.82 (d, 2H), 4.18 (q, 2H), 4.03 (t, 2H), 1.85-1.76 (m, 2H), 1.56-1.47 (m, 2H), 1.52 (t, 3H), 1.00 (t, 3H).

Based on the synthetic methods described in Example 1 to Example 13, compounds shown in the following Table 1 to Table 15 were prepared. In addition, compounds (1-a-1-20), (1-a-2-4), (1-a-1-22), (1-a-1-60), (1-b-3-6), (1-c-1-51), (1-c-1-52), (1-c-2-51), (1-c-2-52), (i-d-51), (i-d-52) and (i-d-57) as obtained in Example 1 to Example 13 were also described again.

TABLE 2

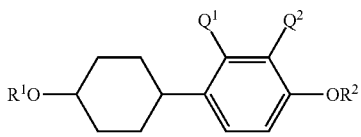

(1-a-2)

| NO. | R$^1$ | Q$^1$ | Q$^2$ | R$^2$ | |
|---|---|---|---|---|---|
| 1-a-2-1 | CH$_3$ | F | F | C$_2$H$_5$ | |
| 1-a-2-2 | CH$_3$ | F | F | C$_4$H$_9$ | |
| 1-a-2-3 | C$_2$H$_5$ | F | F | CH$_3$ | |
| 1-a-2-4 | C$_2$H$_5$ | F | F | C$_2$H$_5$ | NI = −26.1° C., |

TABLE 1

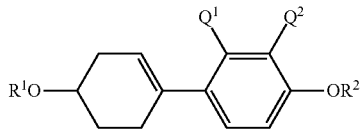

(1-a-1)

| NO. | R$^1$ | Q$^1$ | Q$^2$ | R$^2$ | |
|---|---|---|---|---|---|
| 1-a-1-1 | CH$_3$ | F | F | C$_2$H$_5$ | |
| 1-a-1-2 | C$_2$H$_5$ | F | F | CH$_3$ | |
| 1-a-1-3 | C$_2$H$_5$ | F | F | C$_2$H$_5$ | |
| 1-a-1-4 | C$_2$H$_5$ | F | Cl | C$_2$H$_5$ | |
| 1-a-1-5 | C$_2$H$_5$ | Cl | F | C$_2$H$_5$ | |
| 1-a-1-6 | C$_2$H$_5$ | F | F | C$_3$H$_7$ | |
| 1-a-1-7 | C$_2$H$_5$ | F | F | C$_4$H$_9$ | |
| 1-a-1-8 | C$_2$H$_5$ | F | Cl | C$_4$H$_9$ | |
| 1-a-1-9 | C$_2$H$_5$ | Cl | F | C$_4$H$_9$ | |
| 1-a-1-10 | C$_2$H$_5$ | F | F | C$_5$H$_{11}$ | |
| 1-a-1-11 | C$_2$H$_5$ | F | F | C$_6$H$_{13}$ | |
| 1-a-1-12 | C$_2$H$_5$ | F | F | C$_7$H$_{15}$ | |
| 1-a-1-13 | C$_2$H$_5$ | F | F | C$_8$H$_{17}$ | |
| 1-a-1-14 | C$_2$H$_5$ | F | F | CH=CH$_2$ | |
| 1-a-1-15 | C$_2$H$_5$ | F | F | CH$_2$CH=CH$_2$ | |
| 1-a-1-16 | C$_2$H$_5$ | F | F | CH$_2$CH=CHCH$_3$ | |
| 1-a-1-17 | C$_2$H$_5$ | F | F | CH$_2$CH=CH(CH$_2$)$_2$CH=CH$_2$ | |
| 1a-1-18 | C$_3$H$_7$ | F | F | C$_2$H$_5$ | |
| 1-a-1-19 | C$_3$H$_7$ | F | F | C$_4$H$_9$ | |
| 1-a-1-20 | C$_4$H$_9$ | F | F | C$_2$H$_5$ | NI = −35.4° C., Δε = −5.29, Δn = 0.080, η = 38.7 mPa · s, C 6.2 Iso |
| 1-a-1-21 | C$_4$H$_9$ | F | Cl | C$_2$H$_5$ | |
| 1-a-1-22 | C$_4$H$_9$ | Cl | F | C$_2$H$_5$ | |
| 1-a-1-23 | C$_4$H$_9$ | F | F | C$_4$H$_9$ | |
| 1-a-1-24 | C$_4$H$_9$ | F | Cl | C$_4$H$_9$ | |
| 1-a-1-25 | C$_4$H$_9$ | Cl | F | C$_4$H$_9$ | |
| 1-a-1-26 | C$_4$H$_9$ | F | F | C$_6$H$_{13}$ | |
| 1-a-1-27 | C$_4$H$_9$ | F | F | CH$_2$CH=CHCH$_3$ | |
| 1-a-1-28 | C$_5$H$_{11}$ | F | F | C$_2$H$_5$ | |
| 1-a-1-29 | C$_6$H$_{13}$ | F | F | C$_2$H$_5$ | |
| 1-a-1-30 | C$_7$H$_{15}$ | F | F | C$_2$H$_5$ | |
| 1-a-1-31 | C$_8$H$_{17}$ | F | F | C$_2$H$_5$ | |
| 1-a-1-32 | CH$_2$=CH | F | F | C$_2$H$_5$ | |
| 1-a-1-33 | CH$_2$=CHCH$_2$ | F | F | C$_2$H$_5$ | |
| 1-a-1-34 | CH$_3$CH$_2$=CHCH$_2$ | F | F | C$_2$H$_5$ | |
| 1-a-1-35 | CH$_3$CH$_2$=CHCH$_2$ | F | F | C$_4$H$_9$ | |
| 1-a-1-36 | CH$_2$=CH(CH$_2$)$_2$CH$_2$=CHCH$_2$ | F | F | C$_2$H$_5$ | |

TABLE 2-continued (1-a-2)

Structure: $R^1O$—cyclohexyl—phenyl($Q^1$, $Q^2$)—$OR^2$

| NO. | $R^1$ | $Q^1$ | $Q^2$ | $R^2$ | |
|---|---|---|---|---|---|
| | | | | | $\Delta\epsilon = -7.57$, $\Delta n = 0.067$, $\eta = 42.7$ mPa·s, C 64.7 Iso |
| 1-a-2-5 | $C_2H_5$ | F | Cl | $C_2H_5$ | |
| 1-a-2-6 | $C_2H_5$ | Cl | F | $C_2H_5$ | |
| 1-a-2-7 | $C_2H_5$ | F | F | $C_3H_7$ | |
| 1-a-2-8 | $C_2H_5$ | F | F | $C_4H_9$ | |
| 1-a-2-9 | $C_2H_5$ | F | Cl | $C_4H_9$ | |
| 1-a-2-10 | $C_2H_5$ | Cl | F | $C_4H_9$ | |
| 1-a-2-11 | $C_2H_5$ | F | F | $C_5H_{11}$ | |
| 1-a-2-12 | $C_2H_5$ | F | F | $C_6H_{13}$ | |
| 1-a-2-13 | $C_2H_5$ | F | F | $C_7H_{15}$ | |
| 1-a-2-14 | $C_2H_5$ | F | F | $C_8H_{17}$ | |
| 1-a-2-15 | $C_2H_5$ | F | F | $CH=CH_2$ | |
| 1-a-2-16 | $C_2H_5$ | F | F | $CH_2CH=CH_2$ | |
| 1-a-2-17 | $C_2H_5$ | F | F | $CH_2CH=CHCH_3$ | |
| 1-a-2-18 | $C_2H_5$ | F | F | $CH_2CH=CH(CH_2)_2CH=CH_2$ | |
| 1-a-2-19 | $C_3H_7$ | F | F | $C_2H_5$ | |
| 1-a-2-20 | $C_3H_7$ | F | F | $C_4H_9$ | |
| 1-a-2-21 | $C_4H_9$ | F | F | $CH_3$ | |
| 1-a-2-22 | $C_4H_9$ | F | F | $C_2H_5$ | NI = $-16.1°$ C., $\Delta\epsilon = -7.62$, $\Delta n = 0.065$, $\eta = 44.6$ mPa·s, C 40.3 Iso |
| 1-a-2-23 | $C_4H_9$ | F | Cl | $C_2H_5$ | |
| 1-a-2-24 | $C_4H_9$ | Cl | F | $C_2H_5$ | |
| 1-a-2-25 | $C_4H_9$ | F | F | $C_3H_7$ | |
| 1-a-2-26 | $C_4H_9$ | F | F | $C_4H_9$ | |
| 1-a-2-27 | $C_4H_9$ | F | Cl | $C_4H_9$ | |
| 1-a-2-28 | $C_4H_9$ | Cl | F | $C_4H_9$ | |
| 1-a-2-29 | $C_4H_9$ | F | F | $C_5H_{11}$ | |
| 1-a-2-30 | $C_4H_9$ | F | F | $C_6H_{13}$ | |
| 1-a-2-31 | $C_4H_9$ | F | F | $C_7H_{15}$ | |
| 1-a-2-32 | $C_4H_9$ | F | F | $C_8H_{17}$ | |
| 1-a-2-33 | $C_4H_9$ | F | F | $CH=CH_2$ | |
| 1-a-2-34 | $C_4H_9$ | F | F | $CH_2CH=CH_2$ | |
| 1-a-2-35 | $C_4H_9$ | F | F | $CH_2CH=CHCH_3$ | |
| 1-a-2-36 | $C_4H_9$ | F | F | $CH_2CH=CH(CH_2)_2CH=CH_2$ | |

TABLE 3

| NO. | $R^1$ | $Q^1$ | $Q^2$ | $R^2$ | |
|---|---|---|---|---|---|
| 1-a-2-37 | $C_5H_{11}$ | F | F | $C_2H_5$ | |
| 1-a-2-38 | $C_5H_{11}$ | F | F | $C_4H_9$ | |
| 1-a-2-39 | $C_6H_{13}$ | F | F | $C_2H_5$ | |
| 1-a-2-40 | $C_6H_{13}$ | F | F | $C_4H_9$ | |
| 1-a-2-41 | $C_6H_{13}$ | F | F | $C_6H_{13}$ | |
| 1-a-2-42 | $C_6H_{13}$ | F | F | $C_8H_{17}$ | |
| 1-a-2-43 | $C_6H_{13}$ | F | F | $CH=CH_2$ | |
| 1-a-2-44 | $C_6H_{13}$ | F | F | $CH_2CH=CH_2$ | |
| 1-a-2-45 | $C_6H_{13}$ | F | F | $CH_2CH=CHCH_3$ | |
| 1-a-2-46 | $C_7H_{15}$ | F | F | $C_2H_5$ | |
| 1-a-2-47 | $C_7H_{15}$ | F | F | $C_4H_9$ | |
| 1-a-2-48 | $C_8H_{17}$ | F | F | $C_2H_5$ | |
| 1-a-2-49 | $C_8H_{17}$ | F | F | $C_4H_9$ | |
| 1-a-2-50 | $C_8H_{17}$ | F | F | $C_6H_{13}$ | |
| 1-a-2-51 | $C_8H_{17}$ | F | F | $C_8H_{17}$ | |
| 1-a-2-52 | $C_8H_{17}$ | F | F | $CH=CH_2$ | |
| 1-a-2-53 | $C_8H_{17}$ | F | F | $CH_2CH=CH_2$ | |
| 1-a-2-54 | $C_8H_{17}$ | F | F | $CH_2CH=CHCH_3$ | |
| 1-a-2-55 | $CH_2=CH$ | F | F | $C_2H_5$ | |
| 1-a-2-56 | $CH_2=CH$ | F | F | $C_4H_9$ | |
| 1-a-2-57 | $CH_2=CH$ | F | F | $CH_2CH=CHCH_3$ | |
| 1-a-2-58 | $CH_2=CHCH_2$ | F | F | $C_2H_5$ | |
| 1-a-2-59 | $CH_2=CHCH_2$ | F | F | $CH_2CH=CHCH_3$ | |
| 1-a-2-60 | $CH_3CH_2=CHCH_2$ | F | F | $C_2H_5$ | NI = $-13.4°$ C., $\Delta\epsilon = -7.38$, $\Delta n = 0.083$, $\eta = 48.6$ mPa·s, C 60.8 Iso |
| 1-a-2-61 | $CH_3CH_2=CHCH_2$ | F | Cl | $C_2H_5$ | |
| 1-a-2-62 | $CH_3CH_2=CHCH_2$ | Cl | F | $C_2H_5$ | |
| 1-a-2-63 | $CH_3CH_2=CHCH_2$ | F | F | $C_3H_7$ | |
| 1-a-2-64 | $CH_3CH_2=CHCH_2$ | F | F | $C_4H_9$ | |
| 1-a-2-65 | $CH_3CH_2=CHCH_2$ | F | Cl | $C_4H_9$ | |
| 1-a-2-66 | $CH_3CH_2=CHCH_2$ | Cl | F | $C_4H_9$ | |
| 1-a-2-67 | $CH_3CH_2=CHCH_2$ | F | F | $C_6H_{13}$ | |
| 1-a-2-68 | $CH_3CH_2=CHCH_2$ | F | F | $CH=CH_2$ | |
| 1-a-2-69 | $CH_3CH_2=CHCH_2$ | F | F | $CH_2CH=CH_2$ | |
| 1-a-2-70 | $CH_3CH_2=CHCH_2$ | F | F | $CH_2CH=CHCH_3$ | |
| 1-a-2-71 | $CH_2=CH(CH_2)_2CH=CHCH_2$ | F | F | $C_2H_5$ | |
| 1-a-2-72 | $CH_2=CH(CH_2)_2CH=CHCH_2$ | F | F | $CH_2CH=CHCH_3$ | |

TABLE 4

(1-b-1)

R¹O—[cyclohexene]—[benzene(Q¹,Q²)]—[cyclohexene]—OR²

| NO. | R¹ | Q¹ | Q² | R² |
|---|---|---|---|---|
| 1-b-1-1 | CH₃ | F | F | C₂H₅ |
| 1-b-1-2 | C₂H₅ | F | F | C₂H₅ |
| 1-b-1-3 | C₂H₅ | F | Cl | C₂H₅ |
| 1-b-1-4 | C₂H₅ | F | F | C₃H₇ |
| 1-b-1-5 | C₂H₅ | F | F | C₄H₉ |
| 1-b-1-6 | C₂H₅ | F | Cl | C₄H₉ |
| 1-b-1-7 | C₂H₅ | Cl | F | C₄H₉ |
| 1-b-1-8 | C₂H₅ | F | F | C₅H₁₁ |
| 1-b-1-9 | C₂H₅ | F | F | C₆H₁₃ |
| 1-b-1-10 | C₂H₅ | F | F | C₇H₁₅ |
| 1-b-1-11 | C₂H₅ | F | F | C₈H₁₇ |
| 1-b-1-12 | C₂H₅ | F | F | CH=CH₂ |
| 1-b-1-13 | C₂H₅ | F | F | CH₂CH=CH₂ |
| 1-b-1-14 | C₂H₅ | F | F | CH₂CH=CHCH₃ |
| 1-b-1-15 | C₂H₅ | F | F | CH₂CH=CH(CH₂)₂CH=CH₂ |
| 1-b-1-16 | C₃H₇ | F | F | C₄H₉ |
| 1-b-1-17 | C₄H₉ | F | F | C₄H₉ |
| 1-b-1-18 | C₄H₉ | F | Cl | C₄H₉ |
| 1-b-1-19 | C₄H₉ | F | F | C₅H₁₁ |
| 1-b-1-20 | C₄H₉ | F | F | C₆H₁₃ |
| 1-b-1-21 | C₄H₉ | F | F | CH₂CH=CHCH₃ |
| 1-b-1-22 | C₆H₁₃ | F | F | C₆H₁₃ |
| 1-b-1-23 | C₈H₁₇ | F | F | C₈H₁₇ |
| 1-b-1-24 | CH₃CH=CHCH₂ | F | F | C₃H₇ |
| 1-b-1-25 | CH₃CH=CHCH₂ | F | F | CH₂CH=CHCH₃ |

TABLE 5

(1-b-2)

R¹O—[cyclohexene]—[benzene(Q¹,Q²)]—[cyclohexane]—OR²

| NO. | R¹ | Q¹ | Q² | R² |
|---|---|---|---|---|
| 1-b-2-1 | C₂H₅ | F | F | C₂H₅ |
| 1-b-2-2 | C₂H₅ | F | Cl | C₂H₅ |
| 1-b-2-3 | C₂H₅ | Cl | F | C₂H₅ |
| 1-b-2-4 | C₂H₅ | F | F | C₄H₉ |
| 1-b-2-5 | C₂H₅ | F | Cl | C₄H₉ |
| 1-b-2-6 | C₂H₅ | Cl | F | C₄H₉ |
| 1-b-2-7 | C₂H₅ | F | F | C₆H₁₃ |
| 1-b-2-8 | C₂H₅ | F | F | C₈H₁₇ |
| 1-b-2-9 | C₂H₅ | F | F | CH=CH₂ |
| 1-b-2-10 | C₂H₅ | F | F | CH₂CH=CH₂ |
| 1-b-2-11 | C₂H₅ | F | F | CH₂CH=CHCH₃ |
| 1-b-2-12 | C₄H₉ | F | F | C₂H₅ |
| 1-b-2-13 | C₄H₉ | F | Cl | C₂H₅ |
| 1-b-2-14 | C₄H₉ | Cl | F | C₂H₅ |
| 1-b-2-15 | C₄H₉ | F | F | C₄H₉ |
| 1-b-2-16 | C₄H₉ | F | Cl | C₄H₉ |
| 1-b-2-17 | C₄H₉ | Cl | F | C₄H₉ |
| 1-b-2-18 | C₄H₉ | F | F | C₆H₁₃ |
| 1-b-2-19 | C₄H₉ | F | F | CH₂CH=CHCH₃ |
| 1-b-2-20 | C₆H₁₃ | F | F | C₂H₅ |
| 1-b-2-21 | C₆H₁₃ | F | F | C₄H₉ |
| 1-b-2-22 | C₈H₁₇ | F | F | C₂H₅ |
| 1-b-2-23 | C₈H₁₇ | F | F | C₄H₉ |
| 1-b-2-24 | CH₂=CH | F | F | C₂H₅ |
| 1-b-2-25 | CH₂=CHCH₂ | F | F | C₂H₅ |
| 1-b-2-26 | CH₃CH₂=CHCH₂ | F | F | C₂H₅ |
| 1-b-2-27 | CH₃CH₂=CHCH₂ | F | F | C₄H₉ |

TABLE 6

(1-b-3)

R¹O—[cyclohexane]—[benzene(Q¹,Q²)]—[cyclohexane]—OR²

| NO. | R¹ | Q¹ | Q² | R² |
|---|---|---|---|---|
| 1-b-3-1 | CH₃ | F | F | C₂H₅ |
| 1-b-3-2 | CH₃ | F | F | C₄H₉ |
| 1-b-3-3 | C₂H₅ | F | F | C₂H₅ |
| 1-b-3-4 | C₂H₅ | F | Cl | C₂H₅ |
| 1-b-3-5 | C₂H₅ | F | F | C₃H₇ |
| 1-b-3-6 | C₂H₅ | F | F | C₄H₉ |

NI = 62.6° C., Δε = −5.13, Δn = 0.092, η = 64.8 mPa·s, C 65.1 N 99.9 Iso

| NO. | R¹ | Q¹ | Q² | R² |
|---|---|---|---|---|
| 1-b-3-7 | C₂H₅ | F | Cl | C₄H₉ |
| 1-b-3-8 | C₂H₅ | Cl | F | C₄H₉ |
| 1-b-3-9 | C₂H₅ | F | F | C₅H₁₁ |
| 1-b-3-10 | C₂H₅ | F | F | C₆H₁₃ |
| 1-b-3-11 | C₂H₅ | F | F | C₇H₁₅ |
| 1-b-3-12 | C₂H₅ | F | F | C₈H₁₇ |
| 1-b-3-13 | C₂H₅ | F | F | CH=CH₂ |
| 1-b-3-14 | C₂H₅ | F | F | CH₂CH=CH₂ |
| 1-b-3-15 | C₂H₅ | F | F | CH₂CH=CHCH₃ |
| 1-b-3-16 | C₂H₅ | F | F | CH₂CH=CH(CH₂)₂CH=CH₂ |
| 1-b-3-17 | C₃H₇ | F | F | C₄H₉ |
| 1-b-3-18 | C₄H₉ | F | F | C₄H₉ |
| 1-b-3-19 | C₄H₉ | F | Cl | C₄H₉ |
| 1-b-3-20 | C₄H₉ | F | F | C₅H₁₁ |
| 1-b-3-21 | C₄H₉ | F | F | C₆H₁₃ |
| 1-b-3-22 | C₄H₉ | F | F | C₇H₁₅ |
| 1-b-3-23 | C₄H₉ | F | F | C₈H₁₇ |
| 1-b-3-24 | C₄H₉ | F | F | CH=CH₂ |
| 1-b-3-25 | C₄H₉ | F | F | CH₂CH=CH₂ |
| 1-b-3-26 | C₄H₉ | F | F | CH₂CH=CHCH₃ |
| 1-b-3-27 | C₄H₉ | F | F | CH₂CH=CH(CH₂)₂CH=CH₂ |
| 1-b-3-28 | C₆H₁₃ | F | F | C₆H₁₃ |
| 1-b-3-29 | C₆H₁₃ | F | F | C₈H₁₇ |
| 1-b-3-30 | C₆H₁₃ | F | F | CH=CH₂ |
| 1-b-3-31 | C₆H₁₃ | F | F | CH₂CH=CH₂ |
| 1-b-3-32 | C₆H₁₃ | F | F | CH₂CH=CHCH₃ |
| 1-b-3-33 | C₈H₁₇ | F | F | C₈H₁₇ |
| 1-b-3-34 | C₈H₁₇ | F | F | CH=CH₂ |
| 1-b-3-35 | C₈H₁₇ | F | F | CH₂CH=CH₂ |
| 1-b-3-36 | C₈H₁₇ | F | F | CH₂CH=CHCH₃ |

TABLE 7

| NO. | R¹ | Q¹ | Q² | R² |
|---|---|---|---|---|
| 1-b-3-37 | CH₂=CH | F | F | CH₂CH=CHCH₃ |
| 1-b-3-38 | CH₂=CHCH₂ | F | F | CH₂CH=CHCH₃ |
| 1-b-3-39 | CH₃CH₂=CHCH₂ | F | Cl | C₂H₅ |
| 1-b-3-40 | CH₃CH₂=CHCH₂ | Cl | F | C₂H₅ |
| 1-b-3-41 | CH₃CH₂=CHCH₂ | F | F | C₃H₇ |
| 1-b-3-42 | CH₃CH₂=CHCH₂ | F | Cl | C₄H₉ |
| 1-b-3-43 | CH₃CH₂=CHCH₂ | Cl | F | C₄H₉ |
| 1-b-3-44 | CH₃CH₂=CHCH₂ | F | F | CH=CH₂ |
| 1-b-3-45 | CH₃CH₂=CHCH₂ | F | F | CH₂CH=CH₂ |
| 1-b-3-46 | CH₃CH₂=CHCH₂ | F | F | CH₂CH=CHCH₃ |
| 1-b-3-47 | CH₂=CH(CH₂)₂CH₂=CHCH₂ | F | F | CH₂CH=CHCH₃ |

TABLE 8

(1-c-1)

$R^1O-\text{[cyclohexenyl]}-\text{[phenyl}(Q^1)(Q^2)\text{]}-\text{[phenyl}(Q^3)(Q^4)\text{]}-OR^2$

| NO. | $R^1$ | $Q^1$ | $Q^2$ | $Q^3$ | $Q^4$ | $R^2$ |
|---|---|---|---|---|---|---|
| 1-c-1-1 | $CH_3$ | F | F | H | F | $C_2H_5$ |
| 1-c-1-2 | $CH_3$ | F | F | F | F | $C_2H_5$ |
| 1-c-1-3 | $CH_3$ | F | F | H | F | $C_4H_9$ |
| 1-c-1-4 | $CH_3$ | F | F | F | F | $C_4H_9$ |
| 1-c-1-5 | $C_2H_5$ | F | F | H | F | $CH_3$ |
| 1-c-1-6 | $C_2H_5$ | F | F | F | F | $CH_3$ |
| 1-c-1-7 | $C_2H_5$ | F | F | H | F | $C_2H_5$ |
| 1-c-1-8 | $C_2H_5$ | F | F | F | F | $C_2H_5$ |
| 1-c-1-9 | $C_2H_5$ | F | Cl | H | F | $C_2H_5$ |
| 1-c-1-10 | $C_2H_5$ | F | Cl | F | F | $C_2H_5$ |
| 1-c-1-11 | $C_2H_5$ | Cl | F | H | F | $C_2H_5$ |
| 1-c-1-12 | $C_2H_5$ | Cl | F | F | F | $C_2H_5$ |
| 1-c-1-13 | $C_2H_5$ | F | F | F | Cl | $C_2H_5$ |
| 1-c-1-14 | $C_2H_5$ | F | F | F | Cl | $C_2H_5$ |
| 1-c-1-15 | $C_2H_5$ | F | F | Cl | F | $C_2H_5$ |
| 1-c-1-16 | $C_2H_5$ | F | F | Cl | F | $C_2H_5$ |
| 1-c-1-17 | $C_2H_5$ | F | F | H | F | $C_3H_7$ |
| 1-c-1-18 | $C_2H_5$ | F | F | F | F | $C_3H_7$ |
| 1-c-1-19 | $C_2H_5$ | F | F | H | F | $C_4H_9$ |
| 1-c-1-20 | $C_2H_5$ | F | F | F | F | $C_4H_9$ |
| 1-c-1-21 | $C_2H_5$ | F | Cl | H | F | $C_4H_9$ |
| 1-c-1-22 | $C_2H_5$ | F | Cl | F | F | $C_4H_9$ |
| 1-c-1-23 | $C_2H_5$ | Cl | F | H | F | $C_4H_9$ |
| 1-c-1-24 | $C_2H_5$ | Cl | F | F | F | $C_4H_9$ |
| 1-c-1-25 | $C_2H_5$ | F | F | F | Cl | $C_4H_9$ |
| 1-c-1-26 | $C_2H_5$ | F | F | F | Cl | $C_4H_9$ |
| 1-c-1-27 | $C_2H_5$ | F | F | Cl | F | $C_4H_9$ |
| 1-c-1-28 | $C_2H_5$ | F | F | Cl | F | $C_4H_9$ |
| 1-c-1-29 | $C_2H_5$ | F | F | H | F | $C_5H_{11}$ |
| 1-c-1-30 | $C_2H_5$ | F | F | F | F | $C_5H_{11}$ |
| 1-c-1-31 | $C_2H_5$ | F | F | H | F | $C_6H_{13}$ |
| 1-c-1-32 | $C_2H_5$ | F | F | F | F | $C_6H_{13}$ |
| 1-c-1-33 | $C_2H_5$ | F | F | H | F | $C_7H_{15}$ |
| 1-c-1-34 | $C_2H_5$ | F | F | F | F | $C_7H_{15}$ |
| 1-c-1-35 | $C_2H_5$ | F | F | H | F | $C_8H_{17}$ |
| 1-c-1-36 | $C_2H_5$ | F | F | F | F | $C_8H_{17}$ |

TABLE 9

| NO. | $R^1$ | $Q^1$ | $Q^2$ | $Q^3$ | $Q^4$ | $R^2$ | |
|---|---|---|---|---|---|---|---|
| 1-c-1-37 | $C_2H_5$ | F | F | H | F | $CH=CH_2$ | |
| 1-c-1-38 | $C_2H_5$ | F | F | F | F | $CH=CH_2$ | |
| 1-c-1-39 | $C_2H_5$ | F | F | H | F | $CH_2CH=CH_2$ | |
| 1-c-1-40 | $C_2H_5$ | F | F | F | F | $CH_2CH=CH_2$ | |
| 1-c-1-41 | $C_2H_5$ | F | F | H | F | $CH_2CH=CHCH_3$ | |
| 1-c-1-42 | $C_2H_5$ | F | F | F | F | $CH_2CH=CHCH_3$ | |
| 1-c-1-43 | $C_2H_5$ | F | F | H | F | $CH_2CH=CH(CH_2)_2CH=CH_2$ | |
| 1-c-1-44 | $C_2H_5$ | F | F | F | F | $CH_2CH=CH(CH_2)_2CH=CH_2$ | |
| 1-c-1-45 | $C_3H_7$ | F | F | H | F | $C_2H_5$ | |
| 1-c-1-46 | $C_3H_7$ | F | F | F | F | $C_2H_5$ | |
| 1-c-1-47 | $C_3H_7$ | F | F | H | F | $C_4H_9$ | |
| 1-c-1-48 | $C_3H_7$ | F | F | F | F | $C_4H_9$ | |
| 1-c-1-49 | $C_4H_9$ | F | F | H | F | $CH_3$ | |
| 1-c-1-50 | $C_4H_9$ | F | F | F | F | $CH_3$ | |
| 1-c-1-51 | $C_4H_9$ | F | F | H | F | $C_2H_5$ | NI = 87.9° C., Δε = −5.17, Δn = 0.192, η = 78.1 mPa·s, C 35.9 C 46.6 SA 81.8 N 97.5 Iso |
| 1-c-1-52 | $C_4H_9$ | F | F | F | F | $C_2H_5$ | NI = 73.9° C., Δε = −8.31, Δn = 0.172, η = 87.6 mPa·s, C 51.2 N 70.5 Iso |
| 1-c-1-53 | $C_4H_9$ | F | Cl | H | F | $C_2H_5$ | |
| 1-c-1-54 | $C_4H_9$ | F | Cl | F | F | $C_2H_5$ | |
| 1-c-1-55 | $C_4H_9$ | Cl | F | H | F | $C_2H_5$ | |
| 1-c-1-56 | $C_4H_9$ | Cl | F | F | F | $C_2H_5$ | |
| 1-c-1-57 | $C_4H_9$ | F | F | F | Cl | $C_2H_5$ | |
| 1-c-1-58 | $C_4H_9$ | F | F | F | Cl | $C_2H_5$ | |
| 1-c-1-59 | $C_4H_9$ | F | F | Cl | F | $C_2H_5$ | |
| 1-c-1-60 | $C_4H_9$ | F | F | Cl | F | $C_2H_5$ | |
| 1-c-1-61 | $C_4H_9$ | F | F | H | F | $C_3H_7$ | |
| 1-c-1-62 | $C_4H_9$ | F | F | F | F | $C_3H_7$ | |
| 1-c-1-63 | $C_4H_9$ | F | F | H | F | $C_4H_9$ | |
| 1-c-1-64 | $C_4H_9$ | F | F | F | F | $C_4H_9$ | |
| 1-c-1-65 | $C_4H_9$ | F | Cl | H | F | $C_4H_9$ | |
| 1-c-1-66 | $C_4H_9$ | F | Cl | F | F | $C_4H_9$ | |
| 1-c-1-67 | $C_4H_9$ | Cl | F | H | F | $C_4H_9$ | |
| 1-c-1-68 | $C_4H_9$ | Cl | F | F | F | $C_4H_9$ | |
| 1-c-1-69 | $C_4H_9$ | F | F | F | Cl | $C_4H_9$ | |
| 1-c-1-70 | $C_4H_9$ | F | F | F | Cl | $C_4H_9$ | |
| 1-c-1-71 | $C_4H_9$ | F | F | Cl | F | $C_4H_9$ | |
| 1-c-1-72 | $C_4H_9$ | F | F | Cl | F | $C_4H_9$ | |
| 1-c-1-73 | $C_4H_9$ | F | F | H | F | $C_6H_{13}$ | |
| 1-c-1-74 | $C_4H_9$ | F | F | F | F | $C_6H_{13}$ | |

TABLE 10

| NO. | R¹ | Q¹ | Q² | Q³ | Q⁴ | R² |
|---|---|---|---|---|---|---|
| 1-c-1-75 | $C_4H_9$ | F | F | H | F | $CH=CH_2$ |
| 1-c-1-76 | $C_4H_9$ | F | F | F | F | $CH=CH_2$ |
| 1-c-1-77 | $C_4H_9$ | F | F | H | F | $CH_2CH=CH_2$ |
| 1-c-1-78 | $C_4H_9$ | F | F | F | F | $CH_2CH=CH_2$ |
| 1-c-1-79 | $C_4H_9$ | F | F | H | F | $CH_2CH=CHCH_3$ |
| 1-c-1-80 | $C_4H_9$ | F | F | F | F | $CH_2CH=CHCH_3$ |
| 1-c-1-81 | $C_4H_9$ | F | F | H | F | $CH_2CH=CH(CH_2)_2CH=CH_2$ |
| 1-c-1-82 | $C_4H_9$ | F | F | F | F | $CH_2CH=CH(CH_2)_2CH=CH_2$ |
| 1-c-1-83 | $C_5H_{11}$ | F | F | H | F | $C_2H_5$ |
| 1-c-1-84 | $C_5H_{11}$ | F | F | F | F | $C_2H_5$ |
| 1-c-1-85 | $C_6H_{13}$ | F | F | H | F | $C_2H_5$ |
| 1-c-1-86 | $C_6H_{13}$ | F | F | F | F | $C_2H_5$ |
| 1-c-1-87 | $C_7H_{15}$ | F | F | H | F | $C_2H_5$ |
| 1-c-1-88 | $C_7H_{15}$ | F | F | F | F | $C_2H_5$ |
| 1-c-1-89 | $C_8H_{17}$ | F | F | H | F | $C_2H_5$ |
| 1-c-1-90 | $C_8H_{17}$ | F | F | F | F | $C_2H_5$ |
| 1-c-1-91 | $CH_2=CH$ | F | F | H | F | $C_2H_5$ |
| 1-c-1-92 | $CH_2=CH$ | F | F | F | F | $C_2H_5$ |
| 1-c-1-93 | $CH_2=CHCH_2$ | F | F | H | F | $C_2H_5$ |
| 1-c-1-94 | $CH_2=CHCH_2$ | F | F | F | F | $C_2H_5$ |
| 1-c-1-95 | $CH_3CH_2=CHCH_2$ | F | F | H | F | $C_2H_5$ |
| 1-c-1-96 | $CH_3CH_2=CHCH_2$ | F | F | F | F | $C_2H_5$ |
| 1-c-1-97 | $CH_3CH_2=CHCH_2$ | F | F | H | F | $C_4H_9$ |
| 1-c-1-98 | $CH_3CH_2=CHCH_2$ | F | F | F | F | $C_4H_9$ |
| 1-c-1-99 | $CH_2=CH(CH_2)_2CH_2=CHCH_2$ | F | F | H | F | $C_2H_5$ |
| 1-c-1-100 | $CH_2=CH(CH_2)_2CH_2=CHCH_2$ | F | F | F | F | $C_2H_5$ |

TABLE 11

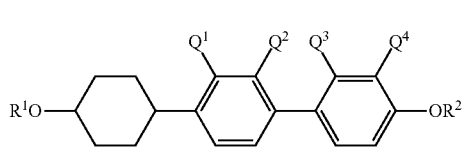

(1-c-2)

| NO. | R¹ | Q¹ | Q² | Q³ | Q⁴ | R² |
|---|---|---|---|---|---|---|
| 1-c-2-1 | $CH_3$ | F | F | H | F | $C_2H_5$ |
| 1-c-2-2 | $CH_3$ | F | F | F | F | $C_2H_5$ |
| 1-c-2-3 | $CH_3$ | F | F | H | F | $C_4H_9$ |
| 1-c-2-4 | $CH_3$ | F | F | F | F | $C_4H_9$ |
| 1-c-2-5 | $C_2H_5$ | F | F | H | F | $CH_3$ |
| 1-c-2-6 | $C_2H_5$ | F | F | F | F | $CH_3$ |
| 1-c-2-7 | $C_2H_5$ | F | F | H | F | $C_2H_5$ |
| 1-c-2-8 | $C_2H_5$ | F | F | F | F | $C_2H_5$ NI = 90.6° C., Δε = −10.22, Δn = 0.149, η = 92.1 mPa·s, C 99.5 C (84.6 N) 114.0 Iso |
| 1-c-2-9 | $C_2H_5$ | F | Cl | H | F | $C_2H_5$ |
| 1-c-2-10 | $C_2H_5$ | F | Cl | F | F | $C_2H_5$ |
| 1-c-2-11 | $C_2H_5$ | Cl | F | H | F | $C_2H_5$ |
| 1-c-2-12 | $C_2H_5$ | Cl | F | F | F | $C_2H_5$ |
| 1-c-2-13 | $C_2H_5$ | F | F | F | Cl | $C_2H_5$ |
| 1-c-2-14 | $C_2H_5$ | F | F | F | Cl | $C_2H_5$ |
| 1-c-2-15 | $C_2H_5$ | F | F | Cl | F | $C_2H_5$ |
| 1-c-2-16 | $C_2H_5$ | F | F | Cl | F | $C_2H_5$ |

TABLE 11-continued (1-c-2)

| NO. | R¹ | Q¹ | Q² | Q³ | Q⁴ | R² |
|---|---|---|---|---|---|---|
| 1-c-2-17 | $C_2H_5$ | F | F | H | F | $C_3H_7$ |
| 1-c-2-18 | $C_2H_5$ | F | F | F | F | $C_3H_7$ |
| 1-c-2-19 | $C_2H_5$ | F | F | H | F | $C_4H_9$ |
| 1-c-2-20 | $C_2H_5$ | F | F | F | F | $C_4H_9$ |
| 1-c-2-21 | $C_2H_5$ | F | Cl | H | F | $C_4H_9$ |
| 1-c-2-22 | $C_2H_5$ | F | Cl | F | F | $C_4H_9$ |
| 1-c-2-23 | $C_2H_5$ | Cl | F | H | F | $C_4H_9$ |
| 1-c-2-24 | $C_2H_5$ | Cl | F | F | F | $C_4H_9$ |
| 1-c-2-25 | $C_2H_5$ | F | F | F | Cl | $C_4H_9$ |
| 1-c-2-26 | $C_2H_5$ | F | F | F | Cl | $C_4H_9$ |
| 1-c-2-27 | $C_2H_5$ | F | F | Cl | F | $C_4H_9$ |
| 1-c-2-28 | $C_2H_5$ | F | F | Cl | F | $C_4H_9$ |
| 1-c-2-29 | $C_2H_5$ | F | F | H | F | $C_5H_{11}$ |
| 1-c-2-30 | $C_2H_5$ | F | F | F | F | $C_5H_{11}$ |
| 1-c-2-31 | $C_2H_5$ | F | F | H | F | $C_6H_{13}$ |
| 1-c-2-32 | $C_2H_5$ | F | F | F | F | $C_6H_{13}$ |
| 1-c-2-33 | $C_2H_5$ | F | F | H | F | $C_7H_{15}$ |
| 1-c-2-34 | $C_2H_5$ | F | F | F | F | $C_7H_{15}$ |
| 1-c-2-35 | $C_2H_5$ | F | F | H | F | $C_8H_{17}$ |
| 1-c-2-36 | $C_2H_5$ | F | F | F | F | $C_8H_{17}$ |

TABLE 12

| NO. | R¹ | Q¹ | Q² | Q³ | Q⁴ | R² |
|---|---|---|---|---|---|---|
| 1-c-2-37 | $C_2H_5$ | F | F | H | F | $CH=CH_2$ |
| 1-c-2-38 | $C_2H_5$ | F | F | F | F | $CH=CH_2$ |
| 1-c-2-39 | $C_2H_5$ | F | F | H | F | $CH_2CH=CH_2$ |
| 1-c-2-40 | $C_2H_5$ | F | F | F | F | $CH_2CH=CH_2$ |
| 1-c-2-41 | $C_2H_5$ | F | F | H | F | $CH_2CH=CHCH_3$ |
| 1-c-2-42 | $C_2H_5$ | F | F | F | F | $CH_2CH=CHCH_3$ |
| 1-c-2-43 | $C_2H_5$ | F | F | H | F | $CH_2CH=CH(CH_2)_2CH=CH_2$ |
| 1-c-2-44 | $C_2H_5$ | F | F | F | F | $CH_2CH=CH(CH_2)_2CH=CH_2$ |

TABLE 12-continued

| NO. | R$^1$ | Q$^1$ | Q$^2$ | Q$^3$ | Q$^4$ | R$^2$ | |
|---|---|---|---|---|---|---|---|
| 1-c-2-45 | C$_3$H$_7$ | F | F | H | F | C$_2$H$_5$ | |
| 1-c-2-46 | C$_3$H$_7$ | F | F | F | F | C$_2$H$_5$ | |
| 1-c-2-47 | C$_3$H$_7$ | F | F | H | F | C$_4$H$_9$ | |
| 1-c-2-48 | C$_3$H$_7$ | F | F | F | F | C$_4$H$_9$ | |
| 1-c-2-49 | C$_4$H$_9$ | F | F | H | F | CH$_3$ | |
| 1-c-2-50 | C$_4$H$_9$ | F | F | F | F | CH$_3$ | |
| 1-c-2-51 | C$_4$H$_9$ | F | F | H | F | C$_2$H$_5$ | NI = 105.3° C., Δε = −5.78, Δn = 0.160, η = 83.7 mPa · s, C 49.8 C 58.2 SA 72.8 N 124.6 Iso |
| 1-c-2-52 | C$_4$H$_9$ | F | F | F | F | C$_2$H$_5$ | NI = 92.6° C., Δε = −9.45, Δn = 0.148, η = 95.3 mPa · s, C 62.9 N 108.3 Iso |
| 1-c-2-53 | C$_4$H$_9$ | F | Cl | H | F | C$_2$H$_5$ | |
| 1-c-2-54 | C$_4$H$_9$ | F | Cl | F | F | C$_2$H$_5$ | |
| 1-c-2-55 | C$_4$H$_9$ | Cl | F | H | F | C$_2$H$_5$ | |
| 1-c-2-56 | C$_4$H$_9$ | Cl | F | F | F | C$_2$H$_5$ | |
| 1-c-2-57 | C$_4$H$_9$ | F | F | F | Cl | C$_2$H$_5$ | |
| 1-c-2-58 | C$_4$H$_9$ | F | F | F | Cl | C$_2$H$_5$ | |
| 1-c-2-59 | C$_4$H$_9$ | F | F | Cl | F | C$_2$H$_5$ | |
| 1-c-2-60 | C$_4$H$_9$ | F | F | Cl | F | C$_2$H$_5$ | |
| 1-c-2-61 | C$_4$H$_9$ | F | F | H | F | C$_3$H$_7$ | |
| 1-c-2-62 | C$_4$H$_9$ | F | F | F | F | C$_3$H$_7$ | |
| 1-c-2-63 | C$_4$H$_9$ | F | F | H | F | C$_4$H$_9$ | |
| 1-c-2-64 | C$_4$H$_9$ | F | F | F | F | C$_4$H$_9$ | |
| 1-c-2-65 | C$_4$H$_9$ | F | Cl | H | F | C$_4$H$_9$ | |
| 1-c-2-66 | C$_4$H$_9$ | F | Cl | F | F | C$_4$H$_9$ | |
| 1-c-2-67 | C$_4$H$_9$ | Cl | F | H | F | C$_4$H$_9$ | |
| 1-c-2-68 | C$_4$H$_9$ | Cl | F | F | F | C$_4$H$_9$ | |
| 1-c-2-69 | C$_4$H$_9$ | F | F | F | Cl | C$_4$H$_9$ | |
| 1-c-2-70 | C$_4$H$_9$ | F | F | F | Cl | C$_4$H$_9$ | |
| 1-c-2-71 | C$_4$H$_9$ | F | F | Cl | F | C$_4$H$_9$ | |
| 1-c-2-72 | C$_4$H$_9$ | F | F | Cl | F | C$_4$H$_9$ | |

TABLE 13

| NO. | R$^1$ | Q$^1$ | Q$^2$ | Q$^3$ | Q$^4$ | R$^2$ |
|---|---|---|---|---|---|---|
| 1-c-2-73 | C$_4$H$_9$ | F | F | H | F | C$_5$H$_{11}$ |
| 1-c-2-74 | C$_4$H$_9$ | F | F | F | F | C$_5$H$_{11}$ |
| 1-c-2-75 | C$_4$H$_9$ | F | F | H | F | C$_6$H$_{13}$ |
| 1-c-2-76 | C$_4$H$_9$ | F | F | F | F | C$_6$H$_{13}$ |
| 1-c-2-77 | C$_4$H$_9$ | F | F | H | F | C$_7$H$_{15}$ |
| 1-c-2-78 | C$_4$H$_9$ | F | F | F | F | C$_7$H$_{15}$ |
| 1-c-2-79 | C$_4$H$_9$ | F | F | H | F | C$_8$H$_{17}$ |
| 1-c-2-80 | C$_4$H$_9$ | F | F | F | F | C$_8$H$_{17}$ |
| 1-c-2-81 | C$_4$H$_9$ | F | F | H | F | CH=CH$_2$ |
| 1-c-2-82 | C$_4$H$_9$ | F | F | F | F | CH=CH$_2$ |
| 1-c-2-83 | C$_4$H$_9$ | F | F | H | F | CH$_2$CH=CH$_2$ |
| 1-c-2-84 | C$_4$H$_9$ | F | F | F | F | CH$_2$CH=CH$_2$ |
| 1-c-2-85 | C$_4$H$_9$ | F | F | H | F | CH$_2$CH=CHCH$_3$ |
| 1-c-2-86 | C$_4$H$_9$ | F | F | F | F | CH$_2$CH=CHCH$_3$ |
| 1-c-2-87 | C$_4$H$_9$ | F | F | H | F | CH$_2$CH=CH(CH$_2$)$_2$CH=CH$_2$ |
| 1-c-2-88 | C$_4$H$_9$ | F | F | F | F | CH$_2$CH=CH(CH$_2$)$_2$CH=CH$_2$ |
| 1-c-2-89 | C$_5$H$_{11}$ | F | F | H | F | C$_2$H$_5$ |
| 1-c-2-90 | C$_5$H$_{11}$ | F | F | F | F | C$_2$H$_5$ |
| 1-c-2-91 | C$_5$H$_{11}$ | F | F | H | F | C$_4$H$_9$ |
| 1-c-2-92 | C$_5$H$_{11}$ | F | F | F | F | C$_4$H$_9$ |
| 1-c-2-93 | C$_6$H$_{13}$ | F | F | H | F | C$_2$H$_5$ |
| 1-c-2-94 | C$_6$H$_{13}$ | F | F | F | F | C$_2$H$_5$ |
| 1-c-2-95 | C$_6$H$_{13}$ | F | F | H | F | C$_4$H$_9$ |
| 1-c-2-96 | C$_6$H$_{13}$ | F | F | F | F | C$_4$H$_9$ |
| 1-c-2-97 | C$_6$H$_{13}$ | F | F | H | F | C$_6$H$_{13}$ |
| 1-c-2-98 | C$_6$H$_{13}$ | F | F | F | F | C$_6$H$_{13}$ |
| 1-c-2-99 | C$_6$H$_{13}$ | F | F | H | F | C$_8$H$_{17}$ |
| 1-c-2-100 | C$_6$H$_{13}$ | F | F | F | F | C$_8$H$_{17}$ |
| 1-c-2-101 | C$_6$H$_{13}$ | F | F | H | F | CH=CH$_2$ |
| 1-c-2-102 | C$_6$H$_{13}$ | F | F | F | F | CH=CH$_2$ |
| 1-c-2-103 | C$_6$H$_{13}$ | F | F | H | F | CH$_2$CH=CH$_2$ |
| 1-c-2-104 | C$_6$H$_{13}$ | F | F | F | F | CH$_2$CH=CH$_2$ |
| 1-c-2-105 | C$_6$H$_{13}$ | F | F | H | F | CH$_2$CH=CHCH$_3$ |
| 1-c-2-106 | C$_6$H$_{13}$ | F | F | F | F | CH$_2$CH=CHCH$_3$ |
| 1-c-2-107 | C$_7$H$_{15}$ | F | F | H | F | C$_2$H$_5$ |
| 1-c-2-108 | C$_7$H$_{15}$ | F | F | F | F | C$_2$H$_5$ |

TABLE 14

| NO. | R$^1$ | Q$^1$ | Q$^2$ | Q$^3$ | Q$^4$ | R$^2$ |
|---|---|---|---|---|---|---|
| 1-c-2-109 | C$_7$H$_{15}$ | F | F | H | F | C$_4$H$_9$ |
| 1-c-2-110 | C$_7$H$_{15}$ | F | F | F | F | C$_4$H$_9$ |
| 1-c-2-111 | C$_8$H$_{17}$ | F | F | H | F | C$_2$H$_5$ |
| 1-c-2-112 | C$_8$H$_{17}$ | F | F | F | F | C$_2$H$_5$ |
| 1-c-2-113 | C$_8$H$_{17}$ | F | F | H | F | C$_4$H$_9$ |
| 1-c-2-114 | C$_8$H$_{17}$ | F | F | F | F | C$_4$H$_9$ |
| 1-c-2-115 | C$_8$H$_{17}$ | F | F | H | F | C$_6$H$_{13}$ |
| 1-c-2-116 | C$_8$H$_{17}$ | F | F | F | F | C$_6$H$_{13}$ |
| 1-c-2-117 | C$_8$H$_{17}$ | F | F | H | F | C$_8$H$_{17}$ |
| 1-c-2-118 | C$_8$H$_{17}$ | F | F | F | F | C$_8$H$_{17}$ |
| 1-c-2-119 | C$_8$H$_{17}$ | F | F | H | F | CH=CH$_2$ |
| 1-c-2-120 | C$_8$H$_{17}$ | F | F | F | F | CH=CH$_2$ |
| 1-c-2-121 | C$_8$H$_{17}$ | F | F | H | F | CH$_2$CH=CH$_2$ |
| 1-c-2-122 | C$_8$H$_{17}$ | F | F | F | F | CH$_2$CH=CH$_2$ |
| 1-c-2-123 | C$_8$H$_{17}$ | F | F | H | F | CH$_2$CH=CHCH$_3$ |
| 1-c-2-124 | C$_8$H$_{17}$ | F | F | F | F | CH$_2$CH=CHCH$_3$ |
| 1-c-2-125 | CH$_2$=CH | F | F | H | F | C$_2$H$_5$ |
| 1-c-2-126 | CH$_2$=CH | F | F | F | F | C$_2$H$_5$ |
| 1-c-2-127 | CH$_2$=CH | F | F | H | F | C$_4$H$_9$ |
| 1-c-2-128 | CH$_2$=CH | F | F | F | F | C$_4$H$_9$ |
| 1-c-2-129 | CH$_2$=CH | F | F | H | F | CH$_2$CH=CHCH$_3$ |
| 1-c-2-130 | CH$_2$=CH | F | F | F | F | CH$_2$CH=CHCH$_3$ |
| 1-c-2-131 | CH$_2$=CHCH$_2$ | F | F | H | F | C$_2$H$_5$ |
| 1-c-2-132 | CH$_2$=CHCH$_2$ | F | F | F | F | C$_2$H$_5$ |
| 1-c-2-133 | CH$_2$=CHCH$_2$ | F | F | H | F | CH$_2$CH=CHCH$_3$ |
| 1-c-2-134 | CH$_2$=CHCH$_2$ | F | F | F | F | CH$_2$CH=CHCH$_3$ |
| 1-c-2-135 | CH$_3$CH$_2$=CHCH$_2$ | F | F | H | F | C$_2$H$_5$ |
| 1-c-2-136 | CH$_3$CH$_2$=CHCH$_2$ | F | F | F | F | C$_2$H$_5$ |
| 1-c-2-137 | CH$_3$CH$_2$=CHCH$_2$ | F | Cl | H | F | C$_2$H$_5$ |
| 1-c-2-138 | CH$_3$CH$_2$=CHCH$_2$ | F | Cl | F | F | C$_2$H$_5$ |
| 1-c-2-139 | CH$_3$CH$_2$=CHCH$_2$ | Cl | F | H | F | C$_2$H$_5$ |
| 1-c-2-140 | CH$_3$CH$_2$=CHCH$_2$ | Cl | F | F | F | C$_2$H$_5$ |
| 1-c-2-141 | CH$_3$CH$_2$=CHCH$_2$ | F | F | F | Cl | C$_2$H$_5$ |
| 1-c-2-142 | CH$_3$CH$_2$=CHCH$_2$ | F | F | F | Cl | C$_2$H$_5$ |
| 1-c-2-143 | CH$_3$CH$_2$=CHCH$_2$ | F | F | Cl | F | C$_2$H$_5$ |
| 1-c-2-144 | CH$_3$CH$_2$=CHCH$_2$ | F | F | Cl | F | C$_2$H$_5$ |

TABLE 15

| NO. | R¹ | Q¹ | Q² | Q³ | Q⁴ | R² |
|---|---|---|---|---|---|---|
| 1-c-2-145 | CH$_3$CH=CHCH$_2$ | F | F | H | F | C$_3$H$_7$ |
| 1-c-2-146 | CH$_3$CH=CHCH$_2$ | F | F | F | F | C$_3$H$_7$ |
| 1-c-2-147 | CH$_3$CH=CHCH$_2$ | F | F | H | F | C$_4$H$_9$ |
| 1-c-2-148 | CH$_3$CH=CHCH$_2$ | F | F | F | F | C$_4$H$_9$ |
| 1-c-2-149 | CH$_3$CH=CHCH$_2$ | F | Cl | H | F | C$_4$H$_9$ |
| 1-c-2-150 | CH$_3$CH=CHCH$_2$ | F | Cl | F | F | C$_4$H$_9$ |
| 1-c-2-151 | CH$_3$CH=CHCH$_2$ | Cl | F | H | F | C$_4$H$_9$ |
| 1-c-2-152 | CH$_3$CH=CHCH$_2$ | Cl | F | F | F | C$_4$H$_9$ |
| 1-c-2-153 | CH$_3$CH=CHCH$_2$ | F | F | F | Cl | C$_4$H$_9$ |
| 1-c-2-154 | CH$_3$CH=CHCH$_2$ | F | F | F | Cl | C$_4$H$_9$ |
| 1-c-2-155 | CH$_3$CH=CHCH$_2$ | F | F | Cl | F | C$_4$H$_9$ |
| 1-c-2-156 | CH$_3$CH=CHCH$_2$ | F | F | Cl | F | C$_4$H$_9$ |
| 1-c-2-157 | CH$_3$CH=CHCH$_2$ | F | F | H | F | C$_6$H$_{13}$ |
| 1-c-2-158 | CH$_3$CH=CHCH$_2$ | F | F | F | F | C$_6$H$_{13}$ |
| 1-c-2-159 | CH$_3$CH=CHCH$_2$ | F | F | H | F | CH=CH$_2$ |
| 1-c-2-160 | CH$_3$CH=CHCH$_2$ | F | F | F | F | CH=CH$_2$ |
| 1-c-2-161 | CH$_3$CH=CHCH$_2$ | F | F | H | F | CH$_2$CH=CH$_2$ |
| 1-c-2-162 | CH$_3$CH=CHCH$_2$ | F | F | F | F | CH$_2$CH=CH$_2$ |
| 1-c-2-163 | CH$_3$CH=CHCH$_2$ | F | F | H | F | CH$_2$CH=CHCH$_3$ |
| 1-c-2-164 | CH$_3$CH=CHCH$_2$ | F | F | F | F | CH$_2$CH=CHCH$_3$ |
| 1-c-2-165 | CH$_2$=CH(CH$_2$)$_2$CH$_2$=CHCH$_2$ | F | F | H | F | C$_2$H$_5$ |
| 1-c-2-166 | CH$_2$=CH(CH$_2$)$_2$CH$_2$=CHCH$_2$ | F | F | F | F | C$_2$H$_5$ |
| 1-c-2-167 | CH$_2$=CH(CH$_2$)$_2$CH$_2$=CHCH$_3$ | F | F | H | F | CH$_2$CH=CHCH$_3$ |
| 1-c-2-168 | CH$_2$=CH(CH$_2$)$_2$CH$_2$=CHCH$_3$ | F | F | F | F | CH$_2$CH=CHCH$_3$ |

TABLE 16

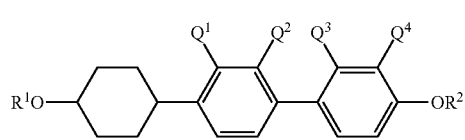

(i-d)

| NO. | R¹ | Q¹ | Q² | Q³ | Q⁴ | R² |
|---|---|---|---|---|---|---|
| i-d-1 | CH$_3$ | F | F | H | F | C$_2$H$_5$ |
| i-d-2 | CH$_3$ | F | F | F | F | C$_2$H$_5$ |
| i-d-3 | CH$_3$ | F | F | H | F | C$_4$H$_9$ |
| i-d-4 | CH$_3$ | F | F | F | F | C$_4$H$_9$ |
| i-d-5 | C$_2$H$_5$ | F | F | H | F | CH$_3$ |
| i-d-6 | C$_2$H$_5$ | F | F | F | F | CH$_3$ |
| i-d-7 | C$_2$H$_5$ | F | F | H | F | C$_2$H$_5$ |
| i-d-8 | C$_2$H$_5$ | F | F | F | F | C$_2$H$_5$ |
| i-d-9 | C$_2$H$_5$ | F | Cl | H | F | C$_2$H$_5$ |
| i-d-10 | C$_2$H$_5$ | F | Cl | F | F | C$_2$H$_5$ |
| i-d-11 | C$_2$H$_5$ | Cl | F | H | F | C$_2$H$_5$ |
| i-d-12 | C$_2$H$_5$ | Cl | F | F | F | C$_2$H$_5$ |
| i-d-13 | C$_2$H$_5$ | F | F | F | Cl | C$_2$H$_5$ |
| i-d-14 | C$_2$H$_5$ | F | F | F | Cl | C$_2$H$_5$ |
| i-d-15 | C$_2$H$_5$ | F | F | Cl | F | C$_2$H$_5$ |
| i-d-16 | C$_2$H$_5$ | F | F | Cl | F | C$_2$H$_5$ |
| i-d-17 | C$_2$H$_5$ | F | F | H | F | C$_3$H$_7$ |
| i-d-18 | C$_2$H$_5$ | F | F | F | F | C$_3$H$_7$ |

TABLE 16-continued

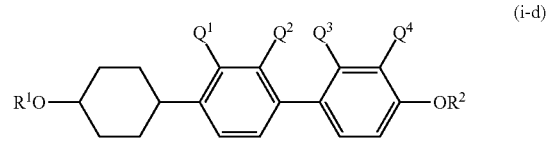

(i-d)

| NO. | R¹ | Q¹ | Q² | Q³ | Q⁴ | R² |
|---|---|---|---|---|---|---|
| i-d-19 | C$_2$H$_5$ | F | F | H | F | C$_4$H$_9$ |
| i-d-20 | C$_2$H$_5$ | F | F | F | F | C$_4$H$_9$ |
| i-d-21 | C$_2$H$_5$ | F | Cl | H | F | C$_4$H$_9$ |
| i-d-22 | C$_2$H$_5$ | F | Cl | F | F | C$_4$H$_9$ |
| i-d-23 | C$_2$H$_5$ | Cl | F | H | F | C$_4$H$_9$ |
| i-d-24 | C$_2$H$_5$ | Cl | F | F | F | C$_4$H$_9$ |
| i-d-25 | C$_2$H$_5$ | F | F | F | Cl | C$_4$H$_9$ |
| i-d-26 | C$_2$H$_5$ | F | F | F | Cl | C$_4$H$_9$ |
| i-d-27 | C$_2$H$_5$ | F | F | Cl | F | C$_4$H$_9$ |
| i-d-28 | C$_2$H$_5$ | F | F | Cl | F | C$_4$H$_9$ |
| i-d-29 | C$_2$H$_5$ | F | F | H | F | C$_5$H$_{11}$ |
| i-d-30 | C$_2$H$_5$ | F | F | F | F | C$_5$H$_{11}$ |
| i-d-31 | C$_2$H$_5$ | F | F | H | F | C$_6$H$_{13}$ |
| i-d-32 | C$_2$H$_5$ | F | F | F | F | C$_6$H$_{13}$ |
| i-d-33 | C$_2$H$_5$ | F | F | H | F | C$_7$H$_{15}$ |
| i-d-34 | C$_2$H$_5$ | F | F | F | F | C$_7$H$_{15}$ |
| i-d-35 | C$_2$H$_5$ | F | F | H | F | C$_8$H$_{17}$ |
| i-d-36 | C$_2$H$_5$ | F | F | F | F | C$_8$H$_{17}$ |

TABLE 17

| NO. | R¹ | Q¹ | Q² | Q³ | Q⁴ | R² |
|---|---|---|---|---|---|---|
| i-d-37 | C$_2$H$_5$ | F | F | H | F | CH=CH$_2$ |
| i-d-38 | C$_2$H$_5$ | F | F | F | F | CH=CH$_2$ |
| i-d-39 | C$_2$H$_5$ | F | F | H | F | CH$_2$CH=CH$_2$ |
| i-d-40 | C$_2$H$_5$ | F | F | F | F | CH$_2$CH=CH$_2$ |
| i-d-41 | C$_2$H$_5$ | F | F | H | F | CH$_2$CH=CHCH$_3$ |
| i-d-42 | C$_2$H$_5$ | F | F | F | F | CH$_2$CH=CHCH$_3$ |
| i-d-43 | C$_2$H$_5$ | F | F | H | F | CH$_2$CH=CH(CH$_2$)$_2$CH=CH$_2$ |
| i-d-44 | C$_2$H$_5$ | F | F | F | F | CH$_2$CH=CH(CH$_2$)$_2$CH=CH$_2$ |
| i-d-45 | C$_3$H$_7$ | F | F | H | F | C$_2$H$_5$ |
| i-d-46 | C$_3$H$_7$ | F | F | F | F | C$_2$H$_5$ |
| i-d-47 | C$_3$H$_7$ | F | F | H | F | C$_4$H$_9$ |
| i-d-48 | C$_3$H$_7$ | F | F | F | F | C$_4$H$_9$ |
| i-d-49 | C$_4$H$_9$ | F | F | H | F | CH$_3$ |

TABLE 17-continued

| NO. | R¹ | Q¹ | Q² | Q³ | Q⁴ | R² | |
|---|---|---|---|---|---|---|---|
| i-d-50 | C₄H₉ | F | F | F | F | CH₃ | |
| i-d-51 | C₄H₉ | F | F | H | F | C₂H₅ | NI = 162.6° C., Δε = −4.93, Δn = 0.281, η = 79.6 mPa · s, C 88.8 N 183.2 Iso |
| i-d-52 | C₄H₉ | F | F | F | F | C₂H₅ | NI = 148.6° C., Δε = −9.32, Δn = 0.247, η = 85.6 mPa · s, C 102.8 N 170.4 Iso |
| i-d-53 | C₄H₉ | F | Cl | H | F | C₂H₅ | |
| i-d-54 | C₄H₉ | F | Cl | F | F | C₂H₅ | |
| i-d-55 | C₄H₉ | Cl | F | H | F | C₂H₅ | |
| i-d-56 | C₄H₉ | Cl | F | F | F | C₂H₅ | |
| i-d-57 | C₄H₉ | F | F | F | Cl | C₂H₅ | NI = 132.6° C., Δε = −9.02, Δn = 0.235, η = 106.6 mPa · s, C 131.3 N 156.1 Iso |
| i-d-58 | C₄H₉ | F | F | F | Cl | C₂H₅ | |
| i-d-59 | C₄H₉ | F | F | Cl | F | C₂H₅ | |
| i-d-60 | C₄H₉ | F | F | Cl | F | C₂H₅ | |
| i-d-61 | C₄H₉ | F | F | H | F | C₃H₇ | |
| i-d-62 | C₄H₉ | F | F | F | F | C₃H₇ | |
| i-d-63 | C₄H₉ | F | F | H | F | C₄H₉ | |
| i-d-64 | C₄H₉ | F | F | F | F | C₄H₉ | |
| i-d-65 | C₄H₉ | F | Cl | H | F | C₄H₉ | |
| i-d-66 | C₄H₉ | F | Cl | F | F | C₄H₉ | |
| i-d-67 | C₄H₉ | Cl | F | H | F | C₄H₉ | |
| i-d-68 | C₄H₉ | Cl | F | F | F | C₄H₉ | |

TABLE 18

| NO. | R¹ | Q¹ | Q² | Q³ | Q⁴ | R² |
|---|---|---|---|---|---|---|
| i-d-69 | C₄H₉ | F | F | F | Cl | C₄H₉ |
| i-d-70 | C₄H₉ | F | F | F | Cl | C₄H₉ |
| i-d-71 | C₄H₉ | F | F | Cl | F | C₄H₉ |
| i-d-72 | C₄H₉ | F | F | Cl | F | C₄H₉ |
| i-d-73 | C₄H₉ | F | F | H | F | C₅H₁₁ |
| i-d-74 | C₄H₉ | F | F | F | F | C₅H₁₁ |
| i-d-75 | C₄H₉ | F | F | H | F | C₆H₁₃ |
| i-d-76 | C₄H₉ | F | F | F | F | C₆H₁₃ |
| i-d-77 | C₄H₉ | F | F | H | F | C₇H₁₅ |
| i-d-78 | C₄H₉ | F | F | F | F | C₇H₁₅ |
| i-d-79 | C₄H₉ | F | F | H | F | C₈H₁₇ |
| i-d-80 | C₄H₉ | F | F | F | F | C₈H₁₇ |
| i-d-81 | C₄H₉ | F | F | H | F | CH=CH₂ |
| i-d-82 | C₄H₉ | F | F | F | F | CH=CH₂ |
| i-d-83 | C₄H₉ | F | F | H | F | CH₂CH=CH₂ |
| i-d-84 | C₄H₉ | F | F | F | F | CH₂CH=CH₂ |
| i-d-85 | C₄H₉ | F | F | H | F | CH₂CH=CHCH₃ |
| i-d-86 | C₄H₉ | F | F | F | F | CH₂CH=CHCH₃ |
| i-d-87 | C₄H₉ | F | F | H | F | CH₂CH=CH(CH₂)₂CH=CH₂ |
| i-d-88 | C₄H₉ | F | F | F | F | CH₂CH=CH(CH₂)₂CH=CH₂ |
| i-d-89 | C₅H₁₁ | F | F | H | F | C₂H₅ |
| i-d-90 | C₅H₁₁ | F | F | F | F | C₂H₅ |
| i-d-91 | C₅H₁₁ | F | F | H | F | C₄H₉ |
| i-d-92 | C₅H₁₁ | F | F | F | F | C₄H₉ |
| i-d-93 | C₆H₁₃ | F | F | H | F | C₂H₅ |
| i-d-94 | C₆H₁₃ | F | F | F | F | C₂H₅ |
| i-d-95 | C₆H₁₃ | F | F | H | F | C₄H₉ |
| i-d-96 | C₆H₁₃ | F | F | F | F | C₄H₉ |
| i-d-97 | C₆H₁₃ | F | F | H | F | C₆H₁₃ |
| i-d-98 | C₆H₁₃ | F | F | F | F | C₆H₁₃ |
| i-d-99 | C₆H₁₃ | F | F | H | F | C₈H₁₇ |
| i-d-100 | C₆H₁₃ | F | F | F | F | C₈H₁₇ |

TABLE 19

| NO. | R¹ | Q¹ | Q² | Q³ | Q⁴ | R² |
|---|---|---|---|---|---|---|
| i-d-101 | C₆H₁₃ | F | F | H | F | CH=CH₂ |
| i-d-102 | C₆H₁₃ | F | F | F | F | CH=CH₂ |
| i-d-103 | C₆H₁₃ | F | F | H | F | CH₂CH=CH₂ |
| i-d-104 | C₆H₁₃ | F | F | F | F | CH₂CH=CH₂ |
| i-d-105 | C₆H₁₃ | F | F | H | F | CH₂CH=CHCH₃ |
| i-d-106 | C₆H₁₃ | F | F | F | F | CH₂CH=CHCH₃ |
| i-d-107 | C₇H₁₅ | F | F | H | F | C₂H₅ |
| i-d-108 | C₇H₁₅ | F | F | F | F | C₂H₅ |
| i-d-109 | C₇H₁₅ | F | F | H | F | C₄H₉ |
| i-d-110 | C₇H₁₅ | F | F | F | F | C₄H₉ |
| i-d-111 | C₈H₁₇ | F | F | H | F | C₂H₅ |
| i-d-112 | C₈H₁₇ | F | F | F | F | C₂H₅ |
| i-d-113 | C₈H₁₇ | F | F | H | F | C₄H₉ |
| i-d-114 | C₈H₁₇ | F | F | F | F | C₄H₉ |
| i-d-115 | C₈H₁₇ | F | F | H | F | C₆H₁₃ |
| i-d-116 | C₈H₁₇ | F | F | F | F | C₆H₁₃ |
| i-d-117 | C₈H₁₇ | F | F | H | F | C₈H₁₇ |
| i-d-118 | C₈H₁₇ | F | F | F | F | C₈H₁₇ |
| i-d-119 | C₈H₁₇ | F | F | H | F | CH=CH₂ |
| i-d-120 | C₈H₁₇ | F | F | F | F | CH=CH₂ |
| i-d-121 | C₈H₁₇ | F | F | H | F | CH₂CH=CH₂ |
| i-d-122 | C₈H₁₇ | F | F | F | F | CH₂CH=CH₂ |
| i-d-123 | C₈H₁₇ | F | F | H | F | CH₂CH=CHCH₃ |
| i-d-124 | C₈H₁₇ | F | F | F | F | CH₂CH=CHCH₃ |
| i-d-125 | CH₂=CH | F | F | H | F | C₂H₅ |
| i-d-126 | CH₂=CH | F | F | F | F | C₂H₅ |
| i-d-127 | CH₂=CH | F | F | H | F | C₄H₉ |
| i-d-128 | CH₂=CH | F | F | F | F | C₄H₉ |
| i-d-129 | CH₂=CH | F | F | H | F | CH₂CH=CHCH₃ |
| i-d-130 | CH₂=CH | F | F | F | F | CH₂CH=CHCH₃ |
| i-d-131 | CH₂=CHCH₂ | F | F | H | F | C₂H₅ |
| i-d-132 | CH₂=CHCH₂ | F | F | F | F | C₂H₅ |
| i-d-133 | CH₂=CHCH₂ | F | F | H | F | CH₂CH=CHCH₃ |
| i-d-134 | CH₂=CHCH₂ | F | F | F | F | CH₂CH=CHCH₃ |

TABLE 20

| NO. | R¹ | Q¹ | Q² | Q³ | Q⁴ | R² |
|---|---|---|---|---|---|---|
| i-d-135 | $CH_3CH_2$=$CHCH_2$ | F | F | H | F | $C_2H_5$ |
| i-d-136 | $CH_3CH_2$=$CHCH_2$ | F | F | F | F | $C_2H_5$ |
| i-d-137 | $CH_3CH_2$=$CHCH_2$ | F | Cl | H | F | $C_2H_5$ |
| i-d-138 | $CH_3CH_2$=$CHCH_2$ | F | Cl | F | F | $C_2H_5$ |
| i-d-139 | $CH_3CH_2$=$CHCH_2$ | Cl | F | H | F | $C_2H_5$ |
| i-d-140 | $CH_3CH_2$=$CHCH_2$ | Cl | F | F | F | $C_2H_5$ |
| i-d-141 | $CH_3CH_2$=$CHCH_2$ | F | F | F | Cl | $C_2H_5$ |
| i-d-142 | $CH_3CH_2$=$CHCH_2$ | F | F | F | Cl | $C_2H_5$ |
| i-d-143 | $CH_3CH_2$=$CHCH_2$ | F | F | Cl | F | $C_2H_5$ |
| i-d-144 | $CH_3CH_2$=$CHCH_2$ | F | F | Cl | F | $C_2H_5$ |
| i-d-145 | $CH_3CH_2$=$CHCH_2$ | F | F | H | F | $C_3H_7$ |
| i-d-146 | $CH_3CH_2$=$CHCH_2$ | F | F | F | F | $C_3H_7$ |
| i-d-147 | $CH_3CH_2$=$CHCH_2$ | F | F | H | F | $C_4H_9$ |
| i-d-148 | $CH_3CH_2$=$CHCH_2$ | F | F | F | F | $C_4H_9$ |
| i-d-149 | $CH_3CH_2$=$CHCH_2$ | F | Cl | H | F | $C_4H_9$ |
| i-d-150 | $CH_3CH_2$=$CHCH_2$ | F | Cl | F | F | $C_4H_9$ |
| i-d-151 | $CH_3CH_2$=$CHCH_2$ | Cl | F | H | F | $C_4H_9$ |
| i-d-152 | $CH_3CH_2$=$CHCH_2$ | Cl | F | F | F | $C_4H_9$ |
| i-d-153 | $CH_3CH_2$=$CHCH_2$ | F | F | F | Cl | $C_4H_9$ |
| i-d-154 | $CH_3CH_2$=$CHCH_2$ | F | F | F | Cl | $C_4H_9$ |
| i-d-155 | $CH_3CH_2$=$CHCH_2$ | F | F | Cl | F | $C_4H_9$ |
| i-d-156 | $CH_3CH_2$=$CHCH_2$ | F | F | Cl | F | $C_4H_9$ |
| i-d-157 | $CH_3CH_2$=$CHCH_2$ | F | F | H | F | $C_6H_{13}$ |
| i-d-158 | $CH_3CH_2$=$CHCH_2$ | F | F | F | F | $C_6H_{13}$ |
| i-d-159 | $CH_3CH_2$=$CHCH_2$ | F | F | H | F | $CH$=$CH_2$ |
| i-d-160 | $CH_3CH_2$=$CHCH_2$ | F | F | F | F | $CH$=$CH_2$ |
| i-d-161 | $CH_3CH_2$=$CHCH_2$ | F | F | H | F | $CH_2CH$=$CH_2$ |
| i-d-162 | $CH_3CH_2$=$CHCH_2$ | F | F | F | F | $CH_2CH$=$CH_2$ |
| i-d-163 | $CH_3CH_2$=$CHCH_2$ | F | F | H | F | $CH_2CH$=$CHCH_3$ |
| i-d-164 | $CH_3CH_2$=$CHCH_2$ | F | F | F | F | $CH_2CH$=$CHCH_3$ |
| i-d-165 | $CH_2$=$CH(CH_2)_2CH_2$=$CHCH_2$ | F | F | H | F | $C_2H_5$ |
| i-d-166 | $CH_2$=$CH(CH_2)_2CH_2$=$CHCH_2$ | F | F | F | F | $C_2H_5$ |
| i-d-167 | $CH_2$=$CH(CH_2)_2CH_2$=$CHCH_2$ | F | F | H | F | $CH_2CH$=$CHCH_3$ |
| i-d-168 | $CH_2$=$CH(CH_2)_2CH_2$=$CHCH_2$ | F | F | F | F | $CH_2CH$=$CHCH_3$ |

One example of typical compositions of the invention will be shown below. The physical properties were measured according to the methods as described later.

Two kinds of samples were used for measuring the physical properties of the liquid crystal compound, namely, one case where the compound itself is applied as a sample, and the other case where the compound is mixed with mother liquid crystals and applied as a sample.

In the latter case where the sample prepared by mixing the compound with the mother liquid crystals was used, measurement was carried out according to the following method. First, the sample was prepared by mixing 15% by weight of the liquid crystal compound obtained and 85% by weight of the mother liquid crystals. Then, an extrapolated value was calculated from a measured value of the sample obtained according to the extrapolation method shown in the following equation. The extrapolated value was determined as values of the physical properties of the compound.

(Extrapolated value)={100×(measured value of sample)−(% by weight of mother liquid crystals)×(measured value of mother liquid crystals)}/(% by weight of liquid crystal compound)

When the smectic phase or crystals precipitated at 25° C. even at the ratio of the compound to the mother liquid crystals, a ratio of the compound to the mother liquid crystals was changed in the order of (10% by weight:90% by weight), (5% by weight:95% by weight) and (1% by weight:99% by weight). The measured value of the sample was obtained at the composition in which the smectic phase or the crystals did not precipitate at 25° C., and then the extrapolated value was determined according to the equation described above, and thus the value was determined as the values of the physical properties.

As the mother liquid crystals used for the measurement, a variety of types exist. For example, a composition of mother liquid crystals (A) is as described below.

Mother liquid crystals (A):

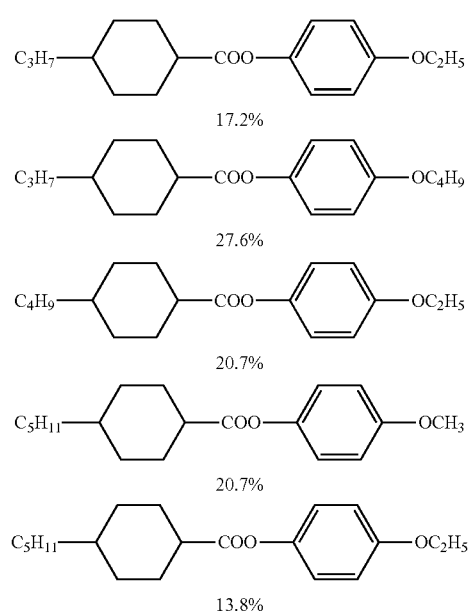

Physical properties of mother liquid crystals (A) were as follows: maximum temperature (NI)=74.6° C.; optical anisotropy (Δn)=0.087; dielectric anisotropy (Δ∈)=−1.3.

Physical properties were measured by adding 15% by weight of 1-(4-butoxycyclohex-1-enyl)-4-ethoxy-2,3-difluorobenzene (1-a-1-20) as described in Example 1 to mother liquid crystals (A). As a result, the optical anisotropy (Δn) was 0.080; and the dielectric anisotropy (As) was −5.29.

Physical properties were measured by adding 15% by weight of 1-(4-butoxycyclohexyl)-4-ethoxy-2,3-difluorobenzene (1-a-2-22) as described in Example 2 to mother liquid crystals (A). As a result, the optical anisotropy (Δn) was 0.070; and the dielectric anisotropy (Δ∈) was −7.50.

Comparative Example 1

Then 1-ethoxy-2,3-difluoro-4-(pentylcyclohexyl)benzene (s-1) was prepared, a composition including 15% by weight of the compound and 85% by weight of mother liquid crystals (A) was prepared, and then physical properties were measured in a manner similar to Example 1. As a result, a value of optical anisotropy of the compound became 0.072 and a value of dielectric anisotropy became −4.76, and therefore compounds (1-a-1-20) and (1-a-1-22) of the invention were found to have a large negative dielectric anisotropy, and compound (1-a-1-20) of the invention was found to have a large optical anisotropy.

Physical properties were measured by adding 15% by weight of (E)-1-(4-(bt-2-enyloxy)cyclohexyl)-4-ethoxy-2,3-difluorobenzene (1-a-2-60) as described in Example 4 to mother liquid crystals (A). As a result, the dielectric anisotropy (Δ∈) was −7.38.

Comparative Example 2

Furthermore, (E)-1-4-ethoxy-2,3-difluoro-4-(4-(pent-3-enyl)cyclohexyl)benzene (s-2) was prepared, a composition including 15% by weight of the compound and 85% by weight of mother liquid crystals (A) was prepared, and thus physical properties were measured in a manner similar to Example 1. As a result, a value of dielectric anisotropy of the compound became −5.81, and therefore the composition of the invention was found to have a larger negative dielectric anisotropy.

Physical properties were measured by adding 15% by weight of 1-(4-butoxycyclohexyl)-4-(4-ethoxycyclohexyl)-2,3-difluorobenzene (1-b-3-6) as described in Example 5 to mother liquid crystals (A). As a result, the optical anisotropy (Δn) was 0.92; viscosity (η) was 64.8 mPa·s; and an elastic constant ratio ($K_{33}/K_{11}$) was 1.346.

Comparative Example 3

Moreover, 4-(4-ethoxy-2,3-difluorophenyl)-4'-propoxybi(cyclohexane) (s-6) was prepared, a composition including 15% by weight of the compound and 85% by weight of mother liquid crystals (A) was prepared, and then physical properties were measured in a manner similar to Example 1. As a result, Δn of the compound became 0.084, η became 130.8 mPa·s and $K_{33}/K_{11}$ became 1.020, and therefore compound (1-b-3-6) of the invention was found to have a larger optical anisotropy, a smaller viscosity, and a larger elastic constant ratio.

Physical properties were measured by adding 15% by weight of 4-(4-butoxycyclohex-1-enyl)-4'-ethoxy-2,2'3,3'-tetrafluorobiphenyl (1-c-1-52) as described in Example 6 to mother liquid crystals (A). As a result, the optical anisotropy (Δn) was 0.172; and the dielectric anisotropy (Δ∈) was −8.31.

Physical properties were measured by adding 15% by weight of 4-(4-butoxycyclohexyl)-4'-ethoxy-2,2'3,3'-tetrafluorobiphenyl (1-c-2-52) as described in Example 8 to mother liquid crystals (A). As a result, the optical anisotropy (Δn) was 0.148; and the dielectric anisotropy (Δ∈) was −9.45.

Comparative Example 4

Moreover, 4-ethoxy-2,2',3,3'-tetrafluoro-4'-(4-pentylcyclohexylbiphenyl) (s-5) was prepared, a composition including 10% by weight of the compound and 90% by weight of mother liquid crystals (A) was prepared because the compound was not dissolved up to 15% by weight, and then physical properties were measured in a manner similar to Example 1. As a result, a value of optical anisotropy of the compound became 0.167 and a value of dielectric anisotropy became −8.09, and therefore compounds (1-c-1-52) and (1-c-2-52) of the invention were found to have a larger negative dielectric anisotropy and a good compatibility with other liquid crystal compounds, and compound (1-c-1-52) of the invention was found to have a larger optical anisotropy.

Comparative Example 5

Then 4'-ethoxy-2-fluoro-4-(4-pentylcyclohexyebiphenyl (s-3) was prepared, a composition including 15% by weight of the compound and 85% by weight of mother liquid crystals (A) was prepared, and then physical properties were measured in a manner similar to Example 1. As a result, a value of dielectric anisotropy of the compound became −1.46, and therefore the compound of the invention was found to have a larger negative dielectric anisotropy.

Furthermore, typical compositions of the invention were summarized in Composition Example 1 to Composition Example 14. First, the compound being the component of the composition, and the amount thereof (% by weight) were shown. The compound was described using symbols of the left-terminal group, the bonding group, the ring structure and the right-terminal group according to definitions in Table 21. The configuration of 1,4-cyclohexylene is trans. When no symbol of the terminal group is described, the description represents that the terminal group is hydrogen. Next, values of physical properties of the composition were shown.

TABLE 21

Method for Description of Compounds using Symbols
$R—(A_1)—Z_1— \ldots —Z_n—(A_n)—R'$

| | Symbol |
|---|---|
| 1) Left-terminal Group R— | |
| $C_nH_{2n+1}$— | n- |
| $C_nH_{2n+1}O$— | nO— |
| $C_mH_{2m+1}OC_nH_{2n}$— | mOn- |
| $CH_2=CH$— | V— |
| $C_nH_{2n+1}$—CH=CH— | nV— |
| $CH_2=CH—C_nH_{2n}$— | Vn- |
| $C_mH_{2m+1}$—CH=CH—$C_nH_{2n}$— | mVn- |
| $CF_2=CH$— | VFF— |
| $CF_2=CH—C_nH_{2n}$— | VFFn- |
| 2) Right-terminal Group —R' | |
| —$C_nH_{2n+1}$ | -n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | -nV |
| —CH=$CF_2$ | —VFF |
| —COOCH$_3$ | —EMe |
| —CN | —C |
| —F | —F |
| —Cl | —CL |

TABLE 21-continued

Method for Description of Compounds using Symbols
R—(A₁)—Z₁—...—Zₙ—(Aₙ)—R'

| | Symbol |
|---|---|
| —OCF₃ | —OCF3 |
| —CF₃ | —CF3 |
| 3) Bonding Group —Zₙ— | |
| —CₙH₂ₙ— | n |
| —COO— | E |
| —CH=CH— | V |
| —CH₂O— | 1O |
| —CF₂O— | X |
| —C≡C— | T |
| 4) Ring Structure —Aₙ— | |
|  | H |
| 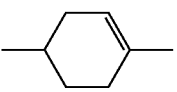 | Ch |
|  | ch |
| 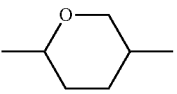 | Dh |
| 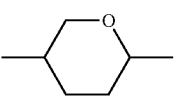 | dh |
| 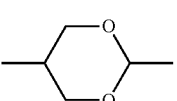 | G |
| 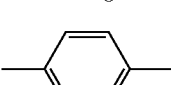 | B |
| 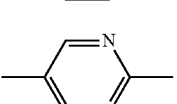 | Py |
| 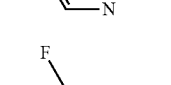 | B(2F) |
| 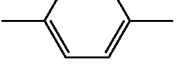 | B(F) |
| 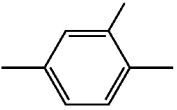 | B(F,F) |

TABLE 21-continued

Method for Description of Compounds using Symbols
R—(A₁)—Z₁—...—Zₙ—(Aₙ)—R'

| | Symbol |
|---|---|
| 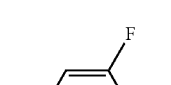 | B(2F,3F) |
| 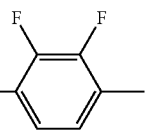 | B(2F,3CL) |
| 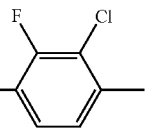 | B(2CL,3F) |

5) Examples of Description

Example 1

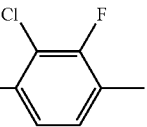

4O-ChB(2F,3F)B(F)-O2

Example 2

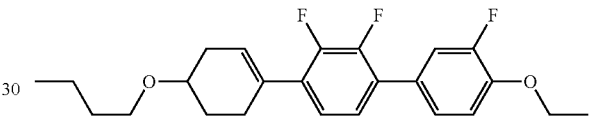

4O-HB(2F,3F)B(2F,3F)-O2

Example 3

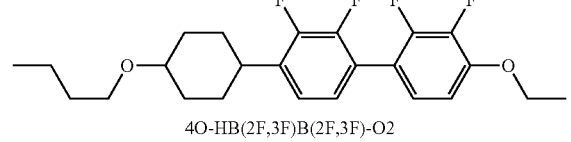

3-HHB-3

Example 5

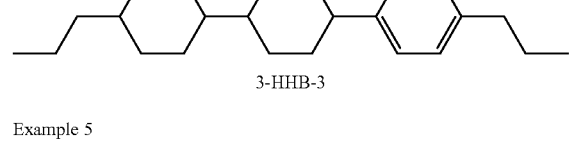

5-HHB(2F,3CL)-O2

The characteristics can be measured according to the methods described below. Most of the methods are applied as described in EIAJ ED-2521A of the Standard of Electronic Industries Association of Japan, or modified thereon. TFT was not attached to a TN device used for measurement.

Transition temperature (° C.): Measurement was carried out according to any one of the following methods. 1) A sample was placed on a hot plate in a melting point apparatus equipped with a polarizing microscope (FP-52 Hot Stage made by Mettler Toledo International Inc.), and the sample was heated at a rate of 1° C. per minute. Temperature when a phase of the sample began to change was measured. 2) Measurement was carried out at a rate of 3° C. per minute using a scanning calorimeter DSC-7 System made by PerkinElmer, Inc.

The crystals were expressed as C. When the crystals were further distinguishable, each of the crystals was expressed as $C_1$ or $C_2$. The smectic phase was expressed as S. The A liquid (isotropic) phase was expressed as Iso. The nematic phase was expressed as N. When a smectic B phase, a smectic C phase or a smectic A phase was distinguishable among the smectic phases, the phases were expressed as $S_B$, $S_C$ or $S_A$, respectively. As an expression of the phase transition temperature, "C 50.0 N 100.0 Iso" means 50.0° C. in a phase transition temperature from the crystals to the nematic phase (CN), and 100.0° C. in a phase transition temperature from the nematic phase to the liquid (NI). A same rule applied to other expressions.

Maximum Temperature of a Nematic Phase (NI; ° C.): A sample was placed on a hot plate of a melting point apparatus equipped with a polarizing microscope, and the sample was heated at a rate of 1° C. per minute. Temperature when a part of the sample began to change from the nematic phase to the isotropic liquid was measured. A higher limit of a temperature range of the nematic phase may be abbreviated as "maximum temperature."

Minimum Temperature of a Nematic Phase ($T_c$; ° C.): A sample having the nematic phase was put in freezers at temperatures of 0° C., –10° C., –20° C., –30° C. and –40° C. for 10 days, and then liquid crystal phases were observed. For example, when the sample maintained the nematic phase at –20° C. and changed to crystals (or a smectic phase) at –30° C., $T_c$ was expressed as $T_c \leq -20°$ C. A lower limit of the temperature range of the nematic phase may be abbreviated as "minimum temperature."

Compatibility of Compounds: Mother liquid crystals having the nematic phase were prepared by mixing several compounds having a similar structure. A composition in which a compound to be measured and the mother liquid crystals were mixed was obtained. One example of a mixing ratio is 15% by weight of the compound and 85% by weight of the mother liquid crystals. The composition was kept at low temperatures such as –20° C. or –30° C. for 30 days. Whether or not a part of the composition changed to the crystals (or the smectic phase) was observed. A mixing ratio and a temperature for keeping the composition were changed as required. From the thus measured results, conditions in which the crystals (or the smectic phase) precipitated or did not precipitate were determined. The conditions are a measure of compatibility.

Viscosity (bulk viscosity; η; measured at 20° C.; mPa·s): A cone-plate (E type) viscometer was used for measurement.

Viscosity (rotational viscosity; γ1; measured at 25° C.; mPa·s): Measurement was carried out according to the method described in M. Imai et al., Molecular Crystals and Liquid Crystals, Vol. 259, p. 37 (1995). A sample was put in a VA device in which a distance (cell gap) between two glass substrates was 20 micrometers. A voltage was stepwise applied to the device in the range of 30 V to 50 V at an increment of 1 V. After a period of 0.2 second with no application, a voltage was applied repeatedly under the conditions of only one of rectangular waves (rectangular pulse; 0.2 second) and no application (2 seconds). The peak current and the peak time of the transient current generated by the application were measured. A value of the rotational viscosity was obtained from the measured values and a calculation equation (8) described on page 40 of the paper presented by M. Imai et al. As the dielectric constant anisotropy required for the calculation, the value obtained by the method for measuring the dielectric anisotropy as described below was used.

Optical Anisotropy (refractive index anisotropy; Δn; measured at 25° C.): Measurement was carried out by means of an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of optical anisotropy was calculated from an equation: Δn=n∥–n⊥. When the sample was a composition, the optical anisotropy was measured according to the method. When the sample was a compound, the compound was mixed with a suitable composition, and then the optical anisotropy was measured. The optical anisotropy of the compound is expressed by an extrapolated value.

Dielectric Anisotropy (Δ∈; measured at 25° C.): When a sample was a compound, the compound was mixed with a suitable composition, and then a dielectric anisotropy was measured. The dielectric anisotropy of the compound is expressed by an extrapolated value.

An ethanol (20 mL) solution of octadecyl triethoxysilane (0.16 mL) was applied to a well-washed glass substrate. After rotating the glass substrate with a spinner, the glass substrate was heated at 150° C. for 1 hour. A VA device in which a distance (cell gap) was 20 micrometers was assembled from two glass substrates.

In a similar manner, an alignment film of polyimide was prepared onto the glass substrate. After rubbing treatment was applied to the alignment film of the glass substrate obtained, a TN device in which a distance between two glass substrates was 9 micrometers and a twist angle was 80 degrees was assembled.

The sample (the liquid crystal composition or a mixture of the liquid crystal compound and mother liquid crystals) was put in the VA device obtained, 0.5 V (1 kHz, sine waves) was applied, and a dielectric constant (∈∥) in the major axis direction of liquid crystal molecules was measured.

The sample (the liquid crystal composition or the mixture of the liquid crystal compound and the mother liquid crystals) was put in the VA device obtained, 0.5 V (1 kHz, sine waves) was applied, and a dielectric constant (∈⊥) in the minor axis direction of the liquid crystal molecules was measured.

A value of dielectric anisotropy was calculated from an equation: Δ∈=∈∥–∈⊥.

A composition in which the value is negative is the composition having a negative dielectric anisotropy.

Threshold Voltage (Vth; measured at 25° C.; V): When a sample was a compound, a threshold voltage was measured after mixing the compound with a suitable composition. The threshold voltage of the compound is expressed by an extrapolated value. The sample was put in a liquid crystal display device having a normally black mode in which a distance (gap) between two glass substrates was about 9 micrometers, and the device was subjected to a homeotropic alignment. Rectangular waves having a frequency of 32 Hz was applied to the device. A value of voltage was measured when a voltage of the rectangular waves was raised and transmittance of light passing through the device reached 10%.

Voltage Holding Ratio (VHR; measured at 25° C.; %): A TN device used for measurement had a polyimide alignment film, in which a distance (cell gap) between two glass substrates was 6 micrometers. A sample was put in the device, and then the device was sealed with an adhesive to be polymerized by irradiation of ultraviolet light. The TN device was charged by applying a pulse voltage (60 microseconds at 5 V) thereto. A decaying voltage was measured for 16.7 milliseconds with a high-speed voltmeter, and area A between a voltage curve and a horizontal axis in a unit cycle was obtained. Area B is an area without decay. A voltage holding ratio is a percentage of area A to area B.

A pitch when 0.25 part of Op-05 was added to 100 parts of the composition was 61.1 micrometers.

Composition Example 1

| | | |
|---|---|---|
| 4O-ChB(2F,3F)B(F)-O2 | (1-c-1-51) | 8% |
| 4O-ChB(2F,3F)B(2F,3F)-O2 | (1-c-1-52) | 7% |
| 3-HH-O1 | (12-1) | 8% |
| 3-HH-4 | (12-1) | 5% |
| 3-HB(2F,3F)-O2 | (6-1) | 5% |
| 5-HB(2F,3F)-O2 | (6-1) | 21% |
| 2-HHB(2F,3F)-1 | (7-1) | 5% |
| 3-HHB(2F,3F)-1 | (7-1) | 7% |
| 3-HHB(2F,3F)-O2 | (7-1) | 14% |
| 5-HHB(2F,3F)-O2 | (7-1) | 20% |

NI = 72.9° C.; Δn = 0.095; η = 32.4 mPa·s; Δε = −4.6.

Composition Example 2

| | | |
|---|---|---|
| 4O-HB(2F,3F)B(F)-O2 | (1-c-2-51) | 5% |
| 4O-HB(2F,3F)B(2F,3F)-O2 | (1-c-2-52) | 5% |
| 4O-HB(2F,3F)H-O2 | (1-b-3-6) | 3% |
| 3-HB-O1 | (12-5) | 15% |
| 3-HH-4 | (12-1) | 5% |
| 3-HB(2F,3F)-O2 | (6-1) | 12% |
| 5-HB(2F,3F)-O2 | (6-1) | 12% |
| 2-HHB(2F,3F)-1 | (7-1) | 12% |
| 3-HHB(2F,3F)-1 | (7-1) | 12% |
| 3-HHB(2F,3F)-O2 | (7-1) | 13% |
| 3-HHB-1 | (13-1) | 6% |

NI = 77.2° C.; Δn = 0.093; η = 40.6 mPa·s; Δε = −3.5.

Composition Example 3

| | | |
|---|---|---|
| 4O-ChB(2F,3F)-O2 | (1-a-1-20) | 5% |
| 2O-HB(2F,3F)-O2 | (1-a-2-4) | 5% |
| 4O-HB(2F,3F)-O2 | (1-a-2-22) | 5% |
| 5-HB-O2 | (12-5) | 8% |
| 3-H2B(2F,3F)-O2 | (6-4) | 22% |
| 5-H2B(2F,3F)-O2 | (6-4) | 7% |
| 2-HHB(2F,3CL)-O2 | (7-12) | 2% |
| 3-HHB(2F,3CL)-O2 | (7-12) | 3% |
| 4-HHB(2F,3CL)-O2 | (7-12) | 2% |
| 5-HHB(2F,3CL)-O2 | (7-12) | 2% |
| 3-HBB(2F,3CL)-O2 | (7-13) | 9% |
| 5-HBB(2F,3CL)-O2 | (7-13) | 9% |
| V-HHB-1 | (13-1) | 6% |
| 3-HHB-3 | (13-1) | 6% |
| 3-HHEBH-3 | (14-6) | 3% |
| 3-HHEBH-4 | (14-6) | 3% |
| 3-HHEBH-5 | (14-6) | 3% |

NI = 84.7° C.; Δn = 0.097; η = 38.6 mPa·s; Δε = −4.3.

Composition Example 4

| | | |
|---|---|---|
| 4O-HB(2F,3CL)B(2F,3F)-O2 | (1-c-2-54) | 5% |
| 4O-HB(2F,3F)B(2F,3CL)-O2 | (1-c-2-57) | 5% |
| 1V1O-HB(2F,3F)B(2F,3F)-O2 | (1-c-2-136) | 3% |
| 3-HB-O1 | (12-5) | 15% |
| 3-HH-4 | (12-1) | 5% |
| 3-HB(2F,3F)-O2 | (6-1) | 12% |
| 5-HB(2F,3F)-O2 | (6-1) | 12% |
| 2-HHB(2F,3F)-1 | (7-1) | 12% |
| 3-HHB(2F,3F)-1 | (7-1) | 12% |
| 3-HHB(2F,3F)-O2 | (7-1) | 13% |
| 6-HEB(2F,3F)-O2 | (6-6) | 6% |

Composition Example 5

| | | |
|---|---|---|
| 1V1O-HB(2F,3F)-O2 | (1-a-2-60) | 3% |
| 4O-HB(2F,3F)-O2 | (1-a-2-22) | 5% |
| 3-HB-O2 | (12-5) | 17% |
| 3-H2B(2F,3F)-O2 | (6-4) | 15% |
| 5-H2B(2F,3F)-O2 | (6-4) | 15% |
| 3-HHB(2F,3CL)-O2 | (7-12) | 5% |
| 3-HBB(2F,3CL)-O2 | (7-13) | 3% |
| 4-HBB(2F,3CL)-O2 | (7-13) | 9% |
| 5-HBB(2F,3CL)-O2 | (7-13) | 9% |
| 3-HHB-1 | (13-1) | 8% |
| 3-HHB-3 | (13-1) | 8% |
| 3-HHB-O1 | (13-1) | 3% |

NI = 74.4° C.; Δn = 0.102; η = 33.1 mPa·s; Δε = −4.6.

Composition Example 6

| | | |
|---|---|---|
| 4O-HB(2F,3F)B(F)-O2 | (1-c-2-51) | 3% |
| 4O-HB(2F,3F)B(2F,3F)-O2 | (1-c-2-52) | 3% |
| 3-HB-O1 | (12-5) | 12% |
| 3-HH-4 | (12-1) | 5% |
| 3-HB(2F,3F)-O2 | (6-1) | 12% |
| 5-HB(2F,3F)-O2 | (6-1) | 12% |
| 2-HHB(2F,3F)-1 | (7-1) | 12% |
| 3-HHB(2F,3F)-1 | (7-1) | 12% |
| 3-HHB(2F,3F)-O2 | (7-1) | 10% |
| 5-HHB(2F,3F)-O2 | (7-1) | 13% |
| 3-HHB-1 | (13-1) | 6% |

NI = 87.4° C.; Δn = 0.094; η = 39.4 mPa·s; Δε = −3.7.

Composition Example 7

| | | |
|---|---|---|
| 4O-ChB(2F,3F)B(F)-O2 | (1-c-1-51) | 4% |
| 4O-ChB(2F,3F)B(2F,3F)-O2 | (1-c-1-52) | 3% |
| 2-BEB(F)-C | (5-14) | 5% |
| 3-BEB(F)-C | (5-14) | 4% |
| 4-BEB(F)-C | (5-14) | 12% |
| 1V2-BEB(F,F)-C | (5-15) | 12% |
| 3-HB-O2 | (12-5) | 11% |
| 3-HH-4 | (12-1) | 3% |
| 3-HHB-F | (3-1) | 3% |
| 3-HHB-1 | (13-1) | 8% |
| 3-HHB-O1 | (13-1) | 4% |
| 3-HBEB-F | (3-37) | 4% |
| 3-HHEB-F | (3-10) | 7% |
| 5-HHEB-F | (3-10) | 3% |

-continued

| | | |
|---|---|---|
| 3-H2BTB-2 | (13-17) | 4% |
| 3-H2BTB-3 | (13-17) | 4% |
| 3-H2BTB-4 | (13-17) | 4% |
| 3-HB(F)TB-2 | (13-18) | 5% |

NI = 85.2° C.; Δn = 0.144; Δε = 24.8; η = 38.9 mPa·s.

Composition Example 8

| | | |
|---|---|---|
| 4O-HB(2F,3CL)B(2F,3F)-O2 | (1-c-2-54) | 5% |
| 4O-HB(2F,3F)B(2F,3CL)-O2 | (1-c-2-57) | 5% |
| 1V1O-HB(2F,3F)B(2F,3F)-O2 | (1-c-2-136) | 4% |
| 1V2-BEB(F,F)-C | (5-15) | 4% |
| 3-HB-C | (5-1) | 12% |
| 2-BTB-1 | (12-10) | 10% |
| 5-HH-VFF | (12-1) | 30% |
| 3-HHB-1 | (13-1) | 4% |
| VFF-HHB-1 | (13-1) | 8% |
| VFF2-HHB-1 | (13-1) | 5% |
| 3-H2BTB-2 | (13-17) | 5% |
| 3-H2BTB-3 | (13-17) | 4% |
| 3-H2BTB-4 | (13-17) | 4% |

Composition Example 9

| | | |
|---|---|---|
| 4O-ChB(2F,3F)-O2 | (1-a-1-20) | 3% |
| 2O-HB(2F,3F)-O2 | (1-a-2-4) | 3% |
| 4O-HB(2F,3F)-O2 | (1-a-2-22) | 3% |
| 2-HB-C | (5-1) | 5% |
| 3-HB-C | (5-1) | 12% |
| 3-HB-O2 | (12-5) | 15% |
| 2-BTB-1 | (12-10) | 3% |
| 3-HHB-F | (3-1) | 4% |
| 3-HHB-1 | (13-1) | 8% |
| 3-HHB-O1 | (13-1) | 5% |
| 3-HHB-3 | (13-1) | 10% |
| 3-HHEB-F | (3-10) | 3% |
| 2-HHB(F)-F | (3-2) | 7% |
| 3-HHB(F)-F | (3-2) | 7% |
| 5-HHB(F)-F | (3-2) | 7% |
| 3-HHB(F,F)-F | (3-3) | 5% |

NI = 80.4° C.; Δn = 0.094; Δε = 3.7; η = 16.5 mPa·s.

Composition Example 10

| | | |
|---|---|---|
| 1V1O-HB(2F,3F)-O2 | (1-a-2-60) | 3% |
| 4O-HB(2F,3F)-O2 | (1-a-2-22) | 7% |
| 5-HB-CL | (2-2) | 13% |
| 3-HH-4 | (12-1) | 12% |
| 3-HH-5 | (12-1) | 4% |
| 3-HHB-F | (3-1) | 4% |
| 3-HHB-CL | (3-1) | 3% |
| 4-HHB-CL | (3-1) | 4% |
| 3-HHB(F)-F | (3-2) | 10% |
| 4-HHB(F)-F | (3-2) | 9% |
| 5-HHB(F)-F | (3-2) | 9% |
| 7-HHB(F)-F | (3-2) | 8% |
| 5-HBB(F)-F | (3-23) | 3% |
| 1O1-HBBH-5 | (14-1) | 3% |
| 3-HHBB(F,F)-F | (4-6) | 2% |
| 3-HH2BB(F,F)-F | (4-15) | 3% |
| 4-HH2BB(F,F)-F | (4-15) | 3% |

NI = 100.3° C.; Δn = 0.086; Δε = 2.1; η = 18.3 mPa·s.

Composition Example 11

| | | |
|---|---|---|
| 4O-HB(2F,3CL)B(2F,3F)-O2 | (1-c-2-54) | 5% |
| 4O-HB(2F,3F)B(2F,3CL)-O2 | (1-c-2-57) | 4% |
| 1V1O-HB(2F,3F)B(2F,3F)-O2 | (1-c-2-136) | 4% |
| 5-HB-CL | (2-2) | 3% |
| 7-HB(F)-F | (2-3) | 7% |
| 3-HH-4 | (12-1) | 9% |
| 3-HH-EMe | (12-2) | 23% |
| 5-HHEB-F | (3-10) | 8% |
| 3-HHEB(F,F)-F | (3-12) | 10% |
| 4-HGB(F,F)-F | (3-103) | 5% |
| 5-HGB(F,F)-F | (3-103) | 6% |
| 2-H2GB(F,F)-F | (3-106) | 4% |
| 3-H2GB(F,F)-F | (3-106) | 5% |
| 5-GHB(F,F)-F | (3-109) | 7% |

Composition Example 12

| | | |
|---|---|---|
| 4O-BB(2F,3F)B(2F,3F)-O2 | (i-d-52) | 5% |
| 4O-BB(2F,3F)B(2F,3CL)-O2 | (i-d-57) | 3% |
| 3-HH-O1 | (12-1) | 8% |
| 3-HH-4 | (12-1) | 5% |
| 3-HB(2F,3F)-O2 | (6-1) | 12% |
| 5-HB(2F,3F)-O2 | (6-1) | 21% |
| 2-HHB(2F,3F)-1 | (7-1) | 5% |
| 3-HHB(2F,3F)-1 | (7-1) | 7% |
| 3-HHB(2F,3F)-O2 | (7-1) | 14% |
| 5-HHB(2F,3F)-O2 | (7-1) | 20% |

NI = 72.4° C.; Δn = 0.092; η = 29.2 mPa·s; Δε = −4.7.

Composition Example 13

| | | |
|---|---|---|
| 4O-BB(2F,3F)B(2F,3F)-O2 | (i-d-52) | 5% |
| 4O-BB(2F,3F)B(F)-O2 | (i-d-51) | 8% |
| 3-HB-O1 | (12-5) | 15% |
| 3-HH-4 | (12-1) | 5% |
| 3-HB(2F,3F)-O2 | (6-1) | 12% |
| 5-HB(2F,3F)-O2 | (6-1) | 12% |
| 2-HHB(2F,3F)-1 | (7-1) | 12% |
| 3-HHB(2F,3F)-1 | (7-1) | 12% |
| 3-HHB(2F,3F)-O2 | (7-1) | 13% |
| 3-HHB-1 | (13-1) | 6% |

NI = 85.9° C.; Δn = 0.110; η = 40.4 mPa·s; Δε = −3.5.

INDUSTRIAL APPLICABILITY

The invention provides a new liquid crystal compound having an excellent compatibility with other liquid crystal compounds and a large negative dielectric anisotropy.

Moreover, the invention provides a new liquid crystal composition having desirable characteristics and including the features by containing the liquid crystal compound as a component and suitably selecting a ring, a substituent, a bonding group and so forth constituting the compound.

What is claimed is:

1. A compound represented by formula (i):

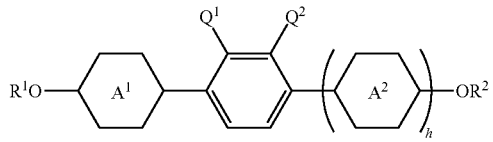
(i)

wherein $R^1$ and $R^2$ are independently alkyl having 1 to 8 carbons;
ring $A^1$ is trans-1,4-cyclohexylene, 1,4-cyclohexenylene or 1,4-phenylene;
ring $A^2$ is trans-1,4-cyclohexylene, 1,4-cyclohexenylene, 2-fluoro-1,4-phenylene, 3-fluoro-1,4-phenylene, 2,3-difluoro-1,4-phenylene, 2-fluoro-3-chloro-1,4-phenylene or 2-chloro-3-fluoro-1,4-phenylene;
$Q^1$ and $Q^2$ are fluorine; and
h is 0 or, and when h is 0, ring $A^1$ is trans-1,4-cyclohexylene or 1,4-cyclohexenylene.

2. A compound represented by formula (1):

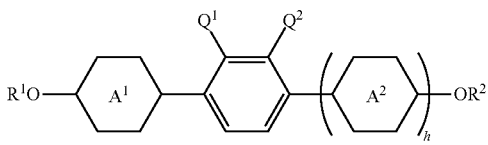
(1)

wherein $R^1$ and $R^2$ are independently alkyl having 1 to 8 carbons;
ring $A^1$ is trans-1,4-cyclohexylene or 1,4-cyclohexenylene;
ring $A^2$ is trans-1,4-cyclohexylene, 1,4-cyclohexenylene, 2-fluoro-1,4-phenylene, 3-fluoro-1,4-phenylene, 2,3-difluoro-1,4-phenylene, 2-fluoro-3-chloro-1,4-phenylene or 2-chloro-3-fluoro-1,4-phenylene;
$Q^1$ and $Q^2$ are fluorine; and
h is 0 or 1.

3. The compound according to claim 2, represented by formula (1-a):

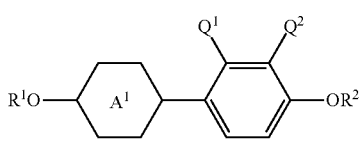
(1-a)

wherein $R^1$ and $R^2$ are independently straight-chain alkyl having 1 to 8 carbons;
ring $A^1$ is trans-1,4-cyclohexylene or 1,4-cyclohexenylene; and
$Q^1$ and $Q^2$ are fluorine.

4. The compound according to claim 3, wherein ring $A^1$ is 1,4-cyclohexenylene.

5. The compound according to claim 2, represented by formula (1-b):

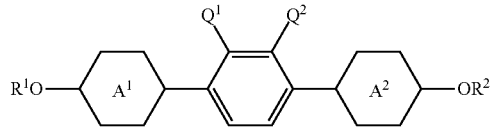
(1-b)

wherein $R^1$ and $R^2$ are independently straight-chain alkyl having 1 to 8 carbons;
ring $A^1$ and ring $A^2$ are independently trans-1,4-cyclohexylene or 1,4-cyclohexenylene; and
$Q^1$ and $Q^2$ are fluorine.

6. The compound according to claim 5, wherein both of ring $A^1$ and ring $A^2$ are trans-1,4-cyclohexylene and both of $Q^1$ and $Q^2$ are fluorine.

7. The compound according to claim 2, represented by formula (1-c):

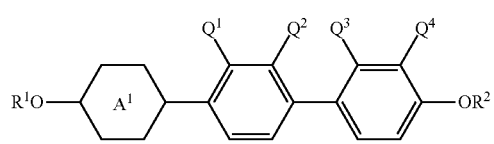
(1-c)

wherein $R^1$ and $R^2$ are independently straight-chain alkyl having 1 to 8 carbons;
ring $A^1$ is trans-1,4-cyclohexylene or 1,4-cyclohexenylene;
$Q^1$ and $Q^2$ are fluorine; and
$Q^3$ and $Q^4$ are independently hydrogen, fluorine or chlorine, and one of $Q^3$ and $Q^4$ is fluorine.

8. The compound according to claim 7, wherein ring $A^1$ is trans-1,4-cyclohexylene, $Q^1$, $Q^2$ and $Q^4$ are fluorine, and $Q^3$ is hydrogen.

9. The compound according to claim 7, wherein ring $A^1$ is trans-1,4-cyclohexylene, and $Q^1$, $Q^2$, $Q^3$ and $Q^4$ are fluorine.

10. The compound according to claim 1, represented by formula (i-d):

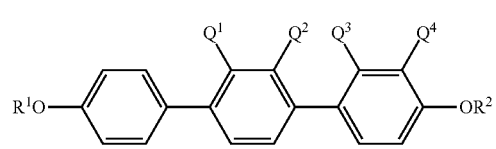
(i-d)

wherein $R^1$ and $R^2$ are independently straight-chain alkyl having 1 to 8 carbons;
$Q^1$ and $Q^2$ are fluorine; and
$Q^3$ and $Q^4$ are independently hydrogen, fluorine or chlorine, and one of $Q^3$ and $Q^4$ is fluorine.

11. A liquid crystal composition, containing at least one compound according to claim 1.

12. The liquid crystal composition according to claim 11, further containing at least one compound selected from the group of compounds represented by general formulas (2), (3) and (4):

(2)
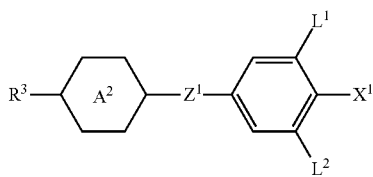

(3)
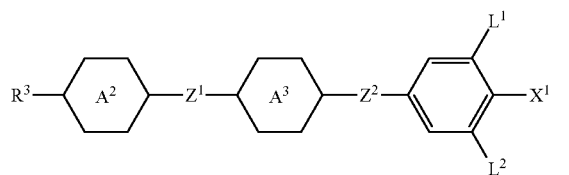

(4)
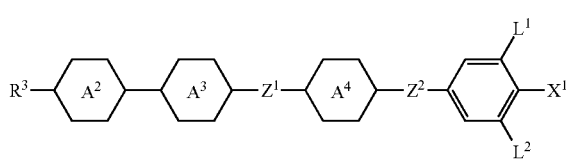

wherein R³ is independently alkyl having 1 to 10 carbons or alkenyl having 2 to 10 carbons, and in the alkyl and alkenyl, arbitrary hydrogen may be replaced by fluorine, and arbitrary —CH₂— may be replaced by —O—;
X¹ is fluorine or chlorine;
ring A², ring A³ and ring A⁴ are independently trans-1,4-cyclohexylene, trans-1,3-dioxane-2,5-diyl, pyrimidine-2,5-diyl or trans-1-pyrane-2,5-diyl, or 1,4-phenylene in which arbitrary hydrogen may be replaced by fluorine;

Z¹ and Z² are independently —(CH₂)₂—, —(CH₂)₄—, —COO—, —CF₂O—, —OCF₂—, —CH=CH—, —C≡C—, —CH₂O— or a single bond; and
L¹ and L² are independently hydrogen or fluorine.

13. The liquid crystal composition according to claim 11, further containing at least one compound selected from the group of compounds represented by general formula (5):

(5)
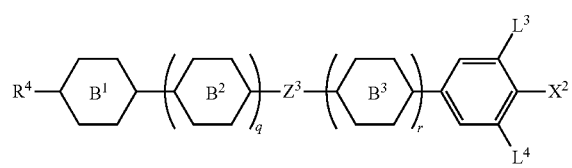

wherein R⁴ is alkyl having 1 to 10 carbons or alkenyl having 2 to 10 carbons, and in the alkyl and alkenyl, arbitrary hydrogen may be replaced by fluorine, and arbitrary —CH₂— may be replaced by —O—;
X² is —C≡N or —C≡C—C≡N;
ring B¹, ring B² and ring B³ are independently trans-1,4-cyclohexylene, 1,4-phenylene in which arbitrary hydrogen may be replaced by fluorine, trans-1,3-dioxane-2,5-diyl, trans-1-pyrane-2,5-diyl or pyrimidine-2,5-diyl;
Z³ is —(CH₂)₂—, —COO—, —CF₂O—, —OCF₂—, —CH₂O— or a single bond;
L³ and L⁴ are independently hydrogen or fluorine; and
q is 0, 1 or 2, and r is 0 or 1.

14. The liquid crystal composition according to claim 11, further containing at least one compound selected from the group of compounds represented by general formulas (6), (7), (8), (9), (10) and (11):

(6)
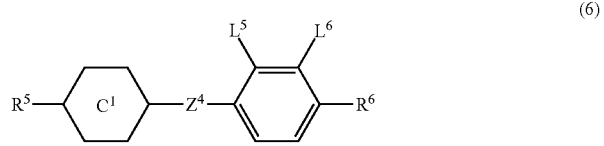

(7)
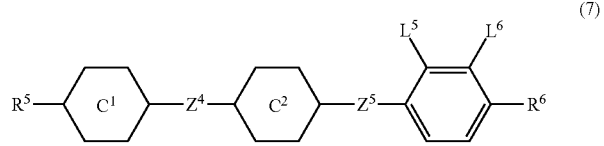

(8)
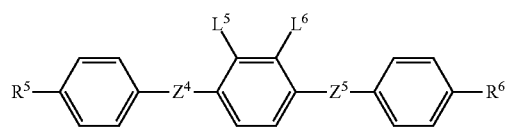

(9)
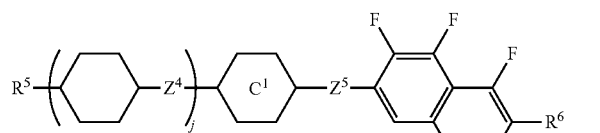

(10)
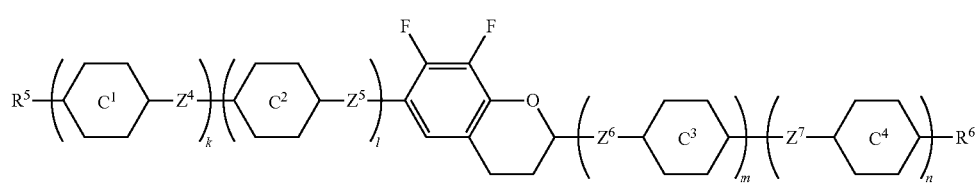

(11)
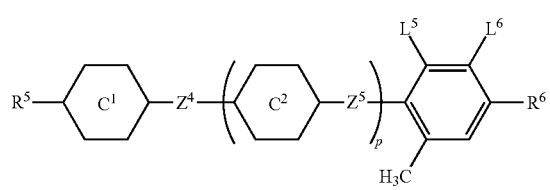

wherein $R^5$ is alkyl having 1 to 10 carbons or alkenyl having 2 to 10 carbons, and in the alkyl and alkenyl, arbitrary hydrogen may be replaced by fluorine, $R^6$ is alkoxy having 1 to 9 carbons or alkenyloxy having 2 to 9 carbons, and in the alkoxy and alkenyloxy, arbitrary hydrogen may be replaced by fluorine;

ring $C^1$, ring $C^2$, ring $C^3$ and ring $C^4$ are independently trans-1,4-cyclohexylene, 1,4-cyclohexenylene, 1,4-phenylene in which arbitrary hydrogen may be replaced by fluorine, trans-1-pyrane-2,5-diyl or trans-decahydro-2,6-naphthalene;

$Z^4$, $Z^5$, $Z^6$ and $Z^7$ are independently —$(CH_2)_2$—, —COO—, —$CH_2O$—, —$OCF_2$—, —$OCF_2(CH_2)_2$— or a single bond;

$L^5$ and $L^6$ are independently fluorine or chlorine; and j, k, l, m, n and p are independently 0 or 1, and a sum of k, l, m and n is 1 or 2.

15. The liquid crystal composition according to claim 11, further containing at least one compound selected from the group of compounds represented by general formulas (12), (13) and (14):

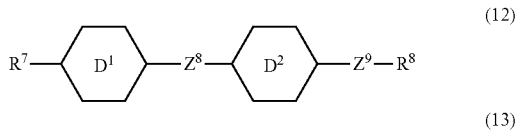

(12)

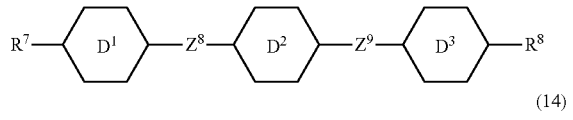

(13)

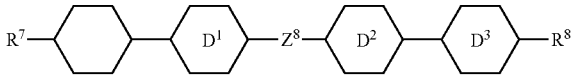

(14)

wherein $R^7$ and $R^8$ are independently alkyl having 1 to 10 carbons or alkenyl having 2 to 10 carbons, and in the alkyl and alkenyl, arbitrary hydrogen may be replaced by fluorine, and arbitrary —$CH_2$— may be replaced by —O—;

ring $D^1$, ring $D^2$ and ring $D^3$ are independently trans-1,4-cyclohexylene, pyrimidine-2,5-diyl, 1,4-phenylene, or 2-fluoro-1,4-phenylene, 3-fluoro-1,4-phenylene or 2,5-difluoro-1,4-phenylene; and $Z^8$ and $Z^9$ are independently —C≡C—, —COO—, —$(CH_2)_2$—, —CH=CH— or a single bond.

16. The liquid crystal composition according to claim 14, further containing a least one compound selected from the group of compounds represented by general formulas (12), (13) (14):

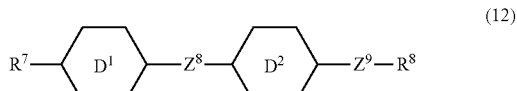

(12)

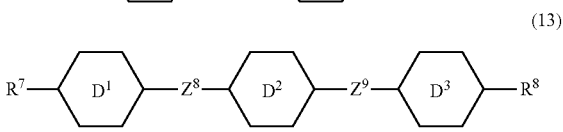

(13)

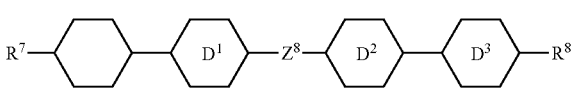

(14)

wherein $R^7$ and $R^8$ are independently alkyl having 1 to 10 carbons or alkenyl having 2 to 10 carbons, and in the alkyl and alkenyl, arbitrary hydrogen may be replaced by fluorine, and arbitrary —$CH_2$— may be replaced by —O—;

ring $D^1$, ring $D^2$ and ring $D^3$ are independently trans-1,4-cyclohexylene, pyrimidine-2,5-diyl, 1,4-phenylene, or 2-fluoro-1,4-phenylene, 3-fluoro-1,4-phenylene or 2,5-difluoro-1,4-phenylene; and $Z^8$ and $Z^9$ are independently —C≡C—, —COO—, —$(CH_2)_2$—, —CH=CH— or a single bond.

17. The liquid crystal composition according to claim 11, further containing at least one optically active compound and/or polymerizable compound.

18. The liquid crystal composition according to claim 11, further containing at least one antioxidant and/or ultraviolet absorber.

19. A liquid crystal display device containing the liquid crystal composition according to claim 11.

\* \* \* \* \*